(12) United States Patent
Weng

(10) Patent No.: US 11,785,304 B2
(45) Date of Patent: Oct. 10, 2023

(54) VIDEO PREVIEW METHOD AND ELECTRONIC DEVICE

(71) Applicant: Huawei Technologies Co., Ltd., Shenzhen (CN)

(72) Inventor: Xinyu Weng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 572 days.

(21) Appl. No.: 17/041,898

(22) PCT Filed: Apr. 3, 2018

(86) PCT No.: PCT/CN2018/081786
§ 371 (c)(1),
(2) Date: Sep. 25, 2020

(87) PCT Pub. No.: WO2019/183997
PCT Pub. Date: Oct. 3, 2019

(65) Prior Publication Data
US 2021/0014570 A1    Jan. 14, 2021

(30) Foreign Application Priority Data

Mar. 28, 2018   (CN) .......................... 201810265839.6

(51) Int. Cl.
*H04N 21/472*   (2011.01)
*G06F 3/04817*  (2022.01)
(Continued)

(52) U.S. Cl.
CPC ......... *H04N 21/472* (2013.01); *G06F 3/0481* (2013.01); *G06F 3/0484* (2013.01);
(Continued)

(58) Field of Classification Search
CPC .. G06F 3/04817; G06F 3/0484; G06F 3/0488; G06F 16/783; G06F 3/04883;
(Continued)

(56) References Cited

U.S. PATENT DOCUMENTS 3,732,579 A     5/1973  Allander et al.
8,732,579 B2 *  5/2014  Rossmann ............ G06F 16/739
                                                    715/712
(Continued)

FOREIGN PATENT DOCUMENTS

CN     101243426 A    8/2008
CN     105589691 A    5/2016
(Continued)

OTHER PUBLICATIONS

Crider, M., "Netflix App Update 4.0 Adds a Homescreen Widget, for Some Reason [APK Download]," Nov. 30, 2015, 6 pages.
(Continued)

*Primary Examiner* — Jennifer E Nichols
(74) *Attorney, Agent, or Firm* — Conley Rose, P.C.

(57) ABSTRACT

A video preview method includes receiving, by an electronic device, a first operation, displaying, by the electronic device, a first screen on a touchscreen of the electronic device in response to the first operation, where the first screen is a page of a home screen or a leftmost screen, obtaining, by the electronic device, a first preview video corresponding to a first video application when the first screen includes an identifier of the first video application, displaying, by the electronic device, a first video preview window in the first screen, and playing, by the electronic device, the first preview video in the first video preview window.

19 Claims, 34 Drawing Sheets

(51) Int. Cl.
    *G06F 3/0484*     (2022.01)
    *G06F 3/0488*     (2022.01)
    *H04N 21/41*     (2011.01)
    *H04N 21/8549*     (2011.01)
    *G06F 16/783*     (2019.01)
    *G06F 3/0481*     (2022.01)
    *G06F 3/04883*     (2022.01)

(52) U.S. Cl.
    CPC ........ *G06F 3/0488* (2013.01); *G06F 3/04817* (2013.01); *G06F 3/04883* (2013.01); *G06F 16/783* (2019.01); *H04N 21/4126* (2013.01); *H04N 21/8549* (2013.01)

(58) Field of Classification Search
    CPC ... G06F 3/0483; G06F 3/0481; H04N 21/472; H04N 21/4126; H04N 21/8549; H04N 21/47202; H04N 21/8173; H04M 1/72403; H04M 1/725; H04M 1/72439; H04M 1/72469
    See application file for complete search history.

(56) References Cited

U.S. PATENT DOCUMENTS

| | | | |
|---|---|---|---|
| 9,414,108 B2 * | 8/2016 | Sirpal | H04N 21/44222 |
| 10,368,133 B1 * | 7/2019 | Denk, Jr. | H04N 21/4826 |
| 10,845,949 B2 * | 11/2020 | Chor | G06F 9/451 |
| 10,917,704 B1 * | 2/2021 | Hamid | H04N 21/8456 |
| 10,997,234 B2 * | 5/2021 | Butts | G06F 3/04847 |
| 11,354,033 B2 * | 6/2022 | Zambetti | G06F 3/04847 |
| 11,445,257 B1 * | 9/2022 | Ranjan | H04N 21/47217 |
| 2005/0193341 A1 * | 9/2005 | Hayward | G11B 27/11 |
| | | | 725/135 |
| 2005/0210145 A1 * | 9/2005 | Kim | H04N 21/4788 |
| | | | 709/219 |
| 2005/0257169 A1 * | 11/2005 | Tu | G06F 3/0481 |
| | | | 715/810 |
| 2007/0048714 A1 * | 3/2007 | Plastina | G06F 16/64 |
| | | | 434/308 |
| 2007/0083911 A1 * | 4/2007 | Madden | H04N 21/472 |
| | | | 386/E5.064 |
| 2007/0136750 A1 * | 6/2007 | Abanami | H04N 21/8583 |
| | | | 715/837 |
| 2011/0126236 A1 * | 5/2011 | Arrasvuori | H04N 21/4755 |
| | | | 725/46 |
| 2012/0216146 A1 * | 8/2012 | Korkonen | G06F 3/04817 |
| | | | 715/835 |
| 2014/0101588 A1 * | 4/2014 | Chang | G06F 3/04817 |
| | | | 715/810 |
| 2014/0176479 A1 * | 6/2014 | Wardenaar | G06F 3/0346 |
| | | | 345/173 |
| 2014/0229835 A1 * | 8/2014 | Ravine | H04L 65/61 |
| | | | 709/206 |
| 2014/0258866 A1 * | 9/2014 | Jin | G06F 3/04842 |
| | | | 715/719 |
| 2015/0020105 A1 * | 1/2015 | Roberts | H04N 5/76 |
| | | | 725/44 |
| 2015/0046817 A1 * | 2/2015 | Cudak | H04N 21/8549 |
| | | | 715/719 |
| 2015/0095819 A1 * | 4/2015 | Hong | G06F 9/451 |
| | | | 715/765 |
| 2015/0264292 A1 * | 9/2015 | Greene | G06F 3/0488 |
| | | | 386/248 |
| 2015/0281764 A1 * | 10/2015 | Stathacopoulos | H04N 21/4821 |
| | | | 725/41 |
| 2015/0347010 A1 * | 12/2015 | Yang | G06F 3/1423 |
| | | | 715/765 |
| 2015/0350297 A1 * | 12/2015 | Yang | H04L 67/025 |
| | | | 715/740 |
| 2016/0092071 A1 * | 3/2016 | Lawson | G06F 3/0482 |
| | | | 345/156 |
| 2016/0330523 A1 * | 11/2016 | Haberman | G06F 16/78 |
| 2016/0334973 A1 * | 11/2016 | Reckhow | H04N 21/4312 |
| 2016/0343409 A1 * | 11/2016 | Wang | H04N 21/472 |
| 2016/0364123 A1 * | 12/2016 | Burns | H04N 7/181 |
| 2017/0070779 A1 * | 3/2017 | Kim | H04N 21/475 |
| 2017/0075516 A1 * | 3/2017 | Park | H04N 21/47202 |
| 2017/0115848 A1 * | 4/2017 | Plasmeier | G06F 3/04817 |
| 2017/0134776 A1 * | 5/2017 | Ranjeet | G11B 27/031 |
| 2017/0300458 A1 * | 10/2017 | Hassan | G06F 40/106 |
| 2017/0300969 A1 * | 10/2017 | Malhotra | G09G 5/34 |
| 2017/0315681 A1 * | 11/2017 | Kang | G06F 16/9535 |
| 2018/0019002 A1 * | 1/2018 | McIntosh | G11B 27/34 |
| 2018/0113579 A1 * | 4/2018 | Johnston | H04N 21/482 |
| 2018/0261256 A1 * | 9/2018 | Liu | H04N 21/47217 |
| 2019/0121628 A1 * | 4/2019 | Hu | H04L 67/306 |
| 2021/0014570 A1 * | 1/2021 | Weng | H04N 21/472 |
| 2021/0109644 A1 * | 4/2021 | Chen | G06F 9/451 |
| 2021/0235156 A1 * | 7/2021 | Richman | G06F 3/04842 |
| 2023/0102237 A1 * | 3/2023 | Jung | G06F 3/04817 |
| | | | 455/575.4 |

FOREIGN PATENT DOCUMENTS

| | | | | |
|---|---|---|---|---|
| CN | 105955618 A | | 9/2016 | |
| CN | 106155478 A | * | 11/2016 | .......... G06F 3/0481 |
| CN | 106155478 A | | 11/2016 | |
| CN | 106547533 A | * | 3/2017 | .............. G06F 9/44 |
| CN | 106547533 A | | 3/2017 | |
| CN | 107102807 A | * | 8/2017 | .......... G06F 3/0488 |
| CN | 107102807 A | | 8/2017 | |
| JP | 2017174455 A | | 9/2017 | |
| KR | 20090047303 A | | 5/2009 | |
| KR | 20130083201 A | * | 7/2013 | .......... G06F 1/1626 |
| KR | 20130083201 A | | 7/2013 | |
| WO | 2016023186 A1 | | 2/2016 | |
| WO | WO-2017181598 A1 | * | 10/2017 | .......... H04N 21/472 |
| WO | WO-2020249044 A1 | * | 12/2020 | .............. G06F 9/451 |

OTHER PUBLICATIONS

"Netflix Brings Home Screen Widgets Back To Android," ClintonFitch.com, Dec. 2, 2015, 10 pages.

"Change which page is the "home" screen on the S5?," Android Forums et AndroidCentraltcom, 2014, 8 pages.

* cited by examiner

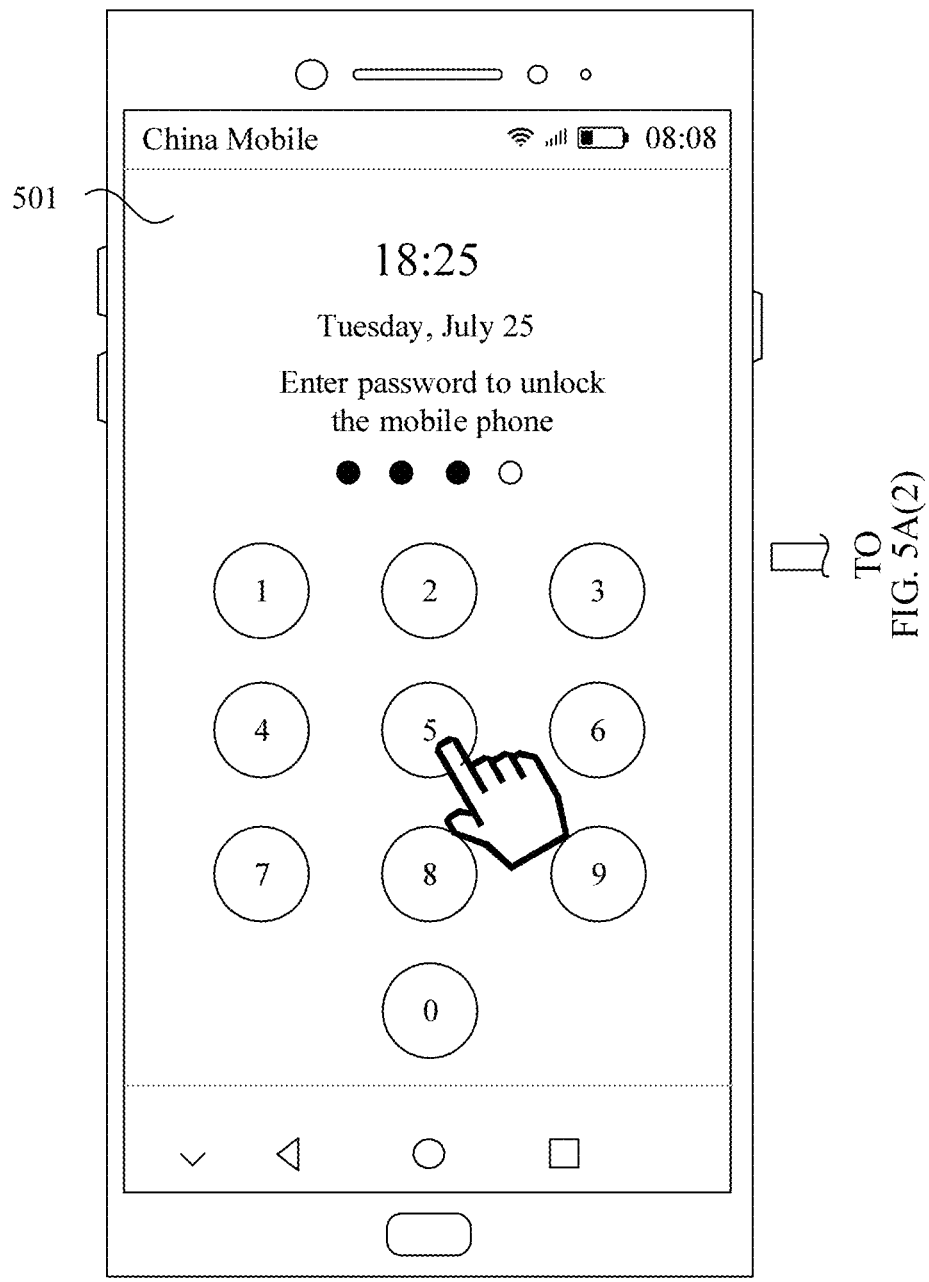
FIG. 5A(1)

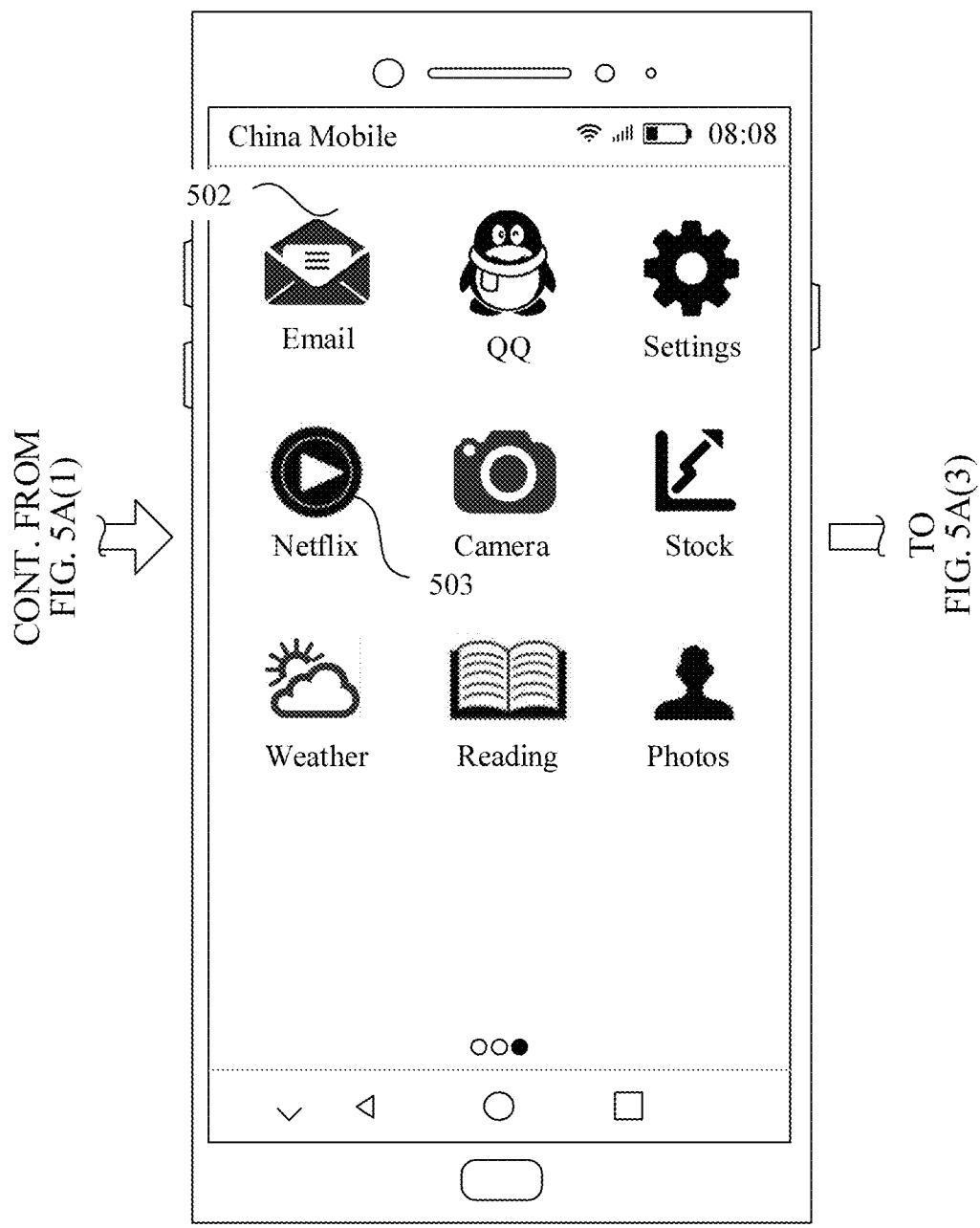
FIG. 5A(2)

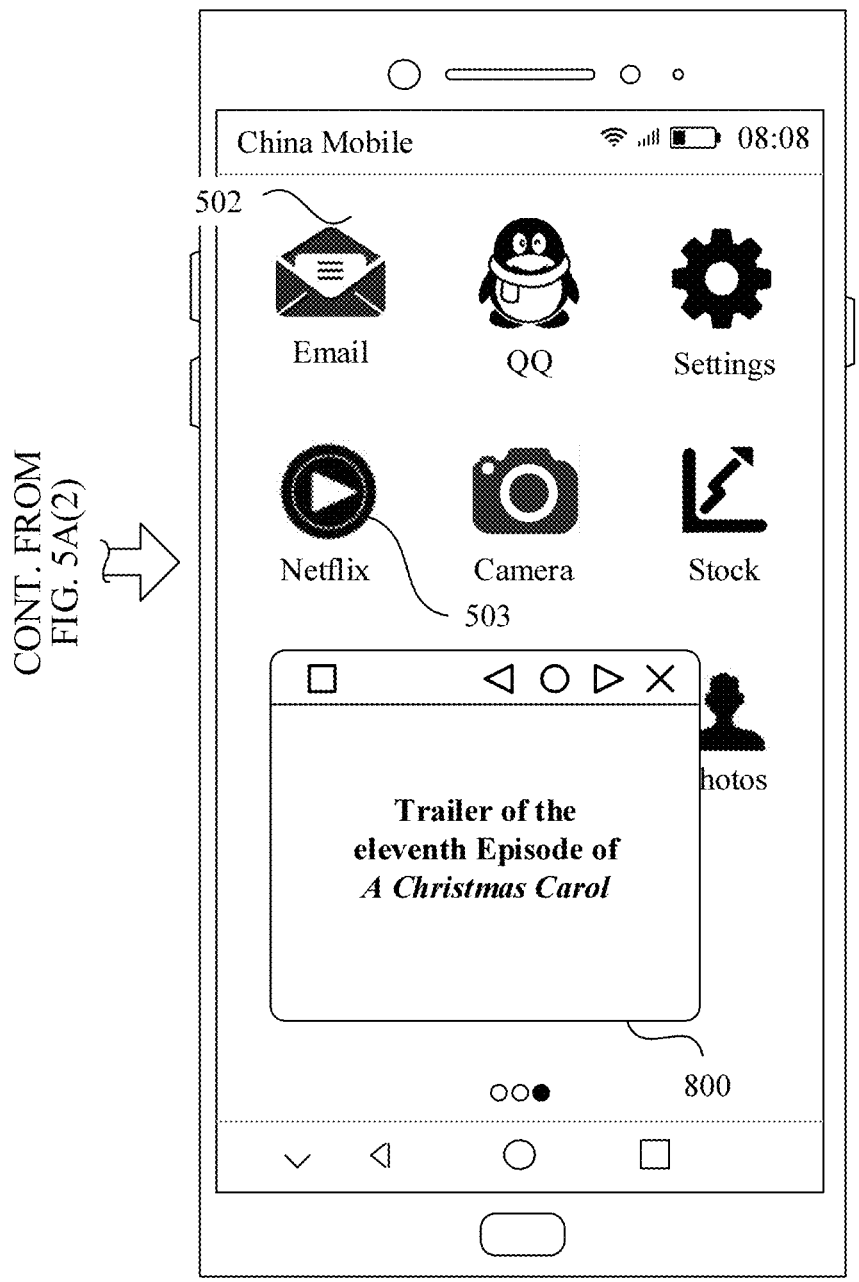
FIG. 5A(3)

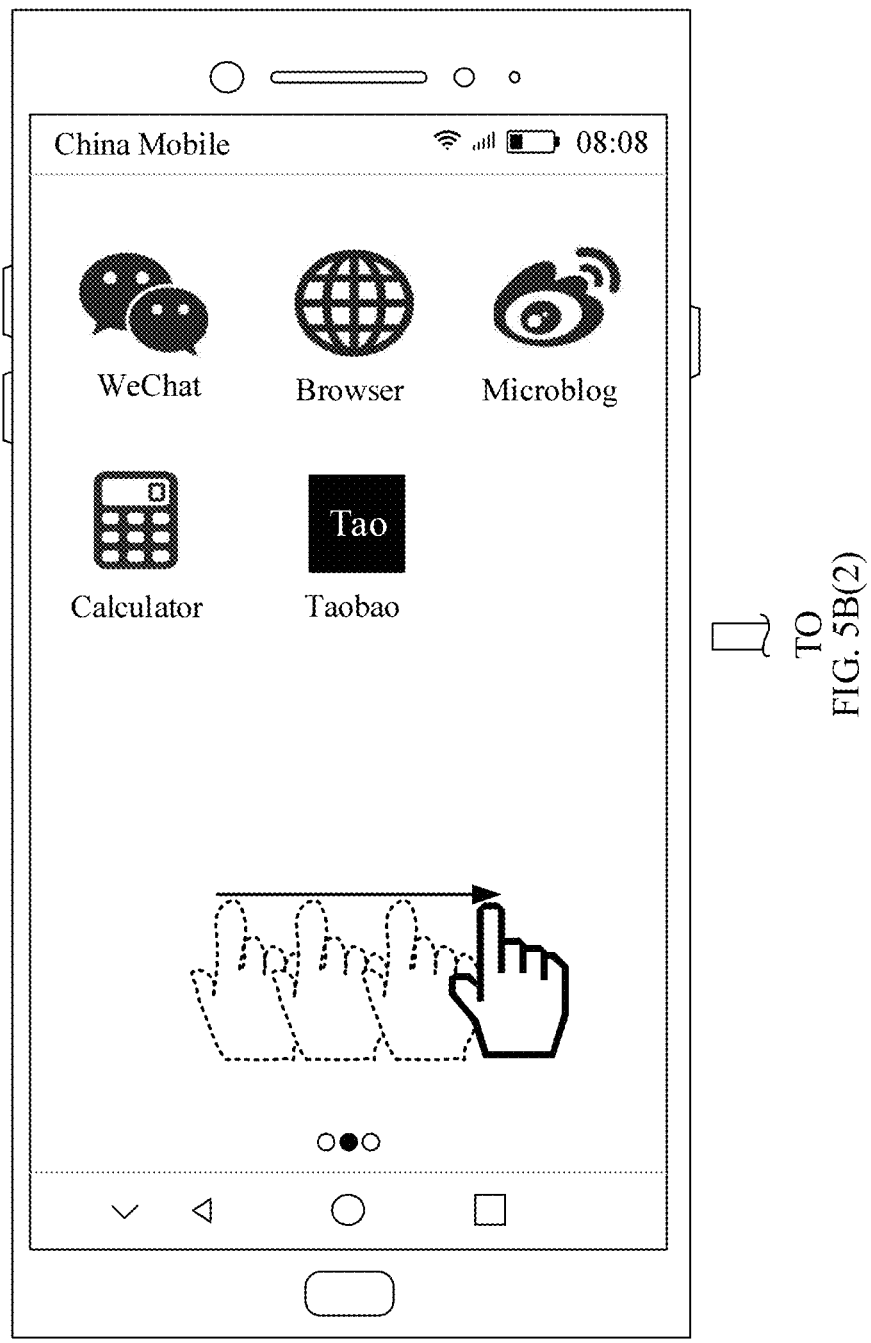
FIG. 5B(1)

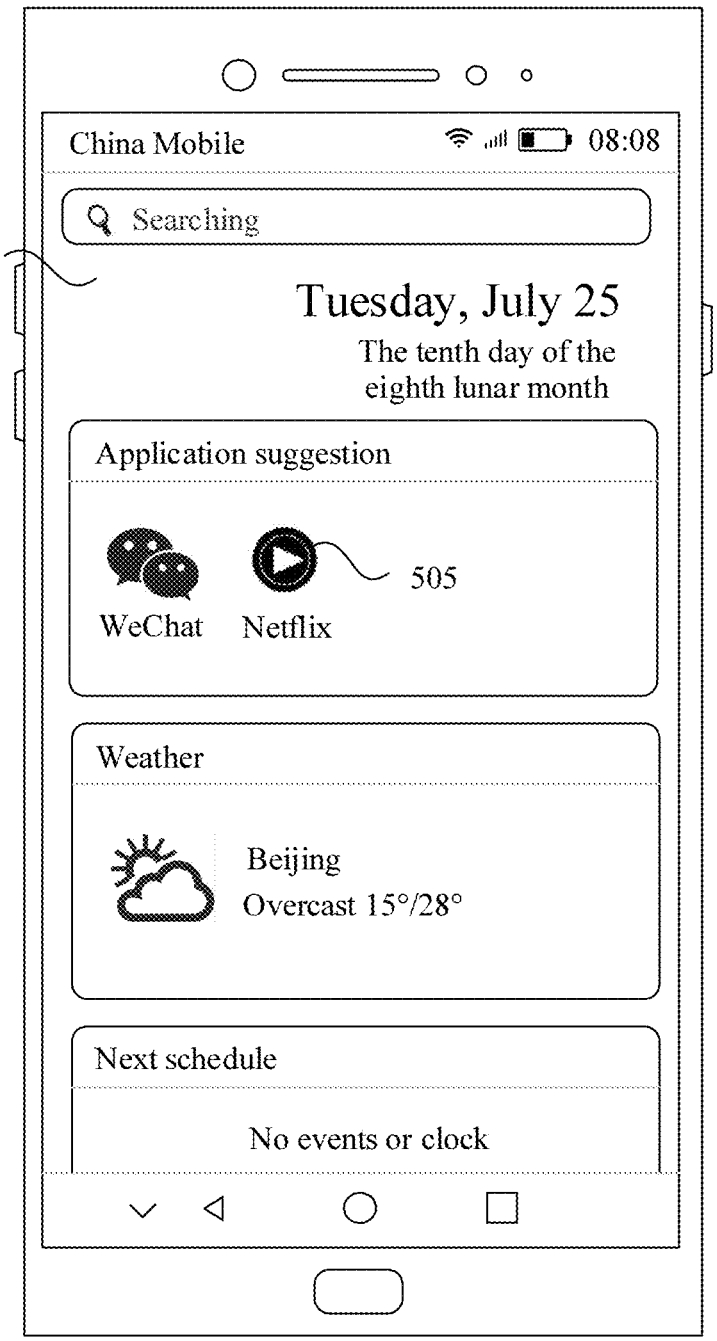
FIG. 5B(2)

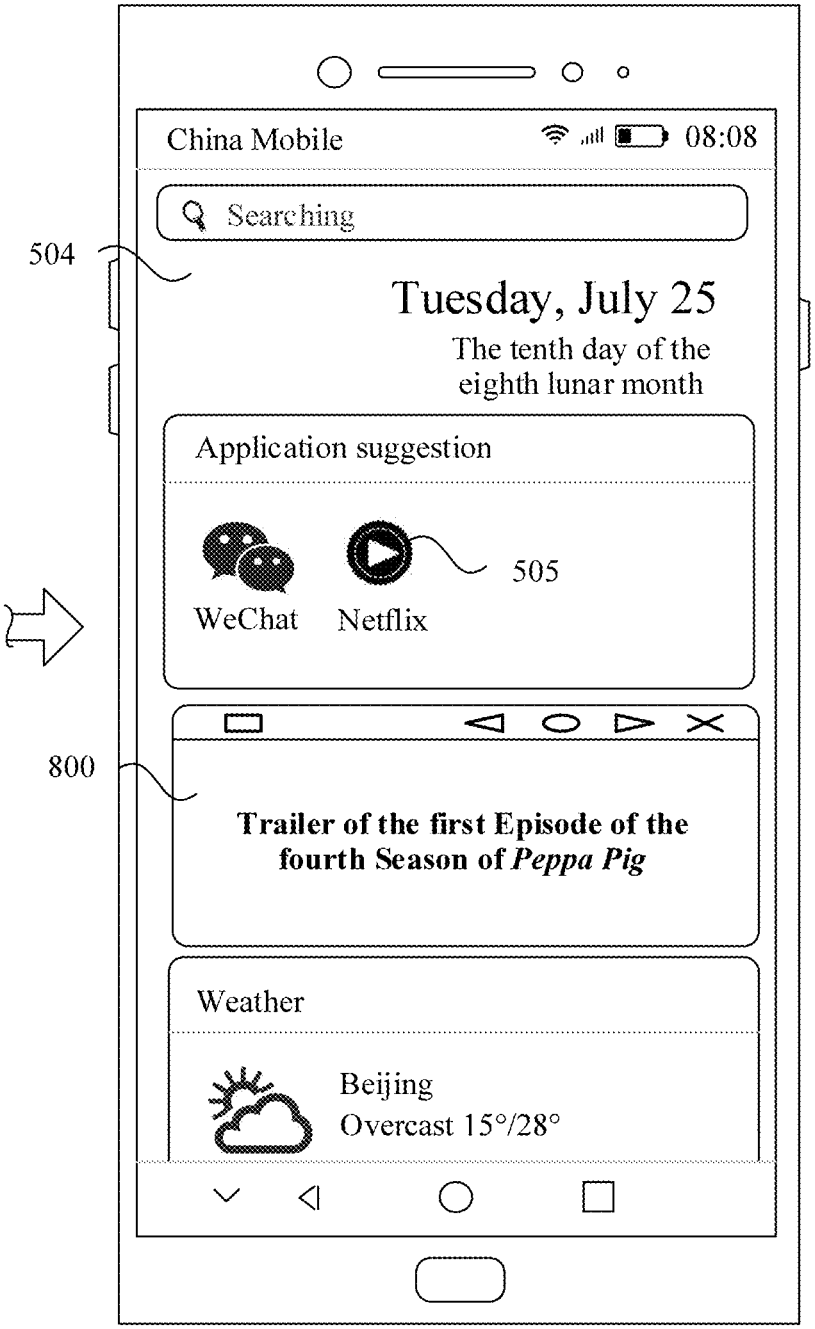
FIG. 5B(3)

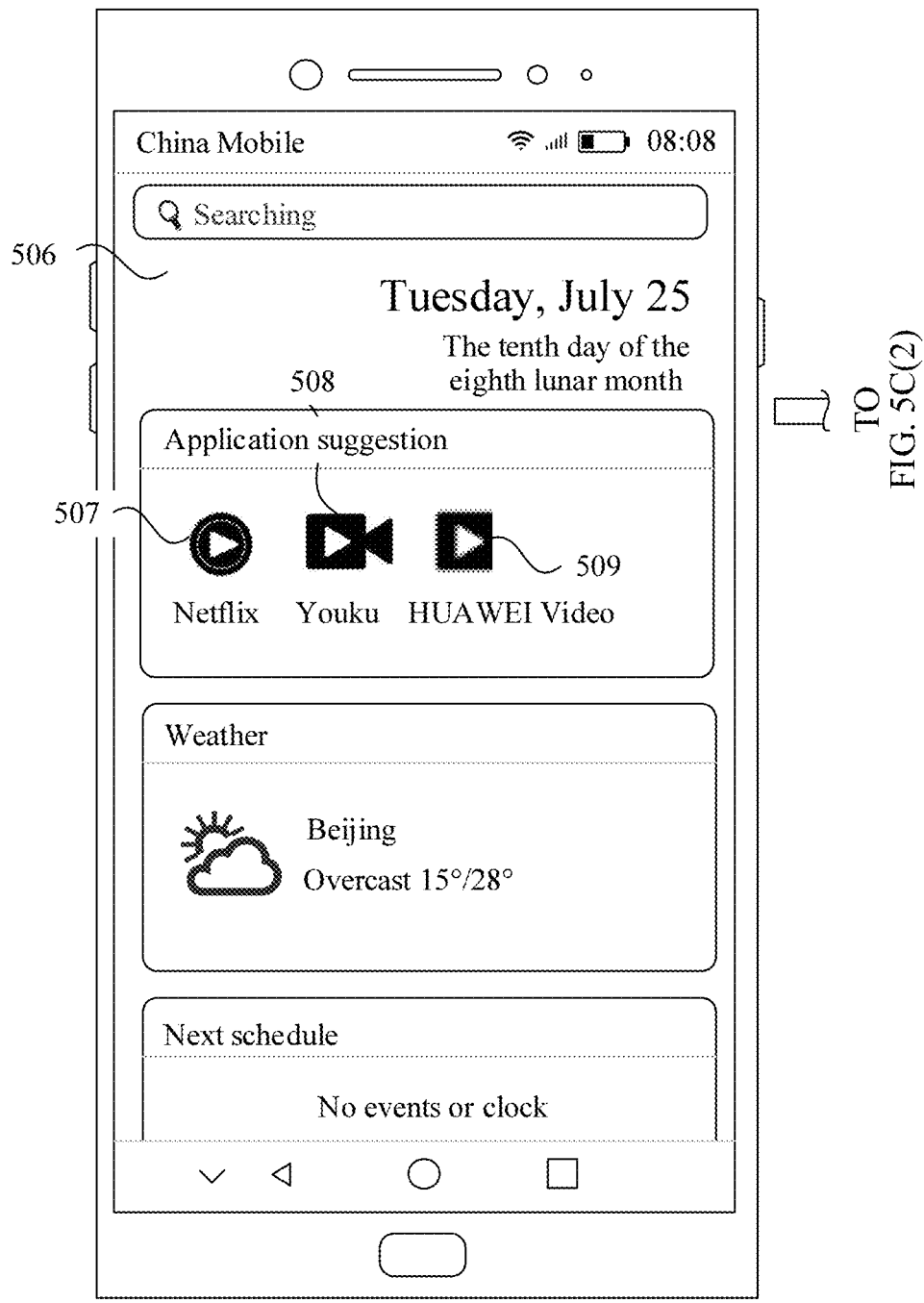
FIG. 5C(1)

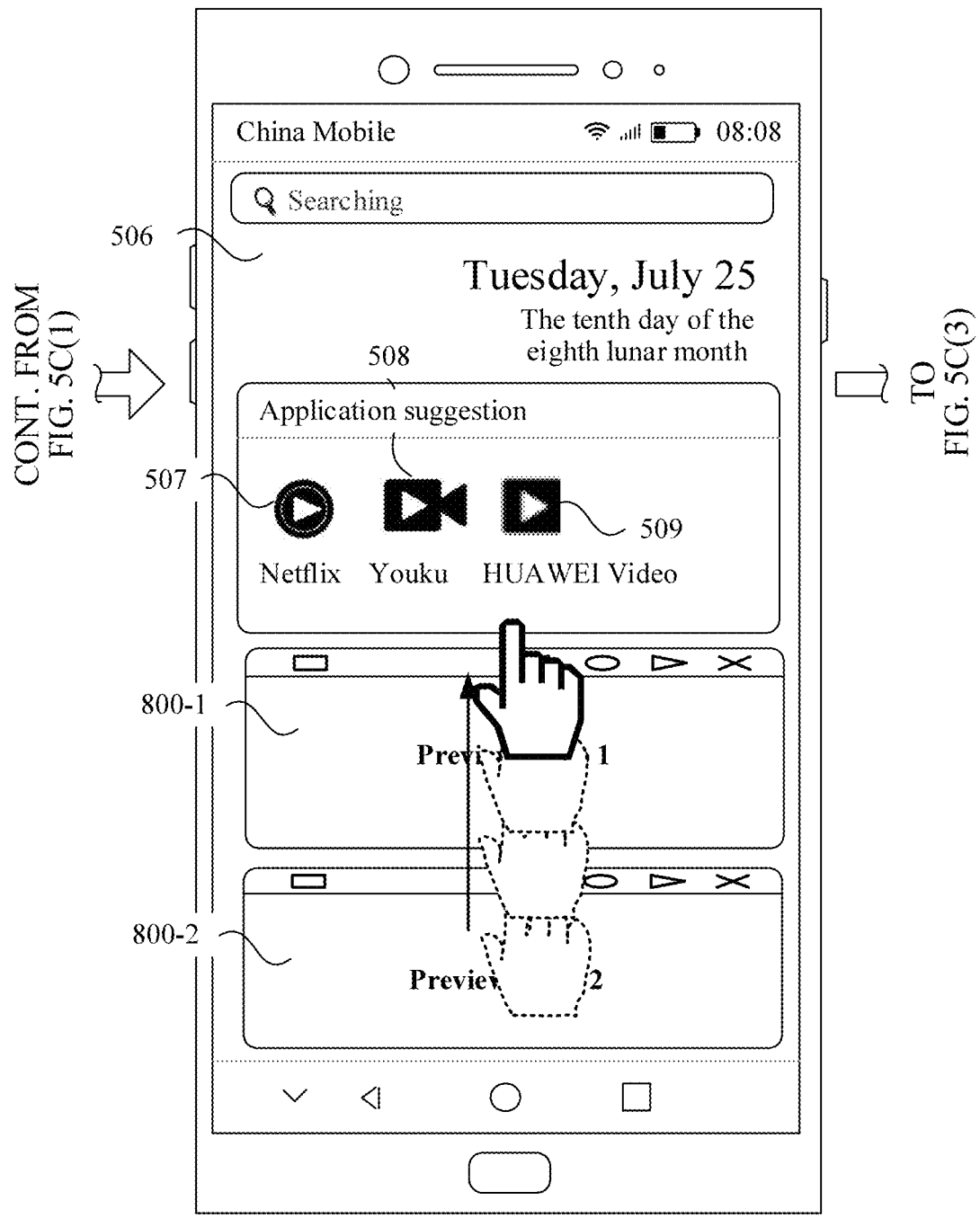
FIG. 5C(2)

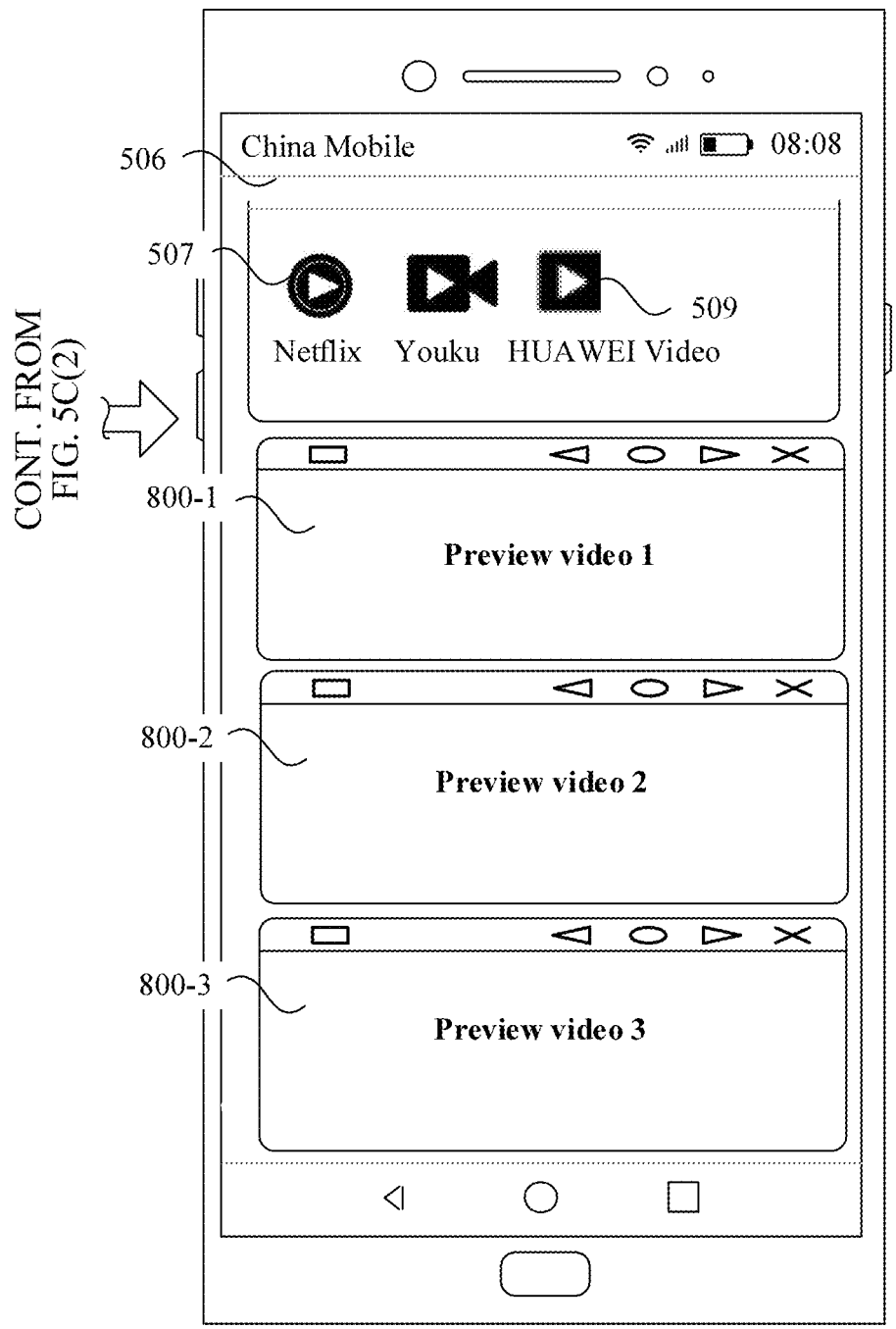
FIG. 5C(3)

VIDEO PREVIEW METHOD AND ELECTRONIC DEVICE

CROSS-REFERENCE TO RELATED APPLICATIONS

This application is a U.S. National Stage of International Patent Application No. PCT/CN2018/081786 filed on Apr. 3, 2018, which claims priority to Chinese Patent Application No. 201810265839.6 filed on Mar. 28, 2018. Both of the aforementioned applications are hereby incorporated by reference in their entireties.

TECHNICAL FIELD

Embodiments of this application relate to the field of electronic devices, and in particular, to a video preview method and an electronic device.

BACKGROUND

With rapid development of multimedia technologies, an increasing quantity of types of video applications are used to play a video, and functions are getting more powerful. In addition, with rapid popularization of electronic devices (such as a smartphone and a tablet), a user increasingly tends to install a video application on the electronic device, to watch, at any time and any place, a movie, a TV series, an entertainment program, and the like that the user is interested in.

In the prior art, a preview of video-related content is presented to a user after the user opens a video application. For example, a user opens a desktop of a mobile phone, and taps an icon of a video application displayed on the desktop, to open the video application. In this case, the video application may present a preview of recommended video-related content on a homepage. It can be learned that the preview of the video-related content can be viewed only after the user performs a series of operations on the electronic device. Consequently, the foregoing operations greatly reduce using efficiency of the electronic device.

SUMMARY

This application provides a video preview method and an electronic device, to resolve a problem that using efficiency of the electronic device is low because video-related content can be previewed only after a user performs a series of operations on the electronic device.

To achieve the foregoing objective, the following technical solutions are used in this application.

According to a first aspect of this application, a video preview method is provided. The method may be implemented in an electronic device having a touchscreen. The method may include: receiving, by the electronic device, a first operation; displaying a leftmost screen on the touchscreen of the electronic device in response to the received first operation; determining, by the electronic device, that a first video application has a target permission, when an application suggestion window of the leftmost screen includes an icon of the first video application, where the target permission is a permission for playing a video preview corresponding to a video application, when the video application is not displayed in a foreground; obtaining, by the electronic device, a first preview video corresponding to the first video application; adding a first video preview window to the leftmost screen, and playing the obtained first preview video in the added first video preview window; receiving, by the electronic device, a second operation; in response to the second operation, closing, by the electronic device, the first video preview window in the leftmost screen, and displaying a page of a home screen on the touchscreen of the electronic device; and redisplaying, by the electronic device, the first video preview window in a blank area of the page of the home screen when the page of the home screen includes the icon of the first video application and an icon of a second video application, and continuing playing the first preview video, where the blank area is an area in which the page of the home screen does not include a control.

According to the foregoing video preview method provided in this application, when a user opens the leftmost screen, because the application suggestion window includes an icon of a video application, and the icon included in the application suggestion window usually belongs to the application frequently used by the user, it may be predicted that a using intention of opening the leftmost screen by the user is to use the video application. In this case, the electronic device may play, in the leftmost screen, the preview video corresponding to the video application. In this way, the user can watch the preview video corresponding to the video application without opening the video application, thereby reducing complexity of a user operation, improving the using efficiency of the electronic device, and implementing efficient interaction between the electronic device and the user. In addition, when the user slides from the leftmost screen to the page of the home screen, if the page of the home screen includes an icon of a video application in the leftmost screen, the preview video played in the leftmost screen continues to be played, to attract the user to pay attention to and use the video application.

In a possible implementation, the method may further include: determining, by the electronic device, whether the second video application has the target permission, when the page that is of the home screen and that is displayed on the touchscreen of the electronic device includes the icon of the first video application having the target permission and the icon of the second video application; redisplaying the first video preview window in the blank area of the page of the home screen when determining that the second video application does not have the target permission; and continuing playing the first preview video. Considering that a size of the touchscreen of the electronic device is limited, when an interface displayed on the touchscreen of the electronic device includes icons of a plurality of video applications, if preview videos corresponding to all video applications are displayed, an original control in the interface may be blocked, and user experience is poor. Therefore, in this application, a preview video corresponding to a video application with a target permission is selected for playing, to improve user experience.

In another possible implementation, the method may further include: determining, by the electronic device, whether the second video application has the target permission, when the page that is of the home screen and that is displayed on the touchscreen of the electronic device includes the icon of the first video application having the target permission and the icon of the second video application; and if determining that the second video application also has the target permission, redisplaying, by the electronic device, the first video preview window in a blank area of a page of the home screen when determining that use frequency of the first video application is greater than use frequency of the second video application, a priority of the first video application is higher than a priority of the second video application, or a last use time of the first video application is later than a last use time of the second video application, and continuing playing the first preview video; or if determining that use frequency of the first video application is less than use frequency of the second video application, a priority of the first video application is less than a priority of the second video application, or a last use time of the first video application is earlier than a last use time of the second video application, obtaining, by the electronic device, a second preview video corresponding to the second video application, redisplaying the first video preview window in the blank area of the page of the home screen, and playing the second preview video in the first video preview window; or displaying a second video preview window in the blank area of the page of the home screen, and playing the second preview video in the second video preview window. In this way, when the interface displayed on the touchscreen of the electronic device includes the icons of the plurality of video applications with the target permission, a preview video corresponding to a video application that meets a specific condition is selected to be played, so that the played preview video can better meet a using requirement of the user, thereby improving user experience.

In another possible implementation, the method may further include: obtaining, by the electronic device, a second preview video corresponding to the second video application, when the page that is of the home screen and that is displayed on the touchscreen of the electronic device includes the icon of the first video application and an icon of the second video application; and playing the second preview video in the first video preview window, or displaying a second video preview window in the blank area of the page of the home screen, and playing the second preview video in the second video preview window. In this way, when the interface displayed on the touchscreen of the electronic device includes icons of a plurality of video applications, the electronic device may play a preview video corresponding to each video application.

In another possible implementation, the first video preview window added to the leftmost screen is adjacent to the application suggestion window. In this way, it is convenient for the user to view.

In another possible implementation, if the electronic device does not receive an operation in a process of playing the first preview video, the electronic device closes the first video preview window in the leftmost screen after playing of the first preview video is completed, and displays an original window in the leftmost screen at an original display position. In this way, in the process of playing the preview video, if the electronic device does not receive a user operation, it may be predicted that a using intention of opening the leftmost screen by the user is not to use the video application. In this case, after the playing of the preview video is completed, the electronic device may close the video preview window, thereby further improving an intelligent interaction capability of the electronic device with the user.

According to a second aspect of this application, a video preview method is provided. The video preview method may be implemented in an electronic device having a touchscreen, and the method may include:

receiving, by an electronic device, a first operation; displaying a first screen on the touchscreen of the electronic device in response to the first operation, where the first screen may be a page of a home screen or a leftmost screen; obtaining, by the electronic device, a first preview video corresponding to a first video application, when the first screen includes an identifier of the first video application; and displaying a first video preview window in the first screen, and playing the obtained first preview video in the first video preview window.

According to the foregoing video preview method provided in this application, when a user opens the home screen or the leftmost screen that includes an identifier of a video application, the electronic device may play, in the home screen or the leftmost screen, a preview video corresponding to the video application, and the user does not need to open the video application. In this way, complexity of a user operation is reduced, using efficiency of the electronic device is improved, and efficient interaction between the electronic device and the user is implemented.

In a possible implementation, the obtaining, by the electronic device, a first preview video corresponding to a first video application, when the first screen includes the identifier of the first video application may specifically include: obtaining, by the electronic device, a user profile, where the user profile may include at least one of a time and a place at which a user uses a video application; determining, by the electronic device, that the user profile indicates that the user opens the first screen to use the video application; and obtaining, by the electronic device, the first preview video when the first screen includes the identifier of the first video application. In this way, the user profile is obtained to determine the using intention of opening the first screen by the user. The electronic device plays, on the first screen, the preview video corresponding to the video application only when the using intention of opening the first screen by the user is to use the video application and it is determined that the first screen includes the identifier of the first video application, so that an operation of playing the preview video by the electronic device is closer to a using requirement of the user, and user experience is improved.

In another possible implementation, when the first screen is the leftmost screen, the obtaining, by the electronic device, a first preview video corresponding to a first video application, when the first screen includes the identifier of the first video application may specifically include: obtaining, by the electronic device, the first preview video when an application suggestion window of the leftmost screen includes the identifier of the first video application. Because the application suggestion window of the leftmost screen includes an icon of an application frequently used by the user, when the user opens the leftmost screen, and the application suggestion window of the leftmost screen includes the identifier of the first video application, the electronic device plays the preview video in the leftmost screen. In this way, the operation of playing the preview video by the electronic device is closer to a using requirement of the user, and user experience is improved.

In another possible implementation, the method may further include: when the first screen further includes an identifier of a second video application, and before the obtaining, by the electronic device, a first preview video corresponding to the first video application, determining, by the electronic device, that the first video application has a target permission and the second video application does not have the target permission, where the target permission is a permission for playing a video preview corresponding to a video application, when the video application is not displayed in a foreground. In this way, when the interface displayed on the touchscreen of the electronic device includes icons of a plurality of video applications, a preview video corresponding to a video application with the target permission is selected to be played. Therefore, when a size of the touchscreen is limited, a case in which an original control in the interface is blocked because too many preview videos are played is effectively avoided, thereby improving user experience.

In another possible implementation, the method may further include: when the first screen further includes an identifier of the second video application, and before the obtaining, by the electronic device, a first preview video corresponding to the first video application, determining, by the electronic device, that both the first video application and the second video application have the target permission, and determining that use frequency of the first video application is greater than use frequency of the second video application, a priority of the first video application is higher than a priority of the second video application, or a last use time of the first video application is later than a last use time of the second video application, where the target permission is a permission for playing a video preview corresponding to a video application, when the video application is not displayed in a foreground. In this way, when the interface displayed on the touchscreen of the electronic device includes the icons of the plurality of video applications with the target permission, a preview video corresponding to a video application that meets a specific condition is selected to be played, so that the played preview video can better meet a using requirement of the user, thereby improving user experience.

In another possible implementation, the method may further include: obtaining, by the electronic device, a second preview video corresponding to a second video application, when the first screen further includes an identifier of the second video application; and playing the second preview video in the first video preview window, or displaying a second video preview window in the first screen, and playing the second preview video in the second video preview window. In this way, when the interface displayed on the touchscreen of the electronic device includes icons of a plurality of video applications, the electronic device may play a preview video corresponding to each video application.

In another possible implementation, the method may further include: obtaining, by the electronic device, a second preview video corresponding to a second video application and a third preview video corresponding to a third video application, when the application suggestion window of the leftmost screen further includes an identifier of the second video application and an identifier of the third video application, adding a second video preview window to the leftmost screen, and playing the second preview video in the second video preview window; receiving, by the electronic device, a sliding operation; and in response to the sliding operation, adding, by the electronic device, a third video preview window to the leftmost screen, and playing the third preview video in the third video preview window. In this way, when the application suggestion window that is of the leftmost screen and that is displayed on the touchscreen of the electronic device includes icons of a plurality of video applications, the electronic device may play a preview video corresponding to each video application. It is convenient for a user to select, based on the played preview video, a video application that the user likes, thereby improving user experience.

In another possible implementation, the identifier may be an icon of an application or a widget (widget) of an application.

In another possible implementation, the first video preview window includes one or more of the following controls: a pause/play button, a previous button, a next button, a close button, and a maximize button. In this way, the user may perform operations on different controls in a window, thereby further improving an intelligent interaction capability of the electronic device with the user.

In another possible implementation, the first video preview window is displayed in a blank area of the first screen, where the blank area is an area in which the first screen does not include a control. In this way, another control displayed in the first screen is not blocked, and it is convenient for the user to perform an operation on the another control.

In another possible implementation, the method may further include: if the electronic device does not receive an operation in a process of playing the first preview video, closing, by the electronic device, the first video preview window after playing of the first preview video is completed. In this way, in the process of playing the preview video, if the electronic device does not receive a user operation, it may be predicted that a using intention of opening the leftmost screen by the user is not to use the video application. In this case, after the playing of the preview video is completed, the electronic device may close the video preview window, thereby further improving an intelligent interaction capability of the electronic device with the user.

In another possible implementation, the method may further include: receiving, by the electronic device, a second operation, in response to the second operation, closing the first video preview window, and displaying a second screen on the touchscreen of the electronic device; and receiving, by the electronic device, a third operation, and in response to the third operation, redisplaying the first screen, and redisplaying the first video preview window in the first screen.

In another possible implementation, the electronic device continues playing the first preview video in the redisplayed first video preview window, or replays the first preview video in the redisplayed first video preview window.

In another possible implementation, the first preview video is a preview of related content of a video recommended by the first video application to the user, or the first preview video is a preview of related content of a video subscribed by the user in the first video application. In this way, it may be convenient for the user to know a video subscribed by the user or a currently popular video.

In another possible implementation, the method may further include: receiving, by the electronic device, a first switching operation, and, obtaining, by the electronic device, a fourth preview video in response to the first switching operation, where the fourth preview video is a preview video that corresponds to the first video application and that is different from the first preview video, or the fourth preview video is a preview video corresponding to the second video application, and playing, by the electronic device, the fourth preview video in the first preview video window. In this way, the electronic device plays another preview video based on the user operation, so that the user can watch more preview videos when the video application is not displayed in the foreground, thereby further improving user experience.

In another possible implementation, the method may further include: receiving, by the electronic device, a second switching operation, and, closing, by the electronic device, the first video preview window in response to the second switching operation. In this way, when the user does not want to watch a preview video, the user may close the video preview window displayed in the interface at any time by performing the second switching operation.

In another possible implementation, the method may further include: receiving, by the electronic device, a third switching operation, and in response to the third switching operation, opening, by the electronic device, the first video application, and continuing playing the first preview video by using the first video application. In this way, the user may open, by performing the third switching operation, a video application corresponding to a current preview video. This is convenient to continue browsing related content of the preview video, thereby improving user experience.

In another possible implementation, the method may further include: sending, by the electronic device, a request message to a video server, where the request message is used to request, from the video server, a preview video corresponding to the first video application, and receiving, by the electronic device, the preview video that corresponds to the first video application and that is from the video application server. In this way, the electronic device sends the request message to the video server to obtain the preview video corresponding to the video application, to prepare for displaying, to the user, the preview video corresponding to the video application.

According to a third aspect of this application, an electronic device is provided. The electronic device may include:

an input unit, configured to receive a first operation; a display unit, configured to: display a leftmost screen in response to the first operation obtained by the input unit; a determining unit, configured to determine that a first video application has a target permission when an application suggestion window of the leftmost screen displayed by the display unit includes an icon of the first video application, where the target permission is a permission for playing a video preview corresponding to a video application, when the video application is not displayed in a foreground; and an obtaining unit, configured to obtain a first preview video corresponding to the first video application, where the display unit is further configured to: add a first video preview window to the leftmost screen, and play, in the first video preview window, the first preview video obtained by the obtaining unit; the input unit is further configured to receive a second operation; the display unit is further configured to: in response to the second operation received by the input unit, close the first video preview window in the leftmost screen, display a page of a home screen, redisplay the first video preview window in a blank area of the page of the home screen when the page that is of the home screen and that is displayed by the display unit includes the icon of the first video application and an icon of a second video application, and continue playing the first preview video, where the blank area is an area in which the page of the home screen does not include a control.

In a possible implementation, the determining unit is further configured to determine that the second video application does not have the target permission.

In another possible implementation, the determining unit is further configured to: determine that the second video application has the target permission, and determine that use frequency of the first video application is greater than use frequency of the second video application, a priority of the first video application is higher than a priority of the second video application, or a last use time of the first video application is later than a last use time of the second video application.

In another possible implementation, the obtaining unit is further configured to obtain a second preview video corresponding to the second video application; the display unit is further configured to play, in the first video preview window, the second preview video obtained by the obtaining unit, or display a second video preview window in the blank area of the page of the home screen, and play, in the second video preview window, the second preview video obtained by the obtaining unit.

In another possible implementation, the first video preview window added to the leftmost screen is adjacent to the application suggestion window.

According to a fourth aspect of this application, an electronic device is provided. The electronic device may include:

an input unit, configured to receive a first operation; a display unit, configured to: display a first screen in response to the first operation obtained by the input unit, where the first screen is a page of a home screen or a leftmost screen; and an obtaining unit, configured to obtain a first preview video corresponding to a first video application when the first screen displayed by the display unit includes an identifier of the first video application, where the display unit is further configured to display a first video preview window in the first screen, and play, in the first video preview window, the first preview video obtained by the obtaining unit.

In a possible implementation, the obtaining unit is specifically configured to: obtain a user profile, where the user profile includes at least one of a time and a place at which a user uses a video application, determine that the user profile indicates that the user opens the first screen to use the video application, and obtain the first preview video when the first screen includes the identifier of the first video application.

In another possible implementation, when the first screen is the leftmost screen, the obtaining unit is specifically configured to obtain the first preview video when an application suggestion window of the leftmost screen includes the identifier of the first video application.

In another possible implementation, the electronic device further includes a determining unit, configured to: when the first screen further includes an identifier of the second video application, determine that the first video application has a target permission and a second video application does not have the target permission. The target permission is a permission for playing a video preview corresponding to a video application, when the video application is not displayed in a foreground.

In another possible implementation, the electronic device further includes the determining unit, configured to: determine that both the first video application and the second video application have the target permission when the first screen further includes the identifier of the second video application, and determine that use frequency of the first video application is greater than use frequency of the second video application, a priority of the first video application is higher than a priority of the second video application, or a last use time of the first video application is later than a last use time of the second video application, where the target permission is a permission for playing a video preview corresponding to a video application, when the video application is not displayed in a foreground.

In another possible implementation, the obtaining unit is further configured to: obtain a second preview video corresponding to a second video application, when the first screen further includes an identifier of the second video application; and the display unit is further configured to play, in the first video preview window, the second preview video obtained by the obtaining unit, or display a second video preview window in the first screen, and play, in the second video preview window, the second preview video obtained by the obtaining unit.

In another possible implementation, the obtaining unit is further configured to obtain a second preview video corresponding to a second video application and a third preview video corresponding to a third video application, when the application suggestion window of the leftmost screen further includes an identifier of the second video application and an identifier of the third video application; the display unit is further configured to: add a second video preview window to the leftmost screen, and play the second preview video in the second video preview window; the input unit is further configured to receive a sliding operation; and the display unit is further configured to: in response to the sliding operation obtained by the input unit, add a third video preview window to the leftmost screen, and play the third preview video in the third video preview window.

In another possible implementation, the identifier may be an icon of an application or a widget of an application; or the first video preview window includes one or more of the following controls: a pause/play button, a previous button, a next button, a close button, and a maximize button; or the first video preview window is displayed in a blank area of the first screen, where the blank area is an area in which the first screen does not include a control.

According to a fifth aspect of this application, an electronic device is provided. The electronic device may include one or more processors, a memory, a touchscreen, and one or more computer programs. The foregoing components may be connected by using one or more communications buses. The touchscreen may include a touch-sensitive surface and a display. The one or more computer programs are stored in the memory, and are configured to be executed by the one or more processors. The one or more computer programs include an instruction. When the one or more processors execute the instruction, the touchscreen is configured to: receive a first operation, and display a leftmost screen according to an instruction of the processor in response to the first operation. The processor is configured to: determine that a first video application has a target permission when an application suggestion window of the leftmost screen includes an icon of the first video application, where the target permission is a permission for playing a video preview corresponding to a video application, when the video application is not displayed in a foreground, and obtain a first preview video corresponding to the first video application. The touchscreen is further configured to: add to display a first video preview window in the leftmost screen according to the instruction of the processor, and play the first preview video in the first video preview window. The touchscreen is further configured to: receive a second operation, in response to the second operation, close the first video preview window in the leftmost screen according to the instruction of the processor, display a page of a home screen, and redisplay the first video preview window in a blank area of the page of the home screen according to the instruction of the processor when the page of the home screen includes an icon of the first video application and an icon of a second video application, and continue playing the first preview video, where the blank area is an area in which the page of the home screen does not include a control.

In a possible implementation, the processor is further configured to determine that the second video application does not have the target permission.

In another possible implementation, the processor is further configured to: determine that the second video application has the target permission, and determine that use frequency of the first video application is greater than use frequency of the second video application, a priority of the first video application is higher than a priority of the second video application, or a last use time of the first video application is later than a last use time of the second video application.

In another possible implementation, the processor is further configured to obtain a second preview video corresponding to the second video application; and the touchscreen is further configured to: play the second preview video in the first video preview window according to the instruction of the processor, or display a second video preview window in the blank area of the page of the home screen according to the instruction of the processor, and play the second preview video in the second video preview window.

In another possible implementation, the first video preview window added to the leftmost screen is adjacent to the application suggestion window.

According to a sixth aspect of this application, an electronic device is provided. The electronic device may include one or more processors, a memory, a touchscreen, and one or more computer programs. The foregoing components may be connected by using one or more communications buses. The touchscreen may include a touch-sensitive surface and a display. The one or more computer programs are stored in the memory, and are configured to be executed by the one or more processors. The one or more computer programs include an instruction. When the one or more processors execute the instruction, the touchscreen is configured to: receive a first operation, and display a first screen according to an instruction of the processor in response to the first operation, where the first screen is a page of a home screen or a leftmost screen. The processor is configured to obtain a first preview video corresponding to a first video application when the first screen includes an identifier of the first video application. The touchscreen is further configured to display a first video preview window in the first screen according to the instruction of the processor, and play the obtained first preview video in the first video preview window.

In a possible implementation, the processor is specifically configured to: obtain a user profile, where the user profile includes at least one of a time and a place at which a user uses a video application, determine that the user profile indicates that the user opens the first screen to use the video application, and obtain the first preview video when the first screen includes the identifier of the first video application.

In another possible implementation, when the first screen is the leftmost screen, the processor is specifically configured to obtain the first preview video when an application suggestion window of the leftmost screen includes the identifier of the first video application.

In another possible implementation, the processor is further configured to: when the first screen further includes an identifier of the second video application, determine that the first video application has a target permission and a second video application does not have the target permission, where the target permission is a permission for playing a video preview corresponding to a video application, when the video application is not displayed in a foreground.

In another possible implementation, the processor is further configured to: determine that both the first video application and the second video application have the target permission when the first screen further includes the identifier of the second video application, and determine that use frequency of the first video application is greater than use frequency of the second video application, a priority of the first video application is higher than a priority of the second video application, or a last use time of the first video application is later than a last use time of the second video application, where the target permission is a permission for playing a video preview corresponding to a video application, when the video application is not displayed in a foreground.

In another possible implementation, the processor is further configured to obtain a second preview video corresponding to a second video application, when the first screen further includes an identifier of the second video application; and the touchscreen is further configured to: play the second preview video in the first video preview window according to an instruction of the processor, or display a second video preview window in the first screen according to the instruction of the processor, and play the second preview video in the second video preview window.

In another possible implementation, the processor is further configured to obtain a second preview video corresponding to a second video application and a third preview video corresponding to a third video application, when an application suggestion window of the leftmost screen further includes an identifier of the second video application and an identifier of the third video application; and the touchscreen is further configured to: add a second video preview window to the leftmost screen according to the instruction of the processor, and play the second preview video in the second video preview window. The touchscreen is further configured to: receive a sliding operation; and in response to the sliding operation, add a third video preview window to the leftmost screen according to the instruction of the processor, and play the third preview video in the third video preview window.

In another possible implementation, the identifier may be an icon of an application or a widget of an application; or the first video preview window includes one or more of the following controls: a pause/play button, a previous button, a next button, a close button, and a maximize button; or the first video preview window is displayed in a blank area of the first screen, and the blank area is an area in which the first screen does not include a control.

According to a seventh aspect of this application, a computer storage medium is provided, including a computer instruction. When the computer instruction is run on an electronic device, the electronic device is enabled to perform the video preview method according to any one of the first aspect or the possible implementations of the first aspect.

According to an eighth aspect of this application, a computer storage medium is provided, including a computer instruction. When the computer instruction is run on an electronic device, the electronic device is enabled to perform the video preview method according to any one of the second aspect or the possible implementations of the second aspect.

According to a ninth aspect of this application, a computer program product is provided. When the computer program product is run on a computer, the computer is enabled to perform the video preview method according to any one of the first aspect or the possible implementations of the first aspect.

According to a tenth aspect of this application, a computer program product is provided. When the computer program product is run on a computer, the computer is enabled to perform the video preview method according to any one of the second aspect or the possible implementations of the second aspect.

According to an eleventh aspect of this application, a video preview apparatus is provided. The apparatus has functions of implementing behavior of the electronic device in the implementations of the foregoing method. The functions may be implemented by hardware, or may be implemented by hardware executing corresponding software. The hardware or the software includes one or more modules corresponding to the foregoing functions.

It should be understood that descriptions of technical features, technical solutions, beneficial effects, or similar words in this application do not imply that all features and advantages can be implemented in any single embodiment. On the contrary, it may be understood that descriptions of the features or the beneficial effects mean that at least one embodiment includes a specific technical feature, technical solution, or beneficial effect. Therefore, the descriptions of the technical features, the technical solutions, or the beneficial effects in this specification do not necessarily refer to a same embodiment. Further, the technical features, the technical solutions, and the beneficial effects described in the embodiments may be combined in any proper manner. A person skilled in the art may understand that an embodiment may be implemented without one or more specific technical features, technical solutions, or beneficial effects in a specific embodiment. In other embodiments, additional technical features and beneficial effects may further be identified in a specific embodiment that does not reflect all the embodiments.

BRIEF DESCRIPTION OF DRAWINGS

FIG. 5A(1) to FIG. 5C(3) are schematic diagrams of some graphical user interfaces displayed on an electronic device according to some embodiments of this application;

DESCRIPTION OF EMBODIMENTS

The following terms "first" and "second" are merely used for a purpose of description, and shall not be understood as an indication or implication of relative importance or implicit indication of the number of indicated technical features. Therefore, a feature limited by "first" or "second" may explicitly or implicitly include one or more features. In the description of the embodiments of this application, unless otherwise stated, "a plurality of" means two or more than two.

An embodiment of this application provides a video preview method. The method may be applied to an electronic device on which a video application is installed. The video preview method can implement preview of related content in the video application when a user does not open the video application, thereby reducing complexity of a user operation, improving using efficiency of the electronic device, and implementing efficient interaction between the electronic device and the user.

Figure 1:
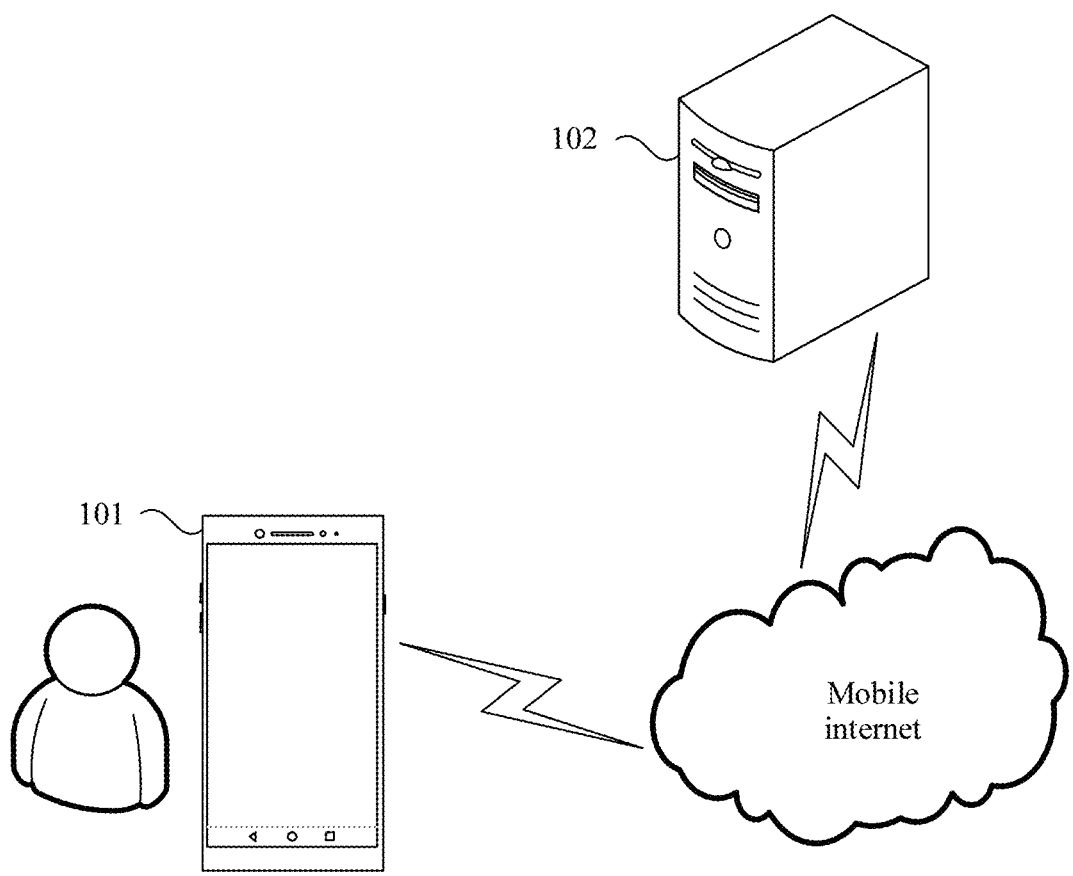
FIG. 1 is a simplified schematic diagram of a system architecture according to an embodiment of this application.

FIG. 1 is a simplified schematic diagram of a system architecture according to an embodiment of this application. As shown in FIG. 1, the system architecture may include an electronic device 101 and a video server 102.

Figure 3:
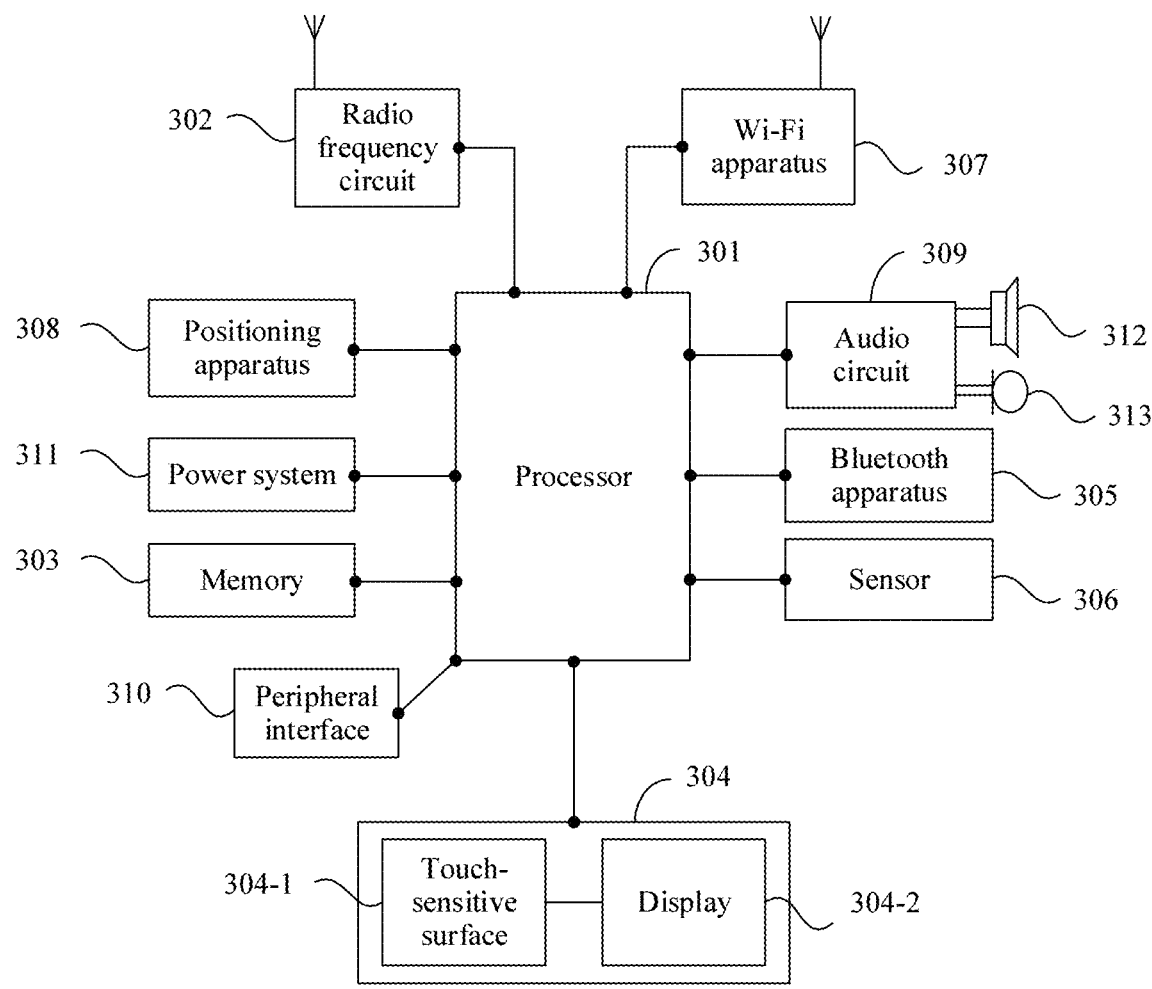
FIG. 3 is a schematic diagram of a hardware structure of a mobile phone according to an embodiment of this application.

A specific structure of the electronic device 101 is shown in FIG. 3, and is specifically described in the following embodiments.

The video server 102 may be a server of a content provider that provides services such as video on demand and live broadcast.

The electronic device 101 and the video server 102 may exchange data by using a mobile internet. For example, the electronic device 101 may send a request message to the video server 102 by using the mobile internet, to request video content of one or more videos, and the video server 102 returns corresponding video content and the like to the electronic device 101 by using the mobile internet.

Video applications, such as Netflix, Youku, YouTube, and Huawei Video, are installed in the electronic device 101. When the user opens a desktop or a leftmost screen of the electronic device 101, if an identifier of a video application, for example, an icon of the video application, is displayed on the desktop or the leftmost screen, the electronic device 101 may display a preview video on the desktop or the leftmost screen. Therefore, it is convenient for the user to view, and the user does not need to tap the icon of the video application to open a home screen of the video application to view the preview video.

The leftmost screen may be an interface entered by the user by sliding rightward from the desktop (or referred to as the home screen) or a lock screen. The interface may display an application and a function that are frequently used by the user, a subscribed service and information, and the like, thereby facilitating quick browsing and use of the user. It may be understood that "leftmost screen" is merely a term used in the embodiments of this application, a meaning indicated by the "leftmost screen" has been recorded in the embodiments of this application, and a name of the "leftmost screen" does not constitute any limitation on the embodiments of this application. In addition, in some other embodiments, the "leftmost screen" may also be referred to as another name such as a "desktop assistant", a "shortcut menu", or a "widget set interface".

The video server 102 is mainly configured to: determine a preview video corresponding to a video application, and provide the preview video corresponding to the video application to the electronic device 101.

The video application in this embodiment of this application may be an application program that can provide functions such as video browsing, playing, and downloading to the user.

The following describes the electronic device 101, a graphical user interface (GUI for short) used for the electronic device 101, and an embodiment in which the electronic device 101 is used. In some embodiments of this application, the electronic device 101 may be a portable electronic device that further includes other functions such as personal digital assistant and/or music player functions, for example, a mobile phone, a tablet, or a wearable device (for example, a smartwatch) having a wireless communications function. An example embodiment of the portable electronic device includes but is not limited to a portable electronic device using iOS®, Android®, Microsoft®, or another operating system. The portable electronic device may alternatively be another portable electronic device such as a laptop computer (Laptop) having a touch-sensitive surface (for example, a touch panel). It should be further understood that in some other embodiments of this application, the electronic device 101 may alternatively be a desktop computer having a touch-sensitive surface (for example, a touch panel) other than a portable electronic device.

One or more video applications may be installed in the electronic device 101 in this embodiment of this application, and an icon of a video application installed in the electronic device 101 is displayed on a desktop displayed on a touchscreen of the electronic device 101. In addition, one or more other applications such as a calculator, a browser, an email client, and a weather application may further be installed in the electronic device 101 in this embodiment of this application, and icons of these applications may also be displayed on the desktop displayed on the touchscreen of the electronic device 101. The application (for example, the video application) in this embodiment of this application may be an embedded application (that is, a system application of the electronic device 101), or may be a downloadable application. The embedded application is an application program provided as a part of implementation of the electronic device 101. The downloadable application is an application program that may provide an internet protocol multimedia subsystem (Internet Protocol Multimedia Subsystem, IMS) connection of the downloadable application. The downloadable application may be an application installed in the electronic device 101 in advance, or may be a third-party application downloaded by a user and installed in the electronic device 101.

The desktop displayed on the touchscreen of the electronic device 101 may also be referred to as a home screen (home screen), and may include one or more pages (page). The one or more pages may be used to display a control (control element). For example, the one or more pages display an icon of an application installed in the electronic device 101, for example, an icon of the video application or an icon of the browser. For another example, the one or more pages display a widget or an icon of a folder. In addition, the electronic device 101 stores a correspondence between an icon of an application and a page, and the electronic device 101 may determine, based on the correspondence, a page in which the icon of the application is specifically displayed.

Figure 2A:
FIG. 2A and FIG. 2B are schematic diagrams of a graphical user interface of each page of a home screen according to an embodiment of this application.
Figure 2B:
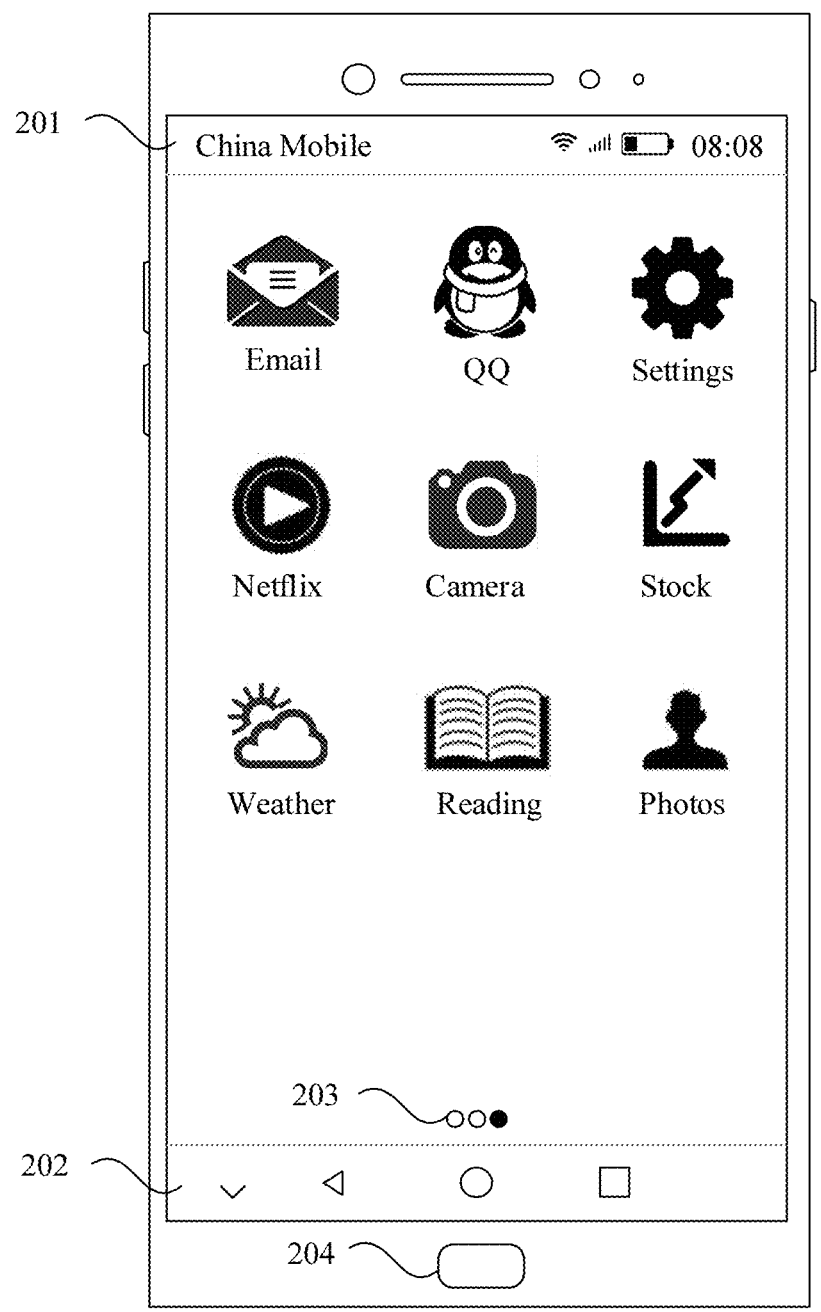

For example, FIG. 2A and FIG. 2B show a series of graphical user interfaces (graphical user interface, GUI) displayed on the touchscreen of the electronic device 101. The GUIs are home screens of the electronic device 101. A size of the touchscreen of the electronic device 101 is usually fixed, and only a limited quantity of controls can be displayed on the touchscreen of the electronic device 101. A control is a GUI element, is a software component, is included in an application program, and controls all data processed by the application program and interaction operations of the data. A user may interact with the control through direct manipulation (direct manipulation), to read or edit information about the application program. Usually, controls may include visual interface elements such as an icon, a button, a menu, a tab, a text box, a dialog box, a status bar, a navigation bar, and a widget.

The home screen of the electronic device 101 may be divided into a plurality of pages. For example, a GUI displayed in FIG. 2A may be referred to as a first page (the first page) of the home screen, and a GUI displayed in FIG. 2B may be referred to as a second page (the second page) of the home screen. Each page may include different controls. By using FIG. 2A as an example, the GUI may be the first page in the home screen of the electronic device 101. The first page is displayed on the touchscreen of the electronic device 101, and specifically includes a status bar 201, a hideable navigation bar 202, a home screen indicator 203, and various icons. For example, applications such as WeChat®, a browser, a calculator, Netflix®, an email, and weather are installed in the electronic device 101, and the first page includes two rows and three columns of icons, that is, six icons: an icon of WeChat®, an icon of the browser, an icon of a microblog, an icon of the calculator, an icon of Taobao®, and an icon of a store. When a finger (or a stylus, or the like) of the user touches a position on the touchscreen, the electronic device 101 may open a graphical user interface of an application corresponding to an icon in response to the touch event. The home screen indicator 203 is used to prompt the user a specific page that is currently displayed. It may be understood that in some other embodiments, the home screen may further include a dock bar. The dock bar may include icons of applications that are commonly used, and the like.

In addition, the leftmost screen displayed on the touchscreen of the electronic device 101 may also be configured to display a control, for example, display an icon of an application installed in the electronic device 101. Usually, the leftmost screen may display an icon of an application commonly used by the user. The leftmost screen may be an interface entered by the user by sliding rightward from the home screen or may be an interface entered by the user by sliding rightward from a lock screen.

Figure 2C:
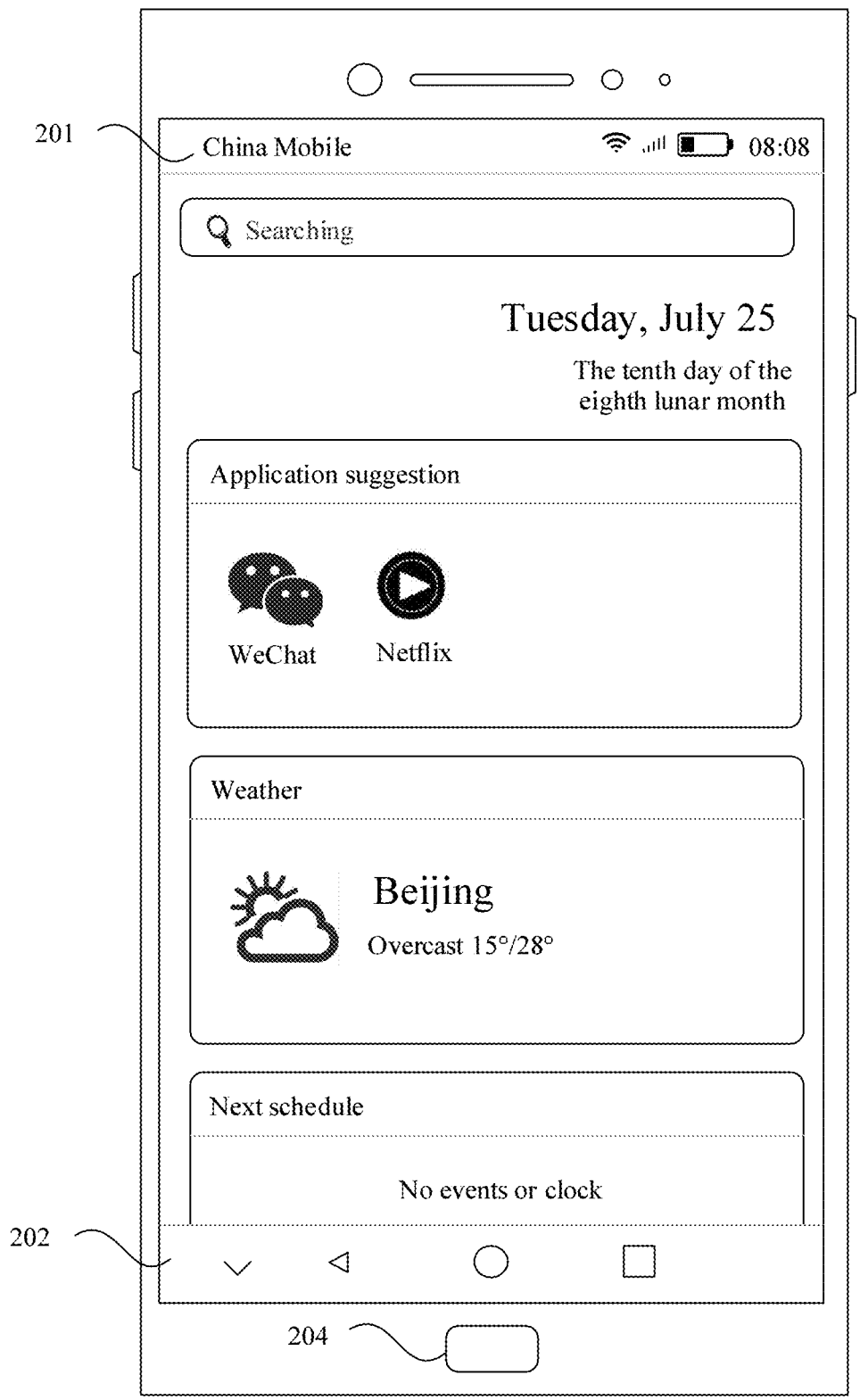
FIG. 2C is a schematic diagram of a graphical user interface of a leftmost screen according to an embodiment of this application.

FIG. 2C shows an example GUI displayed on the touchscreen of the electronic device 101. The GUI is the leftmost screen of the electronic device 101, and may be configured to display the icon of the application commonly used by the user, and a subscribed service and subscribed information. For example, applications commonly used by the user include Netflix and WeChat. A GUI displayed in FIG. 2C may be referred to as the leftmost screen of the electronic device 101. The leftmost screen is displayed on the touchscreen of the electronic device 101, and specifically includes a status bar 201, a hideable navigation bar 202, and various widgets, for example, an application suggestion widget including the icon of WeChat and the icon of Netflix, a widget including a weather reminder subscribed by the user, and a widget including a schedule reminder.

In some other embodiments, as shown in FIG. 2A to FIG. 2C, the electronic device 101 may further include a home button 204. The home button 204 may be a physical key or a virtual key. The home button 204 is configured to receive an instruction of the user, and return a currently displayed GUI to the home screen, thereby displaying a specific page in the home screen. In this way, it may be convenient for the user to view the home screen at any time. The instruction may be specifically an operation instruction of pressing the home button 204 once by the user, or may be an operation instruction of successively pressing the home button 204 twice within a short time by the user, or may be an operation instruction of pressing and holding the home button 204 within a predetermined time by the user. In some other embodiments of this application, the home button 204 may further be integrated with a fingerprint reader, so that when the user presses the home button 204, the fingerprint reader subsequently performs fingerprint collection and recognition.

Referring to FIG. 3, in this embodiment of this application, the electronic device 101 provided in this embodiment of this application is described by using an example in which the electronic device 101 is a mobile phone. A person skilled in the art may understand that the mobile phone shown in FIG. 3 is merely an example, and does not constitute any limitation on the mobile phone. In addition, the mobile phone may include more or fewer components than those shown in the figure, or two or more components may be combined, or a different component deployment may be used. The components shown in FIG. 3 may be implemented in hardware that includes one or more signal processing and/or application-specific integrated circuits, in software, or in a combination of hardware and software.

As shown in FIG. 3, a mobile phone may specifically include components such as a processor 301, a radio frequency (Radio Frequency, RF) circuit 302, a memory 303, a touchscreen 304, a Bluetooth apparatus 305, one or more sensors 306, a wireless fidelity (Wireless Fidelity, Wi-Fi) apparatus 307, a positioning apparatus 308, an audio circuit 309, a peripheral interface 310, and a power system 311. The components may perform communication by using one or more communications buses or signal lines (not shown in FIG. 3).

The following specifically describes the components of the mobile phone with reference to FIG. 3.

The processor 301 is a control center of the mobile phone, and is connected to various parts of the mobile phone by using various interfaces and lines. By running or executing an application program (Application, APP) stored in the memory 303, and invoking data and an instruction that are stored in the memory 303, the processor 301 performs various functions and data processing of the mobile phone. In some embodiments, the processor 301 may include one or more processing units. The processor 301 may further be integrated with an application processor and a modem processor. The application processor mainly processes an operating system, a user interface, an application program, and the like. The modem processor mainly processes wireless communication. It may be understood that the foregoing modem processor may alternatively not be integrated into the processor 301. For example, the processor 301 may be a Kirin 960 chip manufactured by Huawei Technologies Co., Ltd.

The radio frequency circuit 302 may be configured to receive and send a radio signal during information receiving and sending or a call. Specifically, the radio frequency circuit 302 may receive downlink data of a base station and then send the downlink data to the processor 301 for processing. In addition, the radio frequency circuit 302 sends uplink-related data to the base station. Usually, the radio frequency circuit 302 includes but is not limited to an antenna, at least one amplifier, a transceiver, a coupler, a low noise amplifier, a duplexer, and the like. In addition, the radio frequency circuit 302 may further communicate with another device through wireless communication. The wireless communication may use any communications standard or protocol, including but not limited to a global system for mobile communications, a general packet radio service, code division multiple access, wideband code division multiple access, long term evolution, an email, a short messaging service, and the like.

The memory 303 is configured to store an application program and data. The processor 301 runs the application program and the data that are stored in the memory 303, to implement various functions and data processing of the mobile phone. The memory 303 mainly includes a program storage area and a data storage area. The program storage area may store an operating system, an application program required by at least one function (such as a sound playback function or an image playing function). The data storage area may store data (such as audio data and an address book) created based on use of the mobile phone. In addition, the memory 303 may include a high-speed random access memory, and may further include a non-volatile memory such as a magnetic disk storage device, a flash memory device, another volatile solid storage device, or the like. The memory 303 may store various operating systems, for example, an iOS® operating system developed by Apple Inc. and an ANDROID® operating system developed by Google Inc.

The touchscreen 304 may include a touch-sensitive surface 304-1 and a display 304-2. The touch-sensitive surface 304-1 (for example, a touch panel) may collect a touch event of a user of the mobile phone on or near the mobile phone (for example, an operation of the user on or near the touch-sensitive surface 304-1 by using any suitable object such as a finger or a stylus), and send collected touch information to another device such as the processor 301. The touch event of the user near the touch-sensitive surface 304-1 may be referred to as a floating touch. The floating touch may indicate that the user does not need directly touch the touch panel, to select, move, or drag a target (such as an icon), and the user only needs be located near the electronic device, to perform wanted functions. In an application scenario of the floating touch, terms such as "touch" and "contact" do not implicitly mean to directly touch the touchscreen, but to be near or close to the touchscreen. The touch-sensitive surface 304-1 that can perform floating touch may be implemented by using a capacitive touch-sensitive surface, an infrared sensing touch-sensitive surface, an ultrasonic touch-sensitive surface, and the like. The touch-sensitive surface 304-1 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 301. The touch controller may further receive and execute an instruction sent by the processor 301. In addition, the touch-sensitive surface 304-1 may be implemented by using various types, such as a resistive type, a capacitance type, an infrared type, and a surface acoustic wave type. The display (also referred to as a display) 304-2 may be configured to display information input by the user or information provided to the user, and various menus of the mobile phone. The display 304-2 may be configured by using a liquid crystal display, an organic light-emitting diode, or the like. The touch-sensitive surface 304-1 may cover the display 304-2. After detecting a touch event on or near the touch-sensitive surface 304-1, the touch-sensitive surface 304-1 transfers the touch event to the processor 301, to determine a type of the touch event. Then, the processor 301 may provide a corresponding visual output on the display 304-2 based on the type of the touch event. Although in FIG. 3, the touch-sensitive surface 304-1 and the display 304-2 are used as two separate components to implement input and output functions of the mobile phone, in some embodiments, the touch-sensitive surface 304-1 and the display 304-2 may be integrated to implement the input and output functions of the mobile phone. It may be understood that the touchscreen 304 is formed by stacking a plurality of layers of materials. In this embodiment of this application, only the touch-sensitive surface (layer) and the display (layer) are presented, and another layer is not recorded in this embodiment of this application. In addition, in some other embodiments of this application, the touch-sensitive surface 304-1 may cover the display 304-2, and a size of the touch-sensitive surface 304-1 is greater than a size of the display 304-2, so that the touch-sensitive surface 304-1 covers the entire display 304-2. Alternatively, the touch-sensitive surface 304-1 may be configured at a front facet of the mobile phone in a form of a full panel. To be specific, touch of the user on the front facet of the mobile phone may be sensed by the mobile phone. In this way, full touch experience of the front facet of the mobile phone may be implemented. In some other embodiments, the touch-sensitive surface 304-1 is configured at the front facet of the mobile phone in the form of the full panel, and the display 304-2 may also be configured at the front facet of the mobile phone in the form of the full panel. In this way, a bezel-less structure may be implemented at the front facet of the mobile phone.

The mobile phone may further include a Bluetooth apparatus 305. The Bluetooth apparatus 305 is configured to implement data exchange between the mobile phone and another short distance electronic device (for example, a mobile phone or a smartwatch). In the embodiments of this application, the Bluetooth apparatus may be an integrated circuit, a Bluetooth chip, or the like.

The mobile phone may further include at least one sensor 306 such as an optical sensor, a motion sensor, and another sensor. Specifically, the optical sensor may include an ambient light sensor and a proximity sensor. The ambient light sensor may adjust luminance of the display of the touchscreen 304 based on brightness of ambient light. The proximity sensor may switch off a power supply of the display when the mobile phone is moved to an ear. As one type of motion sensor, an acceleration sensor may detect magnitudes of accelerations in various directions (usually on three axes), may detect a magnitude and a direction of gravity when static, and may be applied to an application that recognizes an attitude of the mobile phone (for example, switching between landscape orientation and portrait orientation, a related game, and magnetometer posture calibration), and functions related to vibration recognition (such as a pedometer and a knock), and the like. For other sensors such as a gyroscope, a barometer, a hygrometer, a thermometer, and an infrared sensor that may be further configured in the mobile phone, details are not described herein.

In the embodiments of this application, the mobile phone may further have a fingerprint recognition function. For example, a fingerprint reader is configured at a back facet of the mobile phone (for example, below a rear-facing camera), or a fingerprint reader is configured at a front facet of the mobile phone (for example, below the touchscreen 304). In addition, the fingerprint recognition function may also be implemented by configuring the fingerprint reader in the touchscreen 304. To be specific, the fingerprint reader may be integrated with the touchscreen 304 to implement the fingerprint recognition function of the mobile phone. In this case, the fingerprint reader may be configured in the touchscreen 304, and may be a part of the touchscreen 304, or may be configured in the touchscreen 304 in another manner. In addition, the fingerprint reader may further be implemented as a full panel fingerprint reader. Therefore, the touchscreen 304 may be considered as a panel that may perform fingerprint collection at any position. The fingerprint reader may send the collected fingerprint to the processor 301, so that the processor 301 performs processing (for example, fingerprint verification) on the fingerprint. In this embodiment of this application, a main component of the fingerprint reader is a fingerprint sensor. The fingerprint sensor may use any type of sensing technologies, including but not limited to an optical sensing technology, a capacitive sensing technology, a piezoelectric sensing technology, an ultrasonic wave sensing technology, and the like.

In addition, for a specific technical solution of integrating the fingerprint sensor into the touchscreen in this embodiment of this application, refer to patent application No. US 2015/0036065 A1, entitled "FINGERPRINT SENSOR IN ELECTRONIC DEVICE", announced by the United States Patent and Trademark Office, all controls of the apparatus are combined in the embodiments of this application by reference.

The Wi-Fi apparatus 307 is configured to provide network access that complies with a Wi-Fi related standard protocol, to the mobile phone. The mobile phone may access a Wi-Fi access point by using the Wi-Fi apparatus 307, to help the user receive and send an email, browse a web page, access streaming media, and so on. The Wi-Fi apparatus 307 provides wireless broadband internet access to the user. In some other embodiments, the Wi-Fi apparatus 307 may also be used as a Wi-Fi wireless access point, and may provide Wi-Fi network access to another electronic device.

The positioning apparatus 308 is configured to provide a geographical location to the mobile phone. It may be understood that the positioning apparatus 308 may be specifically a receiver of a positioning system such as a global positioning system (Global Positioning System, GPS) or a BeiDou Navigation Satellite System. After receiving the geographical location sent by the positioning system, the positioning apparatus 308 sends the information to the processor 301 for processing, or sends the information to the memory 303 for storage. In some other embodiments, the positioning apparatus 308 may be a receiver of an assisted global positioning system (Assisted Global Positioning System, AGPS). The AGPS is a running manner in which GPS positioning is performed with assistance and cooperation. The AGPS may accelerate a positioning speed of the mobile phone by using a signal of a base station in cooperation with a signal of a GPS satellite. In the AGPS system, the positioning apparatus 308 may obtain positioning assistance by communicating with an assisted positioning server (for example, a positioning server of the mobile phone). The AGPS system is used as an assisted server, to assist the positioning apparatus 308 in completing ranging and positioning services. In this case, the assisted positioning server communicates with the electronic device, for example, the positioning apparatus 308 (namely, the GPS receiver) of the mobile phone, by using a wireless communications network, to provide positioning assistance.

The audio circuit 309, a speaker 312, and a microphone 313 may provide an audio interface between the user and the mobile phone. The audio circuit 309 may convert received audio data into an electrical signal and transmit the electrical signal to the speaker 312. The speaker 312 converts the electrical signal into a sound signal for output. In addition, the microphone 313 converts a collected sound signal into an electrical signal. The audio circuit 309 receives the electrical signal, converts the electrical signal into audio data, and outputs the audio data to the RF circuit 302 to send the audio data to, for example, another mobile phone, or outputs the audio data to the memory 303 for further processing.

The peripheral interface 310 is configured to provide various interfaces to external input/output devices (for example, a keyboard, a mouse, an external display, an external memory, and a subscriber identity module card). For example, the peripheral interface 310 is connected to the mouse by using a universal serial bus interface, and is connected, by using a metal contact on a card slot of a subscriber identity module (SIM) card, to the subscriber identity module (Subscriber Identity Module, SIM) card provided by a telecommunications operator. The peripheral interface 310 may be configured to couple the external input/output peripheral devices to the processor 301 and the memory 303.

The mobile phone may further include a power supply apparatus 311 (such as a battery and a power management chip) for supplying power to the components. The battery may be logically connected to the processor 301 by using the power management chip, thereby implementing functions such as charging, discharging, and power consumption management by using the power supply apparatus 311.

Although not shown in FIG. 3, the mobile phone may further include a camera (a front-facing camera and/or a rear-facing camera), a flash, a mini-sized projector, a near field communication (Near Field Communication, NFC) apparatus, and the like. Details are not described herein. The following embodiments may be implemented in the electronic device (for example, the mobile phone) having the foregoing hardware.

The following specifically describes the video preview method provided in the embodiments of this application with reference to the accompanying drawings.

Figure 4:
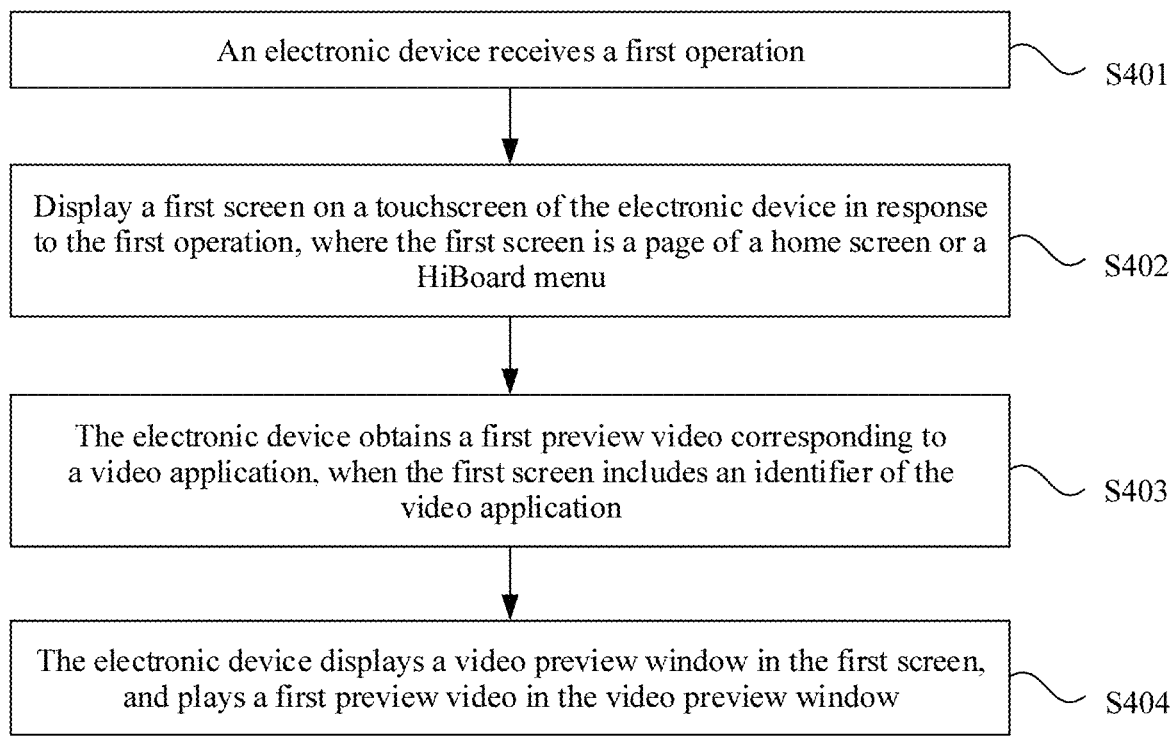
FIG. 4 is a schematic flowchart of a video preview method according to an embodiment of this application.

FIG. 4 is a schematic flowchart of a video preview method according to an embodiment of this application. As shown in FIG. 4, the method may include S401 to S405.

S401. An electronic device receives a first operation.

For example, the first operation may be specifically an unlocking operation performed by a user on the electronic device, a sliding operation performed by the user on a home screen of the electronic device, a trigger operation performed by the user on an interface of an application to return to the home screen, a trigger operation performed by the user on a home button, a trigger operation performed by the user on a home (Home) key included in a navigation bar, and the like. Alternatively, the first operation may be an operation automatically performed by the electronic device when a specific condition is satisfied, instead of an operation performed by the user on the electronic device.

S402. Display a first screen on a touchscreen of the electronic device in response to the first operation, where the first screen is a page of a home screen or a leftmost screen.

S403. The electronic device obtains a first preview video corresponding to a video application, when the first screen includes an identifier of the video application.

In some embodiments of this application, the identifier of the video application may be an icon or a widget. For ease of description, in this embodiment of this application, an example in which the identifier of the video application is an icon is used for description.

S404. The electronic device displays a video preview window in the first screen, and plays the first preview video in the video preview window.

After displaying the first screen on the touchscreen in response to the first operation, the electronic device may determine whether the first screen includes the identifier of the video application. When determining that the first screen includes the identifier of the video application, the electronic device may obtain the first preview video corresponding to the video application. For example, the electronic device may select a preview video from a pre-stored video preview set as the first preview video, or may further send a request message to a video server, so that the video server returns the preview video to the electronic device in response to the request message. After obtaining the first preview video, the electronic device may display the first preview video in the first screen for the user to view. For example, the electronic device may generate and display the video preview window in the first screen, and play the first preview video in the video preview window. In this way, after the user opens the first screen that includes the identifier of the video application, the electronic device may play the preview video in the first screen, and the user does not need to open the video application. In this way, the user can be attracted to focus on the video application and use the video application, and an intelligent interaction capability of the electronic device with the user is also improved.

In some other embodiments of this application, the first preview video may be one preview video in a preview video set corresponding to the video application.

In some other embodiments of this application, the electronic device may store a preview video set corresponding to one or more video applications. The preview video set may include one or more preview videos. The preview video may be a preview of related content of a video recommended by the video server to the user, or may be a preview of related content of a video subscribed by the user, for example, a trailer of a video. The format of the preview video may be a graphics interchange format (Graphics Interchange Format, GIF), an MOV format, an MP4 format, or the like. This is not specifically limited in this embodiment of this application.

Figure 6A:
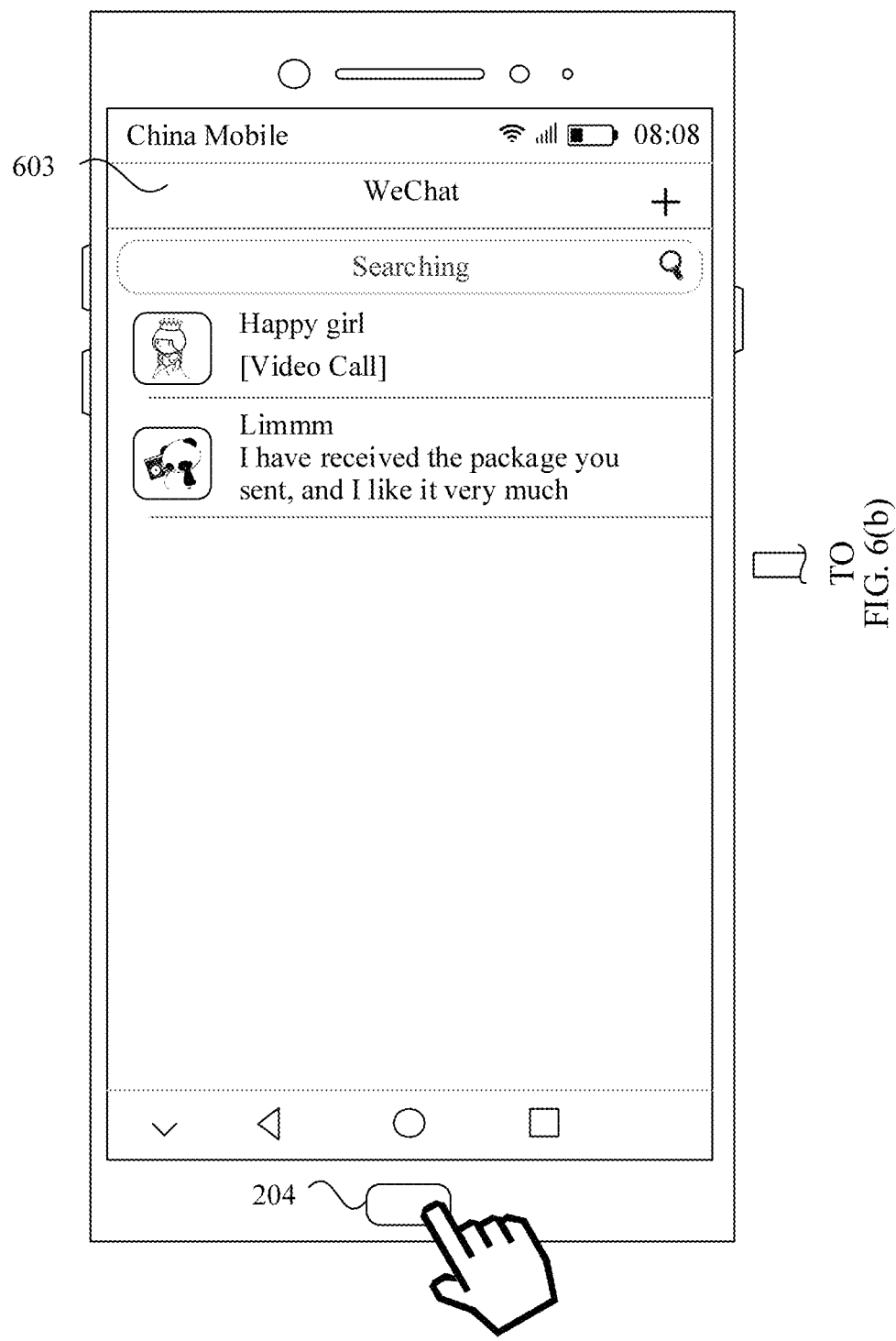
FIG. 6(a) to FIG. 6(c) are schematic diagrams of some graphical user interfaces displayed on an electronic device according to some other embodiments of this application.
Figure 6B:
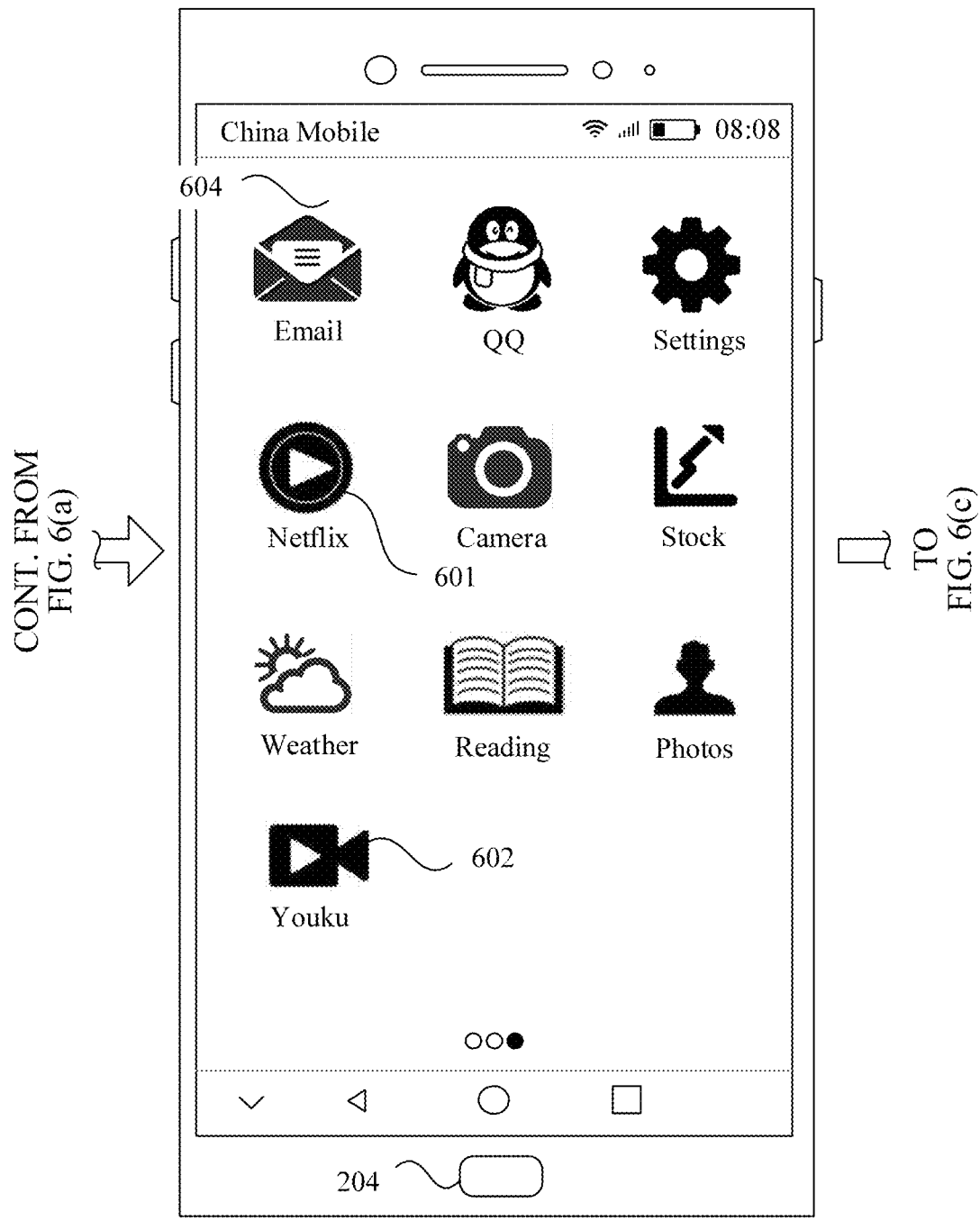
Figure 6C:
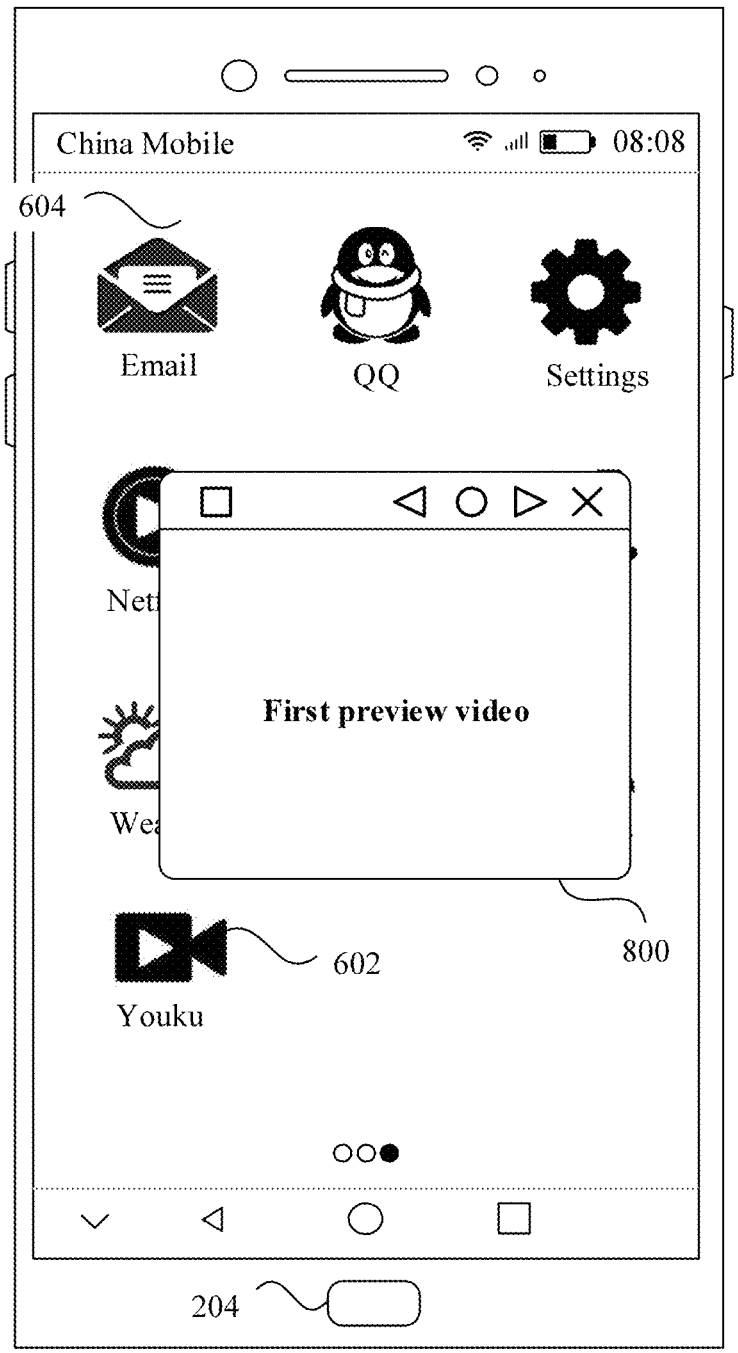
Figure 7A:
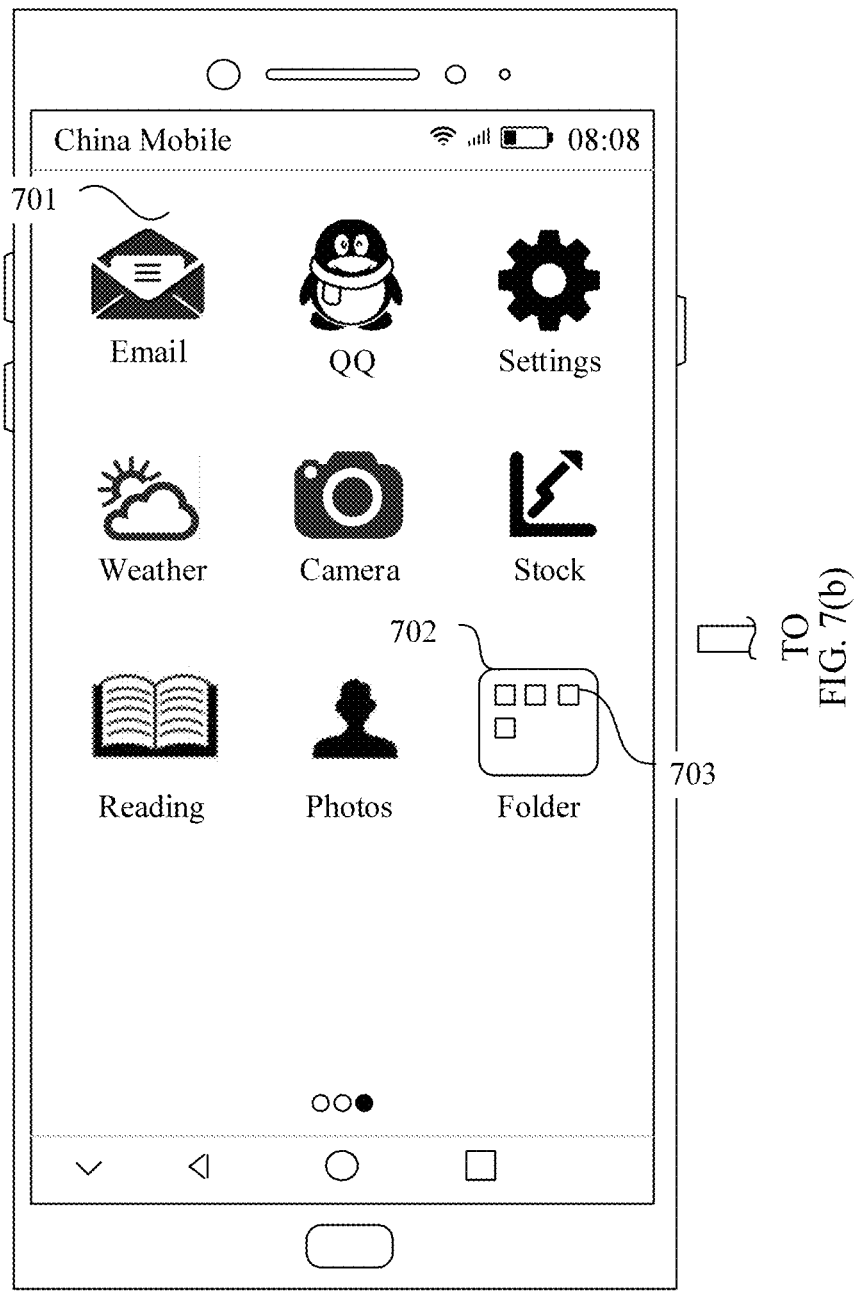
FIG. 7(a) and FIG. 7(b) are schematic diagrams of some graphical user interfaces displayed on an electronic device according to some other embodiments of this application.
Figure 7B:
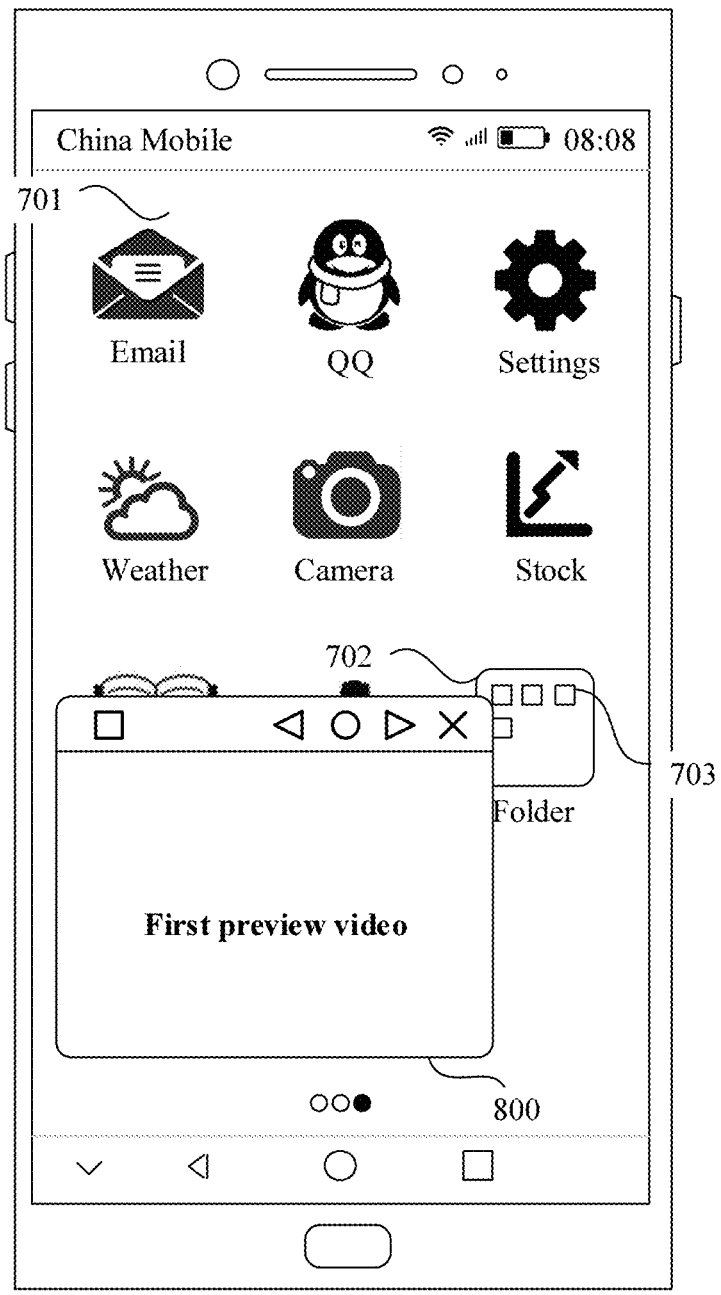

For example, FIG. 5 to FIG. 7(a) and FIG. 7(b) show a series of example GUIs displayed on the touchscreen of the electronic device. The GUIs are examples of interfaces for playing the preview video in the first screen displayed on the touchscreen of the electronic device in different scenarios. A GUI shown in FIG. 5A(1) to FIG. 5A(3) is an example of an interface for playing the preview video in a page that is of the home screen and that is displayed on the touchscreen of the electronic device, when any preview video in a video preview set is selected as a to-be-played preview video. A GUI shown in FIG. 5B(1) to FIG. 5B(3) is an example of an interface for playing the preview video in the leftmost screen displayed on the touchscreen of the electronic device, when a preview video in the video preview set is selected as a to-be-played preview video based on a rule. A GUI shown in FIG. 5C(1) to FIG. 5C(3) is an example of an interface for playing, in the leftmost screen displayed on the touchscreen of the electronic device, preview videos corresponding to a plurality of video applications, when the interface includes icons of the plurality of video applications. A GUI shown in FIG. 6(a) to FIG. 6(c) is an example of an interface for playing the preview video in a page that is of the home screen and that is displayed on the touchscreen of the electronic device, when the interface includes icons of a plurality of video applications. A GUI shown in FIG. 7(a) and FIG. 7(b) is an example of an interface for playing the preview video in the interface displayed on the touchscreen of the electronic device, when an icon of a video application is included in a folder. The following specifically describes the examples in FIG. 5 to FIG. 7(a) and FIG. 7(b).

In some other embodiments of this application, a video application A (for example, Netflix) and a video application B (for example, Youku) are installed in the electronic device. Preview video sets that correspond to Netflix and Youku and that are stored in the electronic device may be shown in Table 1.

TABLE 1

| | |
|---|---|
| Netflix | Trailer of the first Episode of the fourth Season of Peppa Pig |
| | Trailer of the eleventh Episode of A Christmas Carol |
| | Trailer of A Better tomorrow |
| | Trailer of Rise of the Planet of Apes |
| Youku | Trailer of the first phase of The Voice of China |
| | Trailer of Thor 3 |
| | Trailer of the fifth Episode of the third Season of The Blacklist |

It may be learned from Table 1 that a preview video set corresponding to Netflix includes a trailer of the first episode of the fourth season of Peppa Pig, a trailer of the eleventh episode of A Christmas Carol, a trailer of A Better tomorrow, and a trailer of Rise of the Planet of Apes. A preview video set corresponding to Youku includes a trailer of the first phase of The Voice of China, a trailer of Thor 3, and a trailer of the fifth episode of the third season of The Blacklist. The preview video set may be a preview of related content of a video in a watching history of a corresponding video application used by the user, or a preview of related content of a video recommended by the video server to the user. In this way, it can be convenient for the user to follow a program or learn of a currently popular movie and television program.

During specific implementation, the electronic device may select any preview video that is in the preview video set and that corresponds to the video application, as the first preview video.

For example, as shown in FIG. 5A(1) to FIG. 5A(3), with reference to FIG. 2B, an example in which the first operation is an unlocking operation performed by the user on the electronic device, and the first screen is a page of the home screen of the electronic device is used for detailed description. As shown in FIG. 5A(1), the user enters an unlocking password in an unlocking interface 501 of the electronic device. If the unlocking password entered by the user is correct, the electronic device displays a first screen 502 shown in FIG. 5A(2). The first screen 502 may be a second page of the home screen, and the second page includes an icon 503 of Netflix. In this case, the electronic device determines the icon 503 of Netflix in the second page currently displayed on the touchscreen. As shown in FIG. 5A(3), the electronic device displays a video preview window 800 in the second page in response to the foregoing determining operation. The video preview window 800 is specifically shown in FIG. 8, and is described in detail in the following embodiments. The video preview window 800 corresponds to Netflix, and may be considered as a dynamic widget of Netflix. The dynamic widget is displayed on the touchscreen only in a specific situation. For example, the dynamic widget is displayed on the touchscreen when the user heavily presses a blank area of the touchscreen or in a specific time period (for example, 19:00 to 23:30), or the dynamic widget may be not displayed on the touchscreen after a specific action is performed. In some other embodiments of this application, the electronic device may display, on the touchscreen, a relationship between the video application such as Netflix and the video preview window, for example, prompt, in a gradient animation manner, the user that the video preview window corresponds to Netflix. In this way, the user may easily know a video application from which the preview video displayed in the video preview window comes, thereby further improving user experience.

In some embodiments of this application, the electronic device may select any preview video that is in the preview video set and that corresponds to Netflix, as the first preview video. As shown in Table 1, the first preview video selected by the electronic device may be the trailer of the eleventh episode of A Christmas Carol. In addition, as shown in FIG. 5A(3), the electronic device may play the trailer in the video preview window 800.

In some other embodiments of this application, the electronic device may alternatively select the first preview video from the video preview set according to a set rule. For example, when preview videos that are in the preview video set and that correspond to the video application have different priorities, the electronic device may select a preview video that has a highest priority in the preview video set and that corresponds to the video application, as the first preview video.

For example, as shown in FIG. 5B(1) to FIG. 5B(3), with reference to FIG. 2A and FIG. 2C, an example in which the first operation is a sliding operation performed by the user on the home screen displayed on the touchscreen of the electronic device and the first screen is the leftmost screen of the electronic device is used for specific description. As shown in FIG. 5B(1), the user slides rightward on the first page of the home screen displayed on the touchscreen of the electronic device. The electronic device displays a first screen 504 shown in FIG. 5B(2), in response to the sliding operation of the user. The first screen 504 may be the leftmost screen, and the leftmost screen includes an icon 505 of Netflix. If the electronic device determines the icon 505 of Netflix in the leftmost screen currently displayed on the touchscreen, as shown in FIG. 5B(3), the electronic device adds the video preview window 800 to the leftmost screen in response to the foregoing determining operation. The video preview window 800 is specifically shown in FIG. 8, and is specifically described in the following embodiments. The video preview window 800 corresponds to Netflix, and may be considered as a dynamic widget of Netflix. In some other embodiments, the electronic device displays the video preview window 800 in the leftmost screen in response to the determining operation only when determining that an application suggestion widget of the leftmost screen includes the icon 505 of Netflix.

The video preview window 800 may be displayed at a position close to a widget including the icon 505 of Netflix, for example, a position of the application suggestion widget. For example, as shown in FIG. 5B(3), the video preview window 800 is displayed at a location adjacent to the application suggestion widget including the icon 505 of Netflix. In this way, it may be convenient for the user to view. An original widget in the leftmost screen, for example, a widget including a weather reminder subscribed by a user and a widget including a schedule reminder, may be displayed below the video preview window 800 in an original display sequence. In some other embodiments, after the video preview window 800 is closed, the original widget in the leftmost screen may be displayed at an original display position. For example, after the video preview window 800 is closed, the original widget in the leftmost screen may return to the display manner shown in FIG. 5B(2). With reference to Table 1, for example, priorities of preview videos that are in the preview video set and that correspond to Netflix are as follows: A priority of the trailer of the first episode of the fourth season of Peppa Pig is higher than a priority of the trailer of the eleventh episode of A Christmas Carol; the priority of the trailer of the eleventh episode of A Christmas Carol is higher than that a priority of the trailer of A Better tomorrow; and the priority of the trailer of A Better tomorrow is higher than a priority of the trailer of Rise of the Planet of the Apes. The electronic device may select a preview video that has a highest priority in the preview video set and that corresponds to Netflix, as the first preview video. To be specific, the first preview video is the trailer of the first episode of the fourth season of Peppa Pig. In addition, as shown in FIG. 5B(3), the electronic device may display the trailer in the video preview window 800. The priority of the preview video that is in the preview video set and that corresponds to the video application may be determined by sorting the preview videos.

In some other embodiments of this application, if determining that the first screen includes an identifier of a video application, the electronic device only needs to obtain the first preview video corresponding to the video application. In some other embodiments of this application, if determining that the first screen includes identifiers of a plurality of (two or more) video applications, the electronic device may obtain a preview video corresponding to each video application. In addition, the electronic device may play, in a same video preview window, the obtained preview video corresponding to each video application. In some other embodiments, the electronic device may alternatively generate a video preview window for each video application, and play a preview video corresponding to the video application. For example, a first video preview window corresponding to Netflix is displayed in the first screen, and a second video preview window corresponding to Youku is also displayed in the first screen. The electronic device respectively plays, in the two windows, preview videos corresponding to the two video applications. In some other embodiments of this application, if determining that the first screen includes identifiers of a plurality of (two or more) video applications, the electronic device may first determine video applications, in the plurality of video applications, that have a target permission. The target permission may be a permission for playing the video preview corresponding to the video application, when the video application is not displayed in a foreground, and then a first preview video corresponding to one of the video applications is obtained, according to a set rule, from one or more of the plurality of video applications that have the target permission. In some embodiments, the video application may be a video application with the highest priority in the foregoing video applications with the target permission. In some other embodiments, the video application may be a video application that is most frequently used in the foregoing video applications with the target permission. In some other embodiments, alternatively, the video application may be a video application, in the foregoing video applications with the target permission, whose last use time is closest to a current moment.

For example, in some other embodiments of this application, the electronic device may configure, as a permission of the Android system, a function of playing the video preview by a video application that is not displayed in the foreground, and the video application may apply for the permission, to implement the function of playing the video preview by the video application that is not displayed in the foreground.

For example, as shown in FIG. 5C(1) to FIG. 5C(3), an example in which the first screen includes identifiers of three video applications and the electronic device plays preview videos corresponding to the three video applications is used. With reference to FIG. 2A and FIG. 2C, Netflix, Youku, and Huawei Video are installed in the electronic device. An example in which the first operation is a sliding operation performed by the user on a home screen displayed on the touchscreen of the electronic device and the first screen is the leftmost screen of the electronic device is used for detailed description. The user slides rightward on the first page of the home screen displayed on the touchscreen of the electronic device. The electronic device displays a first screen 506 shown in FIG. 5C(1), in response to the sliding operation of the user. The first screen 506 may be the leftmost screen, the application suggestion window of the leftmost screen includes an icon 507 of Netflix, an icon 508 of Youku, and an icon 509 of Huawei Video. If determining the icon 507 of Netflix, the icon 508 of Youku, and the icon 509 of Huawei Video in the application suggestion window of the leftmost screen currently displayed on the touchscreen, the electronic device may display, in the leftmost screen, video preview windows corresponding to the three video applications, in response to the foregoing determining operation. However, because the size of the touchscreen is fixed, and only a limited quantity of controls can be displayed, as shown in FIG. 5C(2), the electronic device may first add a video preview window 800-1 and a video preview window 800-2 to the leftmost screen. The video preview window 800-1 and the video preview window 800-2 are specifically the video preview window 800 shown in FIG. 8, and are specifically described in the following embodiments. The video preview window 800-1 corresponds to Netflix, and may be considered as a dynamic widget of Netflix. The video preview window 800-2 corresponds to Youku, and may be considered as a dynamic widget of Youku. The electronic device plays, in the video preview window 800-1, an obtained preview video 1 corresponding to Netflix, and plays, in the video preview window 800-2, an obtained preview video 2 corresponding to Youku. In this case, the user may perform an upward sliding operation on the leftmost screen. As shown in FIG. 5C(3), the electronic device adds a video preview window 800-3 to the leftmost screen in response to the sliding operation of the user, the video preview window 800-3 is specifically the video preview window 800 shown in FIG. 8, and is specifically described in the following embodiments. The video preview window 800-3 corresponds to Huawei Video, and may be considered as a dynamic widget of Huawei Video. The electronic device plays, in the video preview window 800-3, an obtained preview video 3 corresponding to Huawei Video.

For example, as shown in FIG. 6(a) to FIG. 6(c), an example in which a video application with a highest priority is selected from video applications with the target permission is used. For example, Netflix and Youku are installed in the electronic device. With reference to FIG. 2B, an example in which the first operation is a trigger operation performed by the user on the home button 204, the first screen is a page of the home screen of the electronic device, and the page includes an icon 601 of Netflix and an icon 602 of Youku is used for detailed description. As shown in FIG. 6(a), an interface currently displayed on the touchscreen of the electronic device is a home screen 603 of WeChat. If the user wants to return to the home screen, the user presses the home button 204. The electronic device displays a first screen 604 shown in FIG. 6(b), in response to the pressing operation of the user. The first screen 604 may be a second page of the home screen, and the second page includes the icon 601 of Netflix and the icon 602 of Youku. The electronic device determines the icon 601 of Netflix and the icon 602 of Youku in the second page currently displayed on the touchscreen. The electronic device may first determine whether Netflix and Youku and that have the target permission. For example, if both Netflix and Youku have the target permission, the electronic device may further determine whether Netflix or Youku has a higher priority, and obtain a first preview video corresponding to a video application with a higher priority. For example, if a priority of Youku is higher than a priority of Netflix, the electronic device may obtain a first preview video corresponding to Youku, and as shown in FIG. 6(c), the electronic device displays the video preview window 800 in the second page in response to the foregoing determining operation. The video preview window 800 is specifically shown in FIG. 8, and is specifically described in the following embodiments. The video preview window 800 corresponds to Youku, and may be considered as a dynamic widget of Youku in this case. As shown in FIG. 6(c), the obtained first preview video corresponding to Youku is played in the video preview window 800.

In some other embodiments of this application, if an icon that is of a video application and that is included in the first screen is included in a folder, when displaying the first screen on the touchscreen, the electronic device may obtain the first preview video corresponding to the video application, and display the first preview video. Alternatively, when the folder including the icon of the video application is expanded, the electronic device may obtain and display the first preview video corresponding to the video application.

For example, as shown in FIG. 7(a) and FIG. 7(b), an example in which the first operation is an unlocking operation performed by the user on the electronic device and the first screen is a page of the home screen of the electronic device is used for detailed description. The user enters an unlocking password in an unlocking interface of the electronic device. In addition, if the unlocking password entered by the user is correct, the electronic device displays a first screen 701 shown in FIG. 7(a). The first screen 701 may be a page of the home screen, the page includes a folder 702, and the folder 702 includes an icon 703 of Netflix. In this case, the electronic device determines the icon 703 of Netflix in the folder 702 of the page currently displayed on the touchscreen. As shown in (b) in FIG. 7(a) and FIG. 7(b), the electronic device displays the video preview window 800 in the first screen 701 in response to the foregoing determining operation. The video preview window 800 is specifically shown in FIG. 8, and is specifically described in the following embodiments. The video preview window 800 corresponds to Netflix, and may be considered as a dynamic widget of Netflix. In addition, as shown in FIG. 7(b), the electronic device may play, in the video preview window 800, the obtained first preview video corresponding to Netflix. In addition, the electronic device may alternatively not display the video preview window 800 when determining the icon 703 of Netflix in the folder 702 of the page currently displayed on the touchscreen, but displays the video preview window 800 when determining that the user opens the folder 702 in which the icon 703 of Netflix is located, in other words, the folder 702 is expanded.

In some other embodiments of this application, that the electronic device obtains the first preview video corresponding to the video application, and displays the first preview video in the first screen may be specifically: The home screen (or the leftmost screen) of the electronic device may invoke a first interface, to request a preview video from the video application. For example, a definition of the first interface may be etpreviewvideo (width, height, type, videoid, serial number), where width indicates the width of a display position, height indicates the height of the display position, type indicates a type of the requested preview video, for example, a preview of a recommended video or a preview of a video subscribed by a user, videoid indicates an identifier of the preview video, and serial number indicates that a previous or next preview video of the preview video identified by videoid is requested. In addition, when the electronic device requests the preview video for the first time, two parameters: videoid and serial number in the first interface may be empty. After receiving the request, the video application screens out the first preview video from a stored preview video set corresponding to the video application. After sifting out the first preview video, the video application transfers the first preview video to the home screen (or the leftmost screen) of the electronic device. After receiving the first preview video, the home screen (or the leftmost screen) may generate a video preview window by using a view (view) mechanism of Android, and play the first preview video in the video preview window.

In some other embodiments of this application, after displaying the first screen on the touchscreen, the electronic device may further obtain a user profile (User Profile), to determine a using intention of opening the first screen by the user at different time, at different places, or in different scenarios, for example, whether to use the video application. When the using intention of the user is to use the video application, the electronic device obtains the first preview video corresponding to the video application, when the first screen includes an identifier of the video application, and displays the video preview window in the first screen, to play the first preview video.

The user profile may usually include one or more tags of the user, for example, at least one of a time, a place, or the like of using the video application by the user. The user profile may reflect a full picture of information about the user. The electronic device may predict current possible behavior or preference of the user by using the user profile.

For example, the user profile of the user indicates that the user uses the video application from 19:00 to 23:30. In this case, after displaying the first screen on the touchscreen, the electronic device may obtain the user profile, and may determine, based on the user profile, that the using intention when the user opens the first screen at any time from 19:00 to 23:30 is to use the video application. To be specific, when the user opens the first screen at any time from 19:00 to 23:30, if the first screen includes the identifier of the video application, the electronic device obtains the first preview video corresponding to the video application, and displays the first preview video in the first screen. When the user opens the first screen at a time beyond 19:00 to 23:30, even if the first screen includes the identifier of the video application, the electronic device performs regular display. To be specific, the electronic device does not obtain the first preview video corresponding to the video application or display the first preview video in the first screen.

Further, when displaying the first preview video in the first screen, the electronic device may further display an operation button, so that the user may switch, play, pause, stop, or maximize a played preview video as required.

In some embodiments, in a process of playing the first preview video, if the electronic device does not receive any operation such as switching, playing, pausing, stopping, or maximizing the first preview video that is played, after playing of the first preview video is completed, the electronic device may automatically play a next preview video of the first preview video, or may automatically close the video preview window configured to play the preview video. Alternatively, when the first screen includes an identifier of another video application, the electronic device may further automatically play a preview video corresponding to the another video application.

In some other embodiments, in the process of playing the first preview video, if receiving a notification message, the electronic device may display the notification message, and automatically close the video preview window configured to play the preview video, or the electronic device may continue playing the first preview video while displaying the notification message. In some other embodiments, the electronic device may further choose, based on whether the notification message is related to the played preview video or whether the video preview window configured to play the preview video is stick, whether to continue playing the preview video or close the video preview window configured to play the preview video. For example, in the process of playing the first preview video, the electronic device receives a notification message. If the video preview window configured to play the preview video is stick, the electronic device may continue playing the first preview video while displaying the received notification message. If the video preview window configured to play the preview video is not stick, the electronic device may display the received notification message, and close the video preview window configured to play the preview video.

Figure 8:
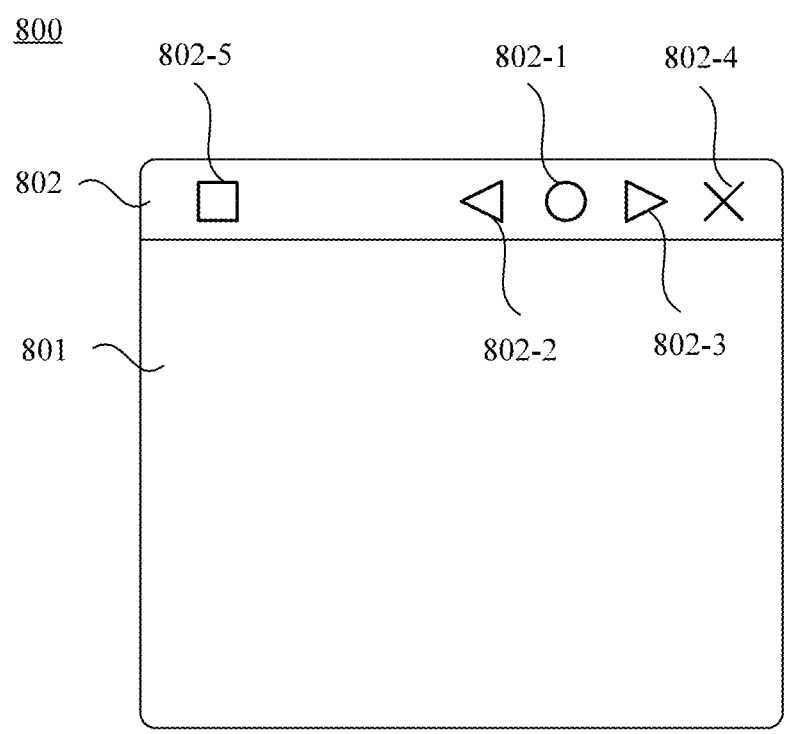
FIG. 8 is a schematic diagram of some other graphical user interfaces displayed on an electronic device according to some other embodiments of this application.

For example, as shown in FIG. 8, the video preview window 800 generated by the electronic device may include a preview video playback area 801 and an operation area 802. The preview video playback area 801 is configured to play the preview video. The operation area 802 may include at least one of the following buttons: a "pause/play" button 802-1 configured to pause/play a preview video displayed in the preview video playback area 801, a "previous" button 802-2 configured to switch to a previous preview video of a current preview video, a "next" button 802-3 configured to switch to a next preview video of the current preview video, a "close" button 802-4 configured to close the video preview window 800, and a "maximize" button 802-5 configured to maximize the preview video displayed in the preview video playback area 801. In some other embodiments, the video preview window 800 corresponds to the video application, and may be considered as a dynamic widget of the video application. The dynamic widget may present a dynamic effect, and is displayed on the touchscreen only in a specific case, or may not be displayed on the touchscreen after a specific action is performed.

Figure 9A:
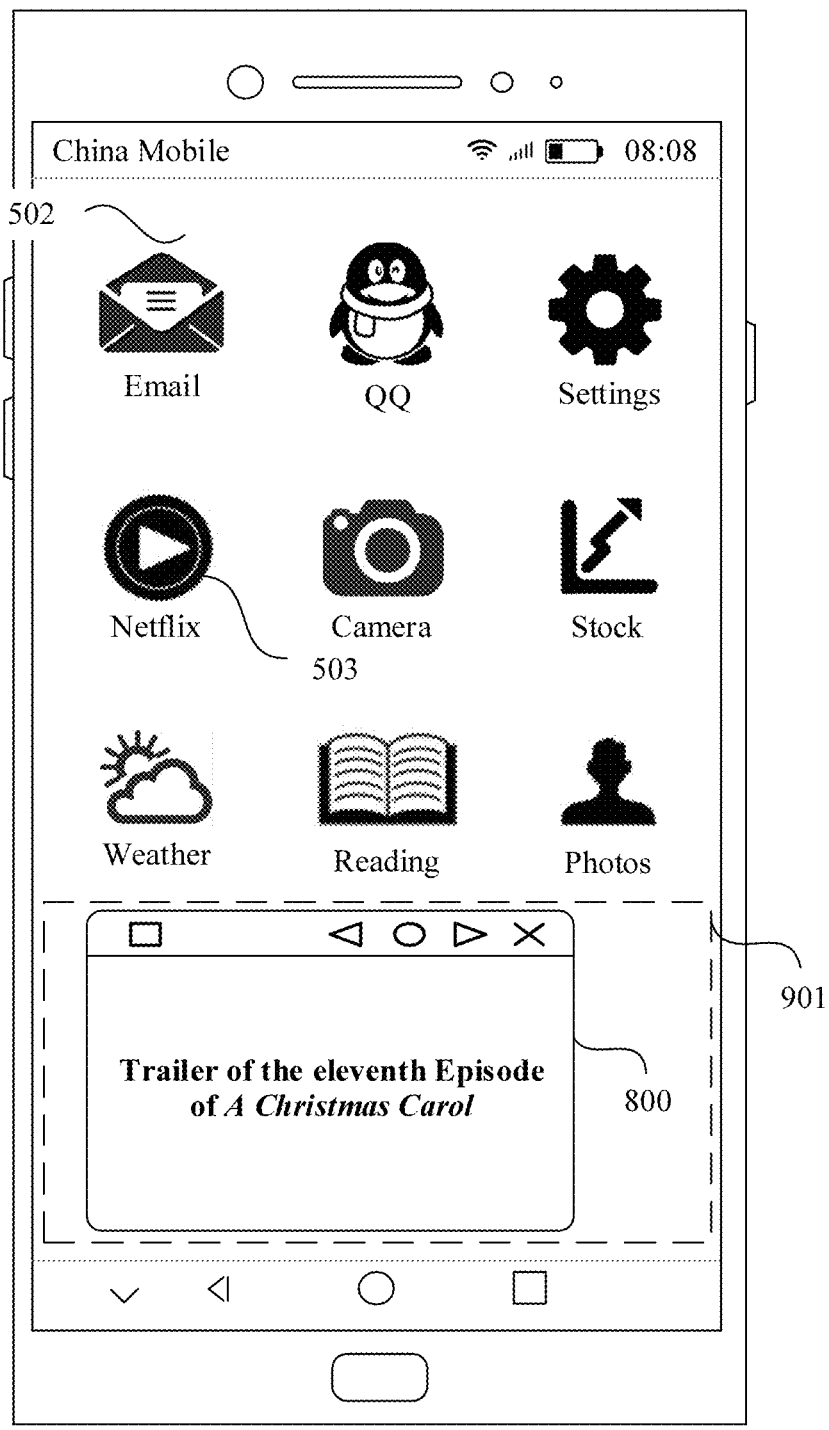
FIG. 9A and FIG. 9B are schematic diagrams of some other graphical user interfaces displayed on an electronic device according to some other embodiments of this application.
Figure 9B:
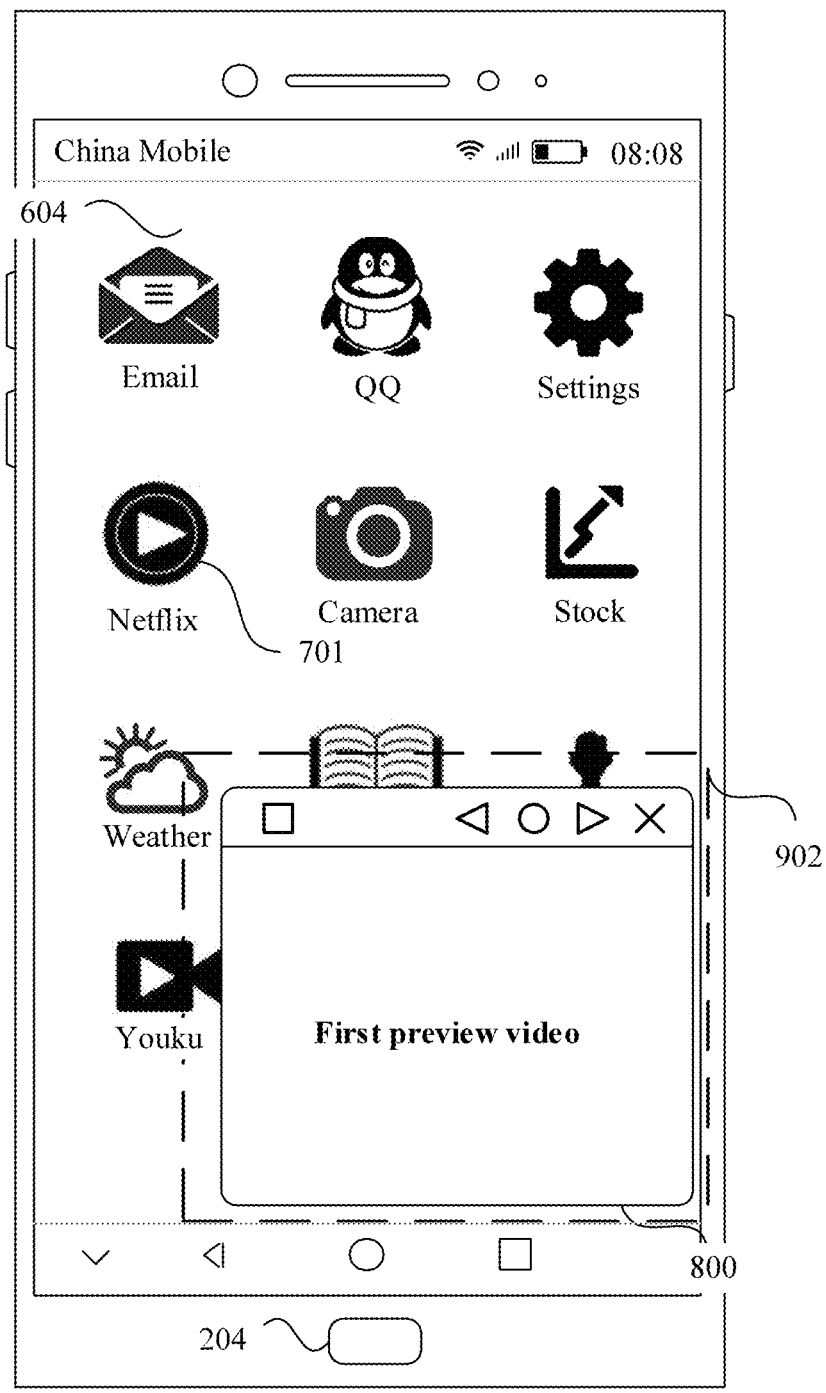

It should be noted that in some other embodiments of this application, the video preview window 800 may be displayed at any position of the first screen. A display position of the video preview window 800 in the first screen is not specifically limited in this embodiment of this application. For example, with reference to FIG. 5A(1) to FIG. 5A(3), as shown in FIG. 9A, the video preview window 800 may be displayed in a blank area 901 of the first screen. The blank area 901 may be an area in which the first screen does not include any control. In this way, another control displayed in the first screen is not blocked, and it is convenient for the user to operate another control. Alternatively, for example, with reference to FIG. 6(a) to FIG. 6(c), as shown in FIG. 9B, the video preview window 800 may be displayed in a lower right corner area 902 of the first screen. In this way, it may be convenient for the user to perform an operation such as switching, playing, or pausing the video preview, on the video preview window 800.

In some other embodiments of this application, a second operation may be performed in a process in which the user watches the preview video displayed in the first screen. The second operation may be a sliding operation in the first screen or a pressing operation on the home button. The electronic device receives the second operation, closes the video preview window in response to the second operation, and displays a second screen on the touchscreen of the electronic device. For example, the user is watching a preview video displayed in the leftmost screen. In this case, the user performs a leftward sliding operation in the leftmost screen. In response to the leftward sliding operation, the electronic device closes the video preview window displayed in the leftmost screen, and displays the first page of the home screen on the touchscreen of the electronic device. When the first page of the home screen of the electronic device includes the identifier of the video application, the electronic device may further display the video preview window in the first page of the home screen, and play, in the video preview window, the preview video corresponding to the video application included in the first page of the home screen. In some other embodiments, when the first page of the home screen includes icons of a plurality of (two or more) video applications, if an icon in the icons of the plurality of video applications and an icon included in the leftmost screen belong to a same video application, the electronic device may play, in the video preview window of the first page, a preview video of a video application whose icon is the same as that in the leftmost screen. In some other embodiments, the electronic device may further select, based on whether the plurality of video applications have the target permission and/or according to a set rule, a preview video of a video application for playing. In some other embodiments, the electronic device may alternatively play preview videos corresponding to the plurality of video applications. The preview videos corresponding to the plurality of video applications may be played in a same video preview window, or may be played in different video preview windows. When the first page of the home screen is displayed on the touchscreen of the electronic device, the user may further perform a third operation, to trigger the electronic device to return to the first screen. In this case, the first screen redisplayed by the electronic device may include the video preview window. The video preview window included in the first screen redisplayed by the electronic device may be configured to continue playing a preview video that is previously played, or may be configured to replay the preview video that is previously played.

Figure 10:
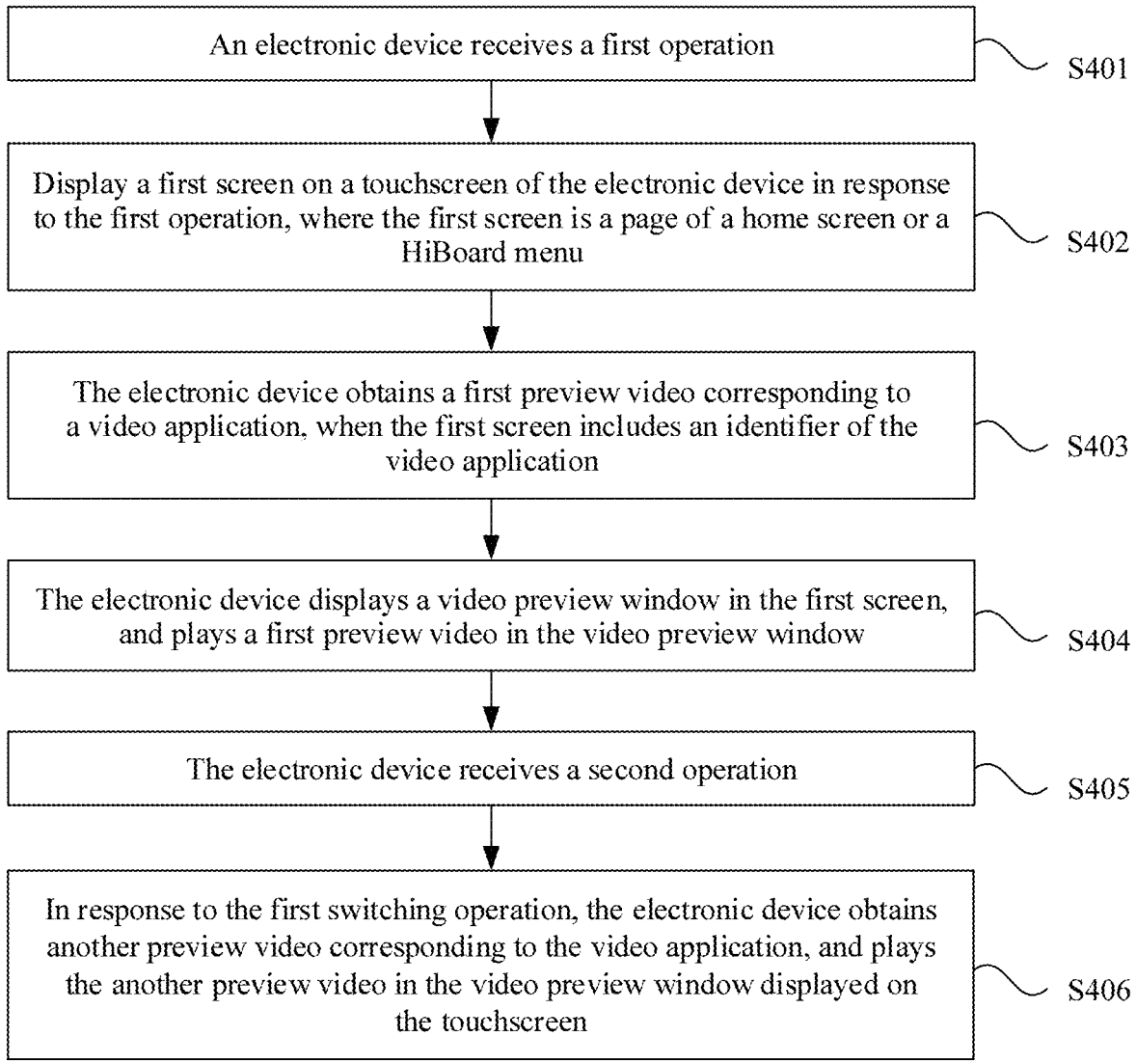
FIG. 10 is a schematic flowchart of a video preview method according to another embodiment of this application.

In some other embodiments of this application, as shown in FIG. 10, the video preview method may further include the following steps: S405 and S406.

S405. The electronic device receives a first switching operation.

For example, with reference to FIG. 8, the first switching operation may be an operation performed by the user on the "last" button 802-2 configured to switch to the previous preview video of the current preview video, or may be an operation performed by the user on the "next" button 802-3 configured to switch to the next preview video of the current preview video.

S406. In response to the first switching operation, the electronic device obtains another preview video corresponding to the video application, and plays the another preview video in the video preview window displayed on the touchscreen.

After receiving the first switching operation, in response to the first switching operation, the electronic device may obtain the another preview video corresponding to the video application, and play the obtained another preview video in the video preview window displayed in the first screen. To be specific, the first preview video and the another preview video are played in a same dynamic widget. For example, with reference to Table 1, the electronic device may obtain the previous preview video or the next preview video of the first preview video based on the first switching operation, and play the obtained preview video in the generated video preview window. In some other embodiments of this application, the second preview video may alternatively be a preview video of another video application installed in the electronic device.

In some other embodiments of this application, an interface invoked when the electronic device obtains the second preview video may be the first interface, and two parameters, videoid and serial number, are configured to request the previous preview video or the next preview video of the first preview video.

Figure 11A:
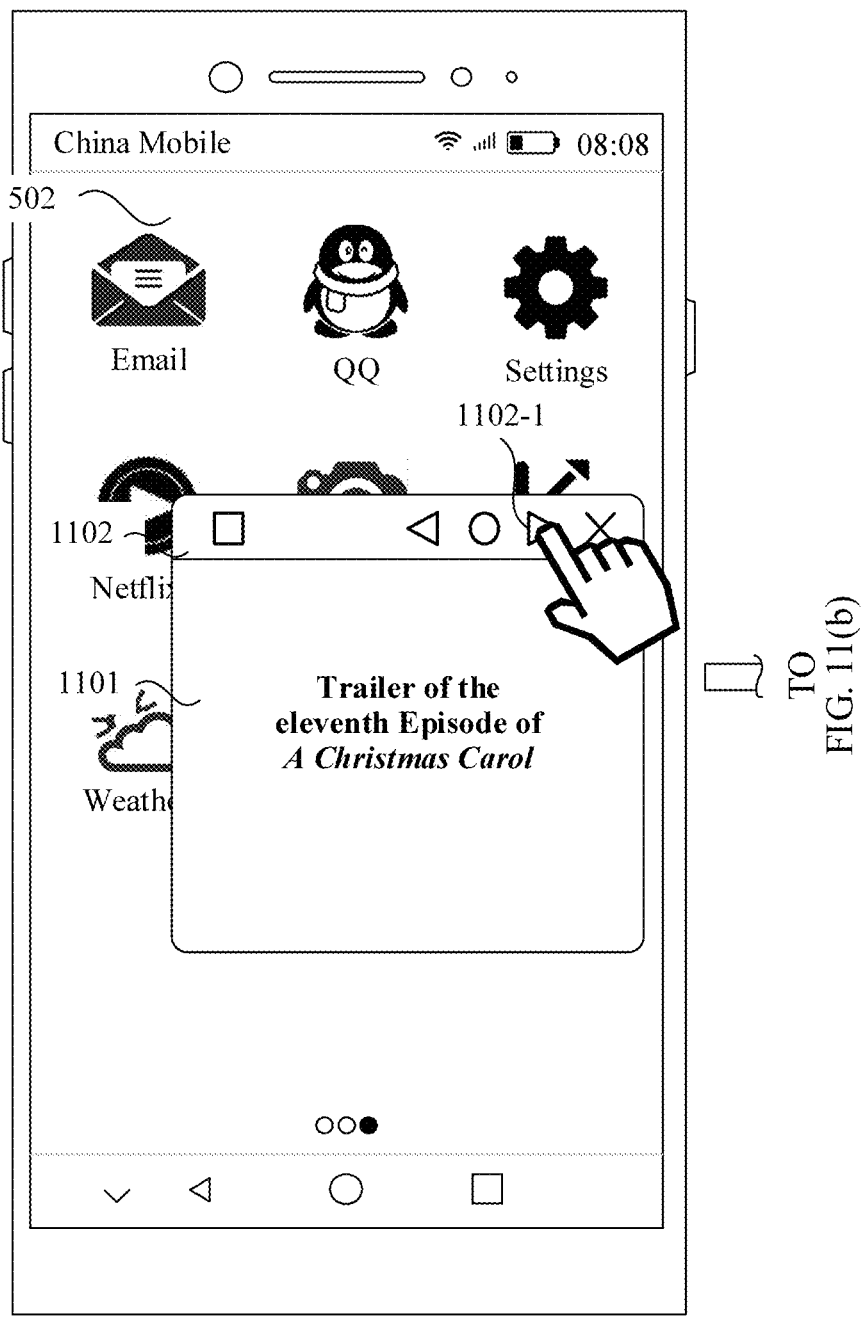
FIG. 11(a) and FIG. 11(b) are schematic diagrams of some other graphical user interfaces displayed on an electronic device according to some other embodiments of this application.
Figure 11B:
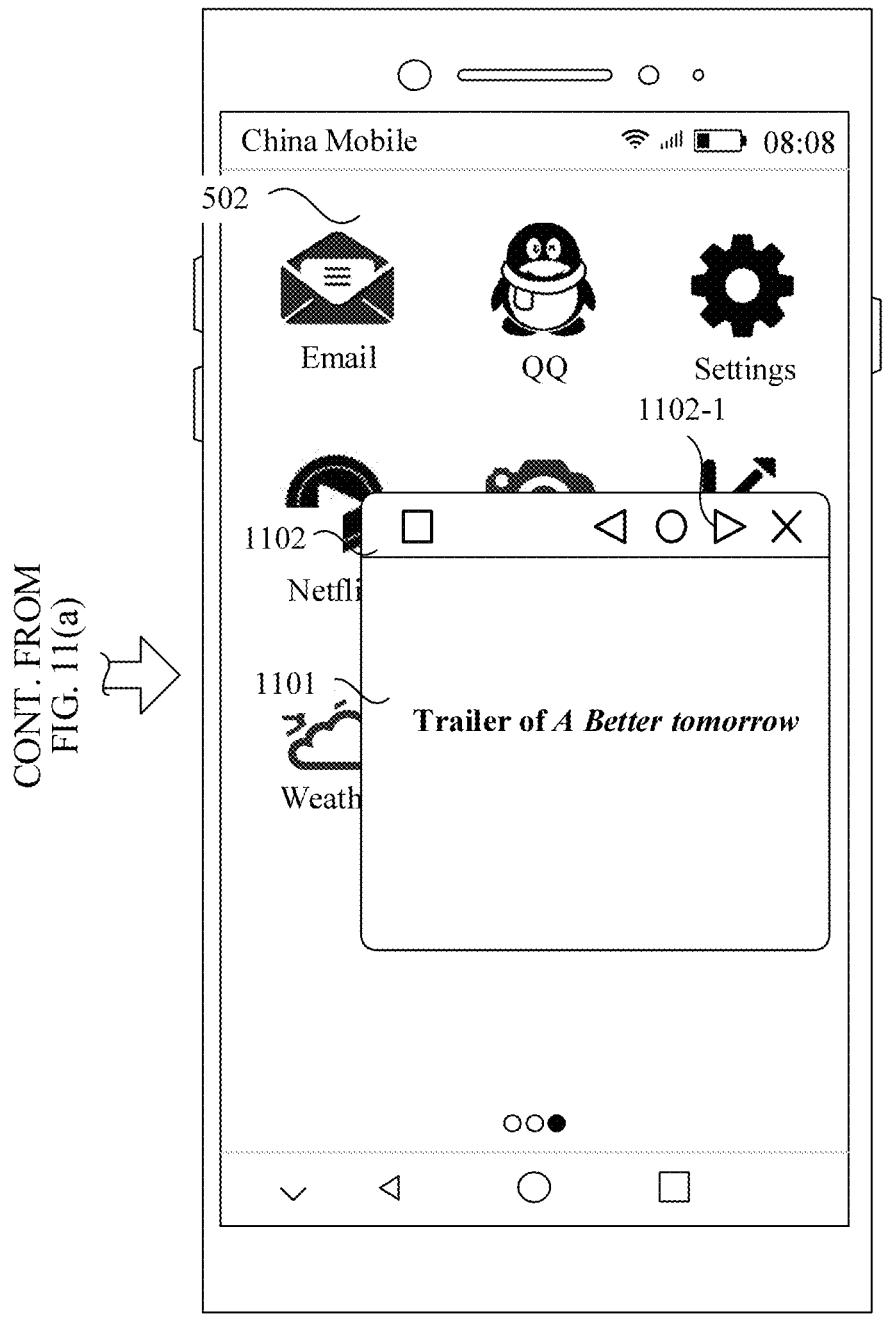

For example, as shown in FIG. 11(a) and FIG. 11(b), an example in which the user wants to watch the next preview video of the current preview video is used for detailed description. With reference to FIG. 5A(1) to FIG. 5A(3) and FIG. 8, as shown in FIG. 11(a), the electronic device plays the trailer of the eleventh episode of A Christmas Carol in a preview video playback area 1101 in the video preview window of the first screen 502. The user may tap a "next" button 1102-1 in an operation area 1102 in the video preview window. The electronic device may obtain, from a preview video set corresponding to Netflix, a next preview video of the trailer of the eleventh episode of A Christmas Carol in response to the tap operation performed by the user on the "next" button 1102-1. With reference to Table 1, the preview video obtained by the electronic device is the trailer of A Better Tomorrow. After obtaining the trailer of A Better Tomorrow, as shown in FIG. 11(*b*), the electronic device may play the trailer of A Better Tomorrow in the preview video playback area 1101 in the video preview window of the first screen 502. In some other embodiments, the electronic device may alternatively obtain a next preview video from a preview video set corresponding to Youku, in response to the tap operation performed by the user on the "next" button 1102-1. For example, the next preview video obtained by the electronic device is the trailer of the first phase of The Voice of China.

It should be noted that if the user wants to switch to the previous preview video of a preview video that is currently played, the user may perform a trigger operation on the "previous" button used to switch to the previous preview video of the current preview video, so that the electronic device plays the previous preview video of the current preview video. A specific implementation thereof is similar to a specific implementation of the example shown in FIG. 11(*a*) and FIG. 11(*b*), and details are not described herein again in this embodiment of this application.

Figure 12:
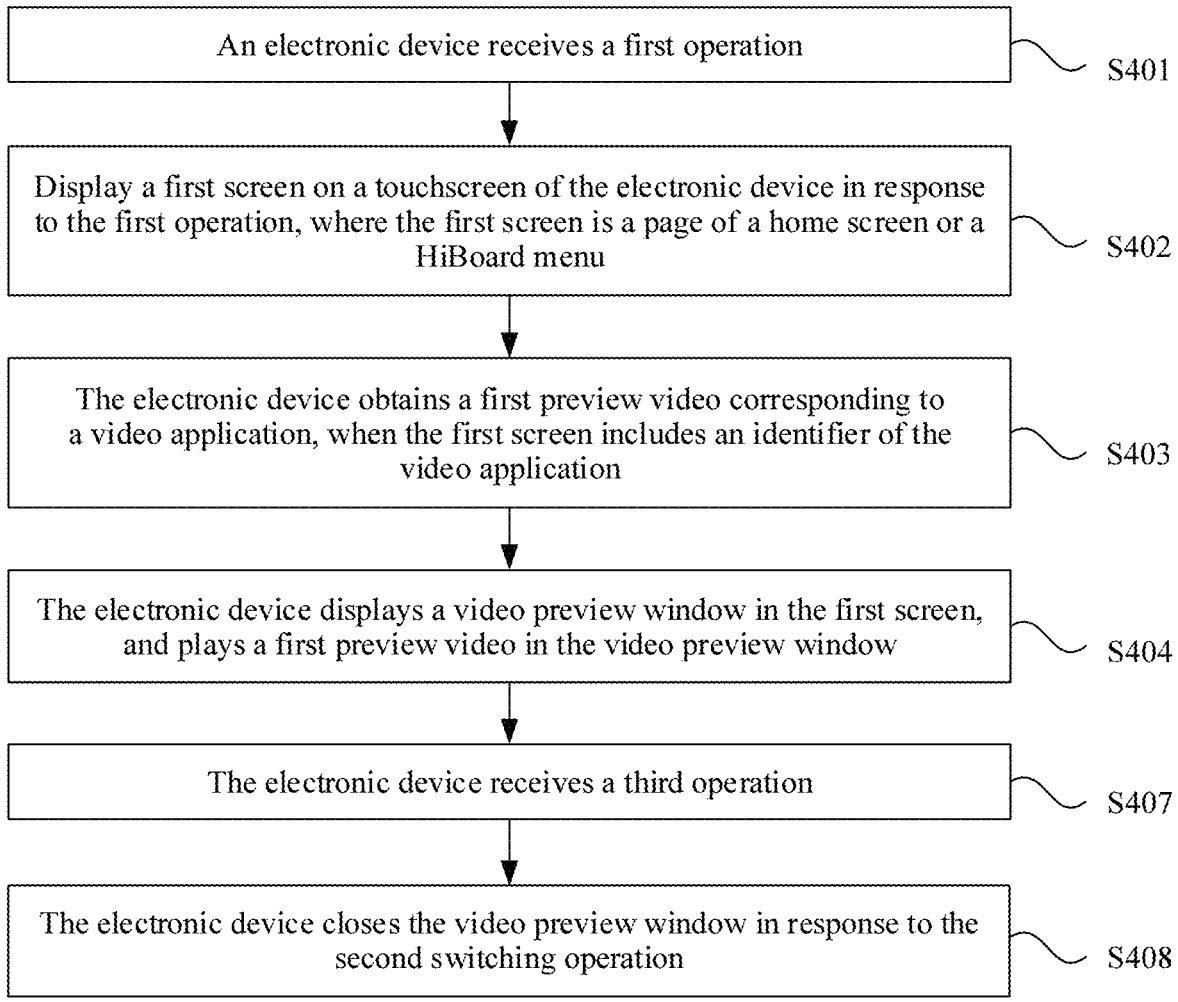
FIG. 12 is a schematic flowchart of a video preview method according to another embodiment of this application.

In some other embodiments of this application, as shown in FIG. 12, the video preview method may further include the following steps: S407 and S408.

S407. The electronic device receives a second switching operation.

For example, with reference to FIG. 8, the second switching operation may be an operation performed by the user on a "close" button 802-4 used to close the video preview window, or the second switching operation may be a touch operation performed by the user on a position other than a display position of the video preview window in the first screen.

S408. The electronic device closes the video preview window in response to the second switching operation.

Figure 13A:
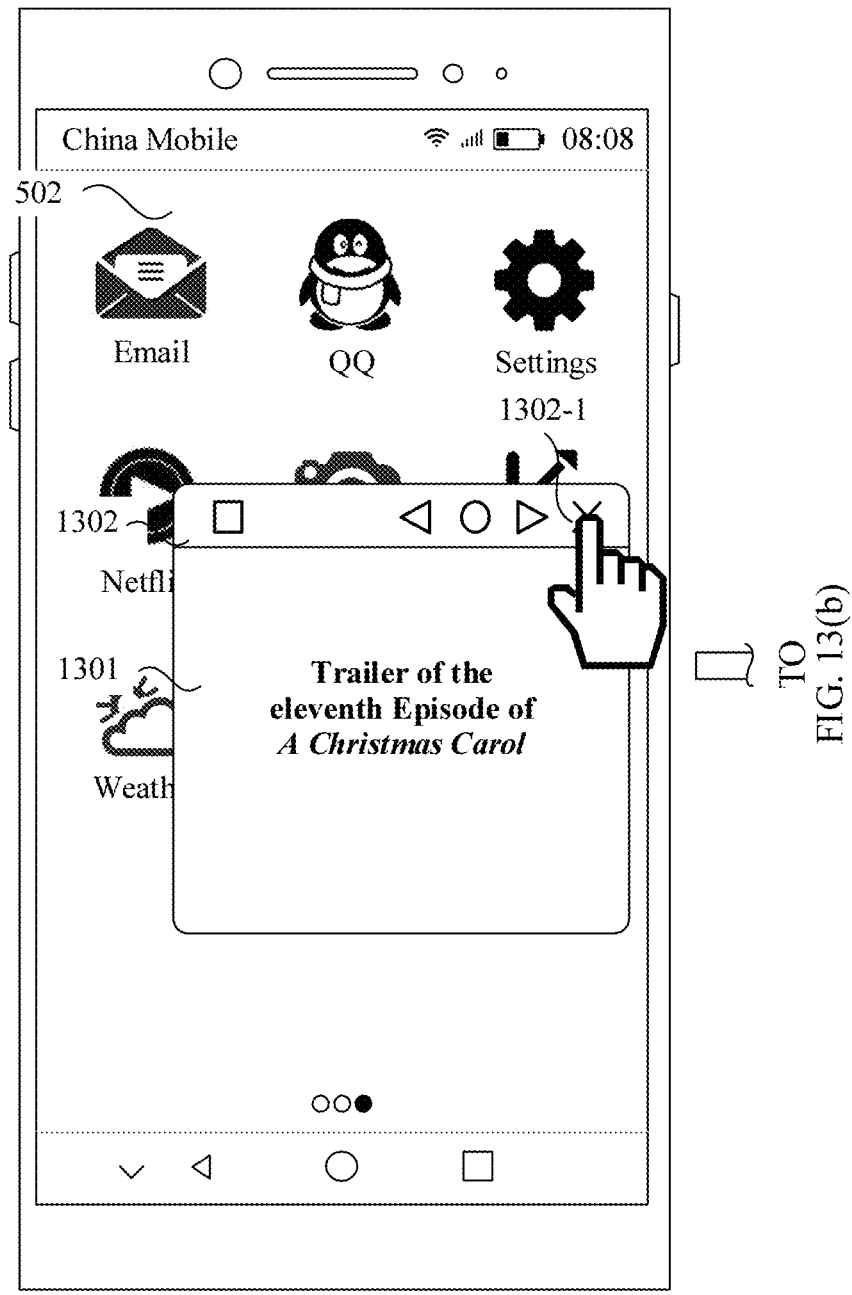
FIG. 13(a) and FIG. 13(b) are schematic diagrams of some other graphical user interfaces displayed on an electronic device according to some other embodiments of this application.
Figure 13B:
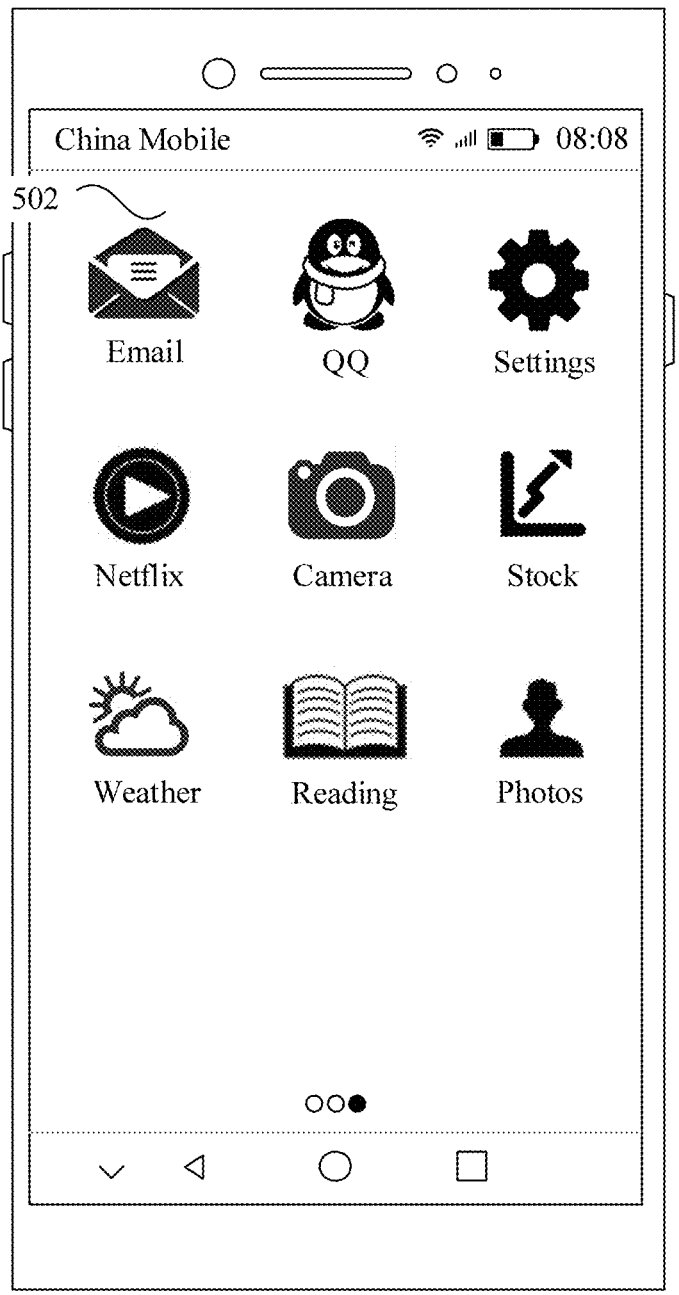

For example, after receiving the second switching operation, the electronic device may close the video preview window in response to the second switching operation. For example, with reference to FIG. 5A(1) to FIG. 5A(3) and FIG. 8, as shown in FIG. 13(*a*), the electronic device plays the trailer of the eleventh episode of A Christmas Carol in a preview video playback area 1301 in the video preview window of the first screen 502. The user may tap a "close" button 1302-1 in an operation area 1302 in the video preview window. As shown in FIG. 13(*b*), the electronic device closes the video preview window in response to the tap operation performed by the user on the "close" button 1302-1.

Figure 14:
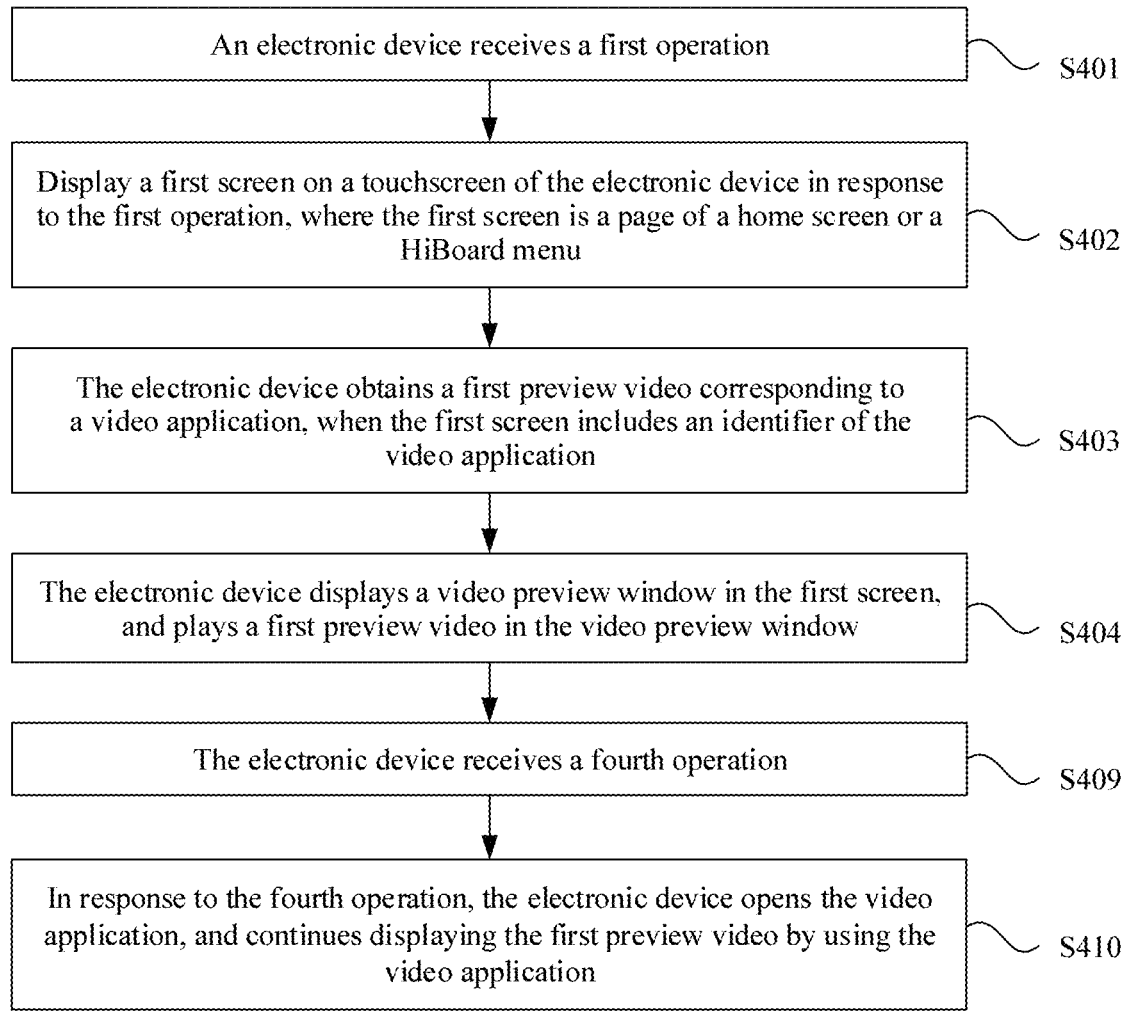
FIG. 14 is a schematic flowchart of a video preview method according to another embodiment of this application.

In some other embodiments of this application, as shown in FIG. 14, the video preview method may further include the following steps: S409 and S410.

S409. The electronic device receives a third switching operation.

For example, with reference to FIG. 8, the third switching operation may be an operation performed by the user on a "maximize" button 802-5 used to maximize the preview video displayed in the preview video playback area 801.

S410. In response to the third switching operation, the electronic device opens the video application, and continues displaying the first preview video in the video application.

After receiving the third switching operation, the electronic device may open the video application in response to the third switching operation, and continue displaying the first preview video in the video application.

Figure 15A:
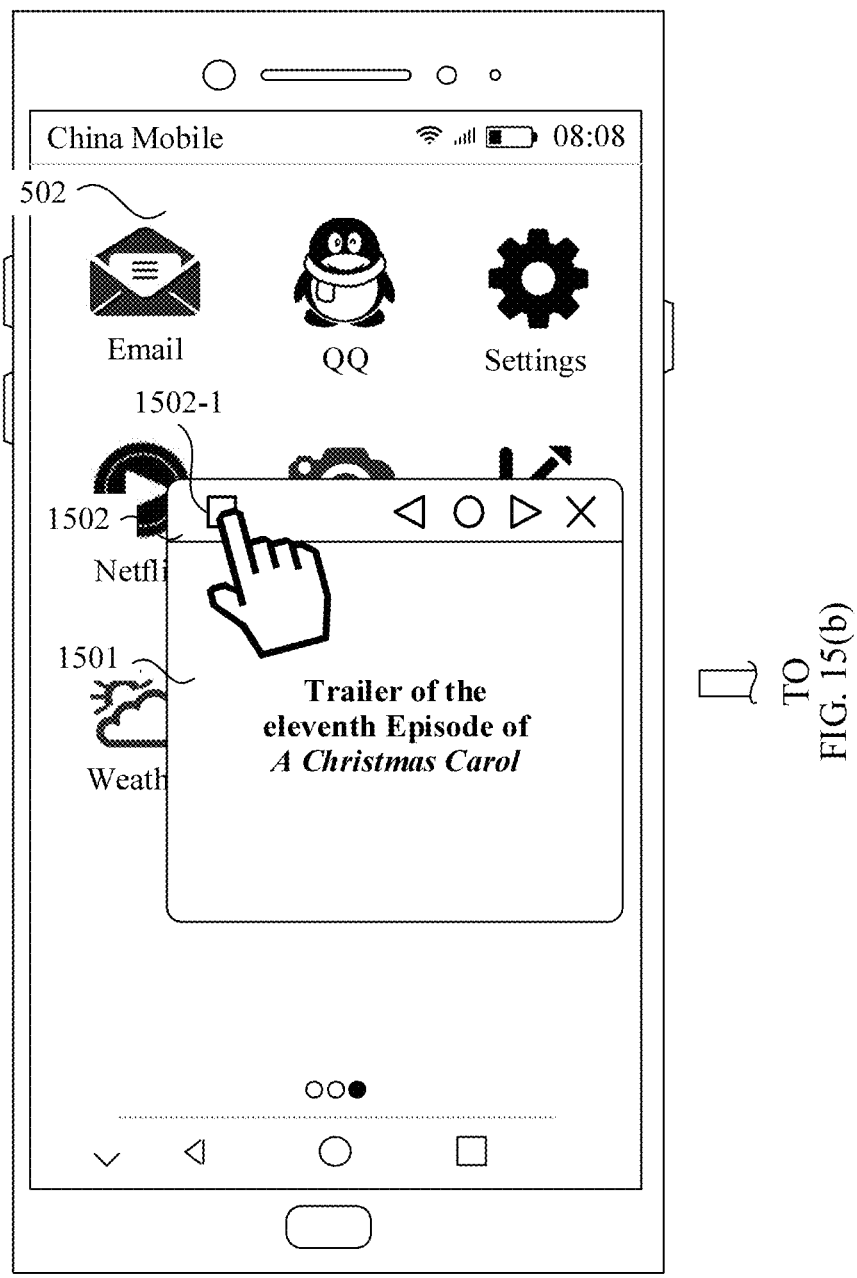
FIG. 15(a) and FIG. 15(b) are schematic diagrams of some other graphical user interfaces displayed on an electronic device according to some other embodiments of this application.
Figure 15B:
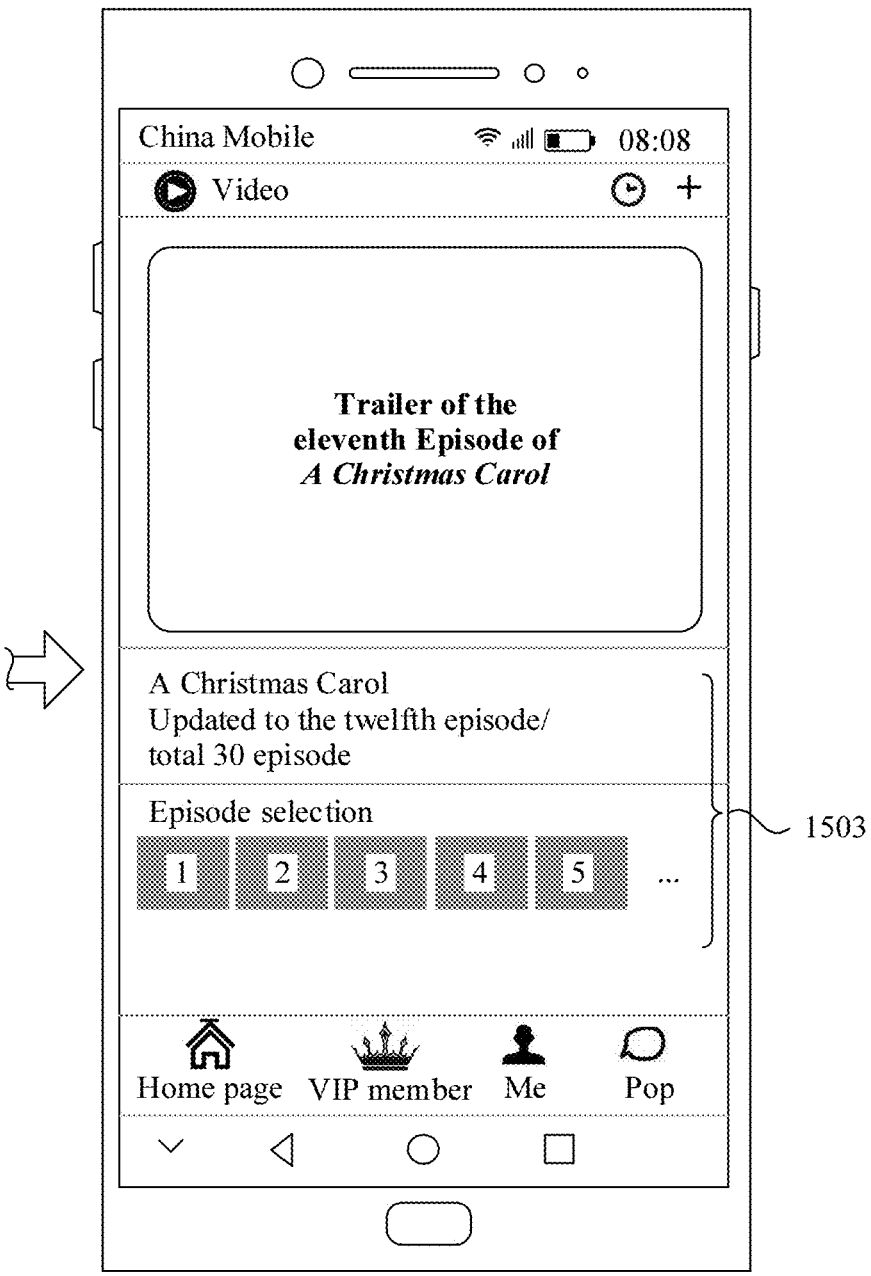

For example, with reference to FIG. 5 and FIG. 8, as shown in FIG. 15(*a*), the electronic device plays the trailer of the eleventh episode of A Christmas Carol in a preview video playback area 1501 in the video preview window of the first screen 502. The user may tap a "maximize" button 1502-1 in an operation area 1502 in the video preview window. As shown in FIG. 15(*b*), in response to the tap operation performed by the user on the "maximize" button 1502-1, the electronic device opens the video application, and continues playing the trailer of the eleventh episode of A Christmas Carol in the video application. In addition, the electronic device may further display related content 1503 of a video corresponding to the trailer of the eleventh episode of A Christmas Carol, for example, introduction to the video, a quantity of episodes, and an option button for jumping to each episode of the video, to facilitate the user to continue to browse.

In some other embodiments of this application, the preview video is obtained by the electronic device from a video server. In some embodiments, the electronic device may obtain, from the video server in advance, a preview video set corresponding to each video application included in the electronic device, and cache the preview video set, or may obtain, from the video server, the preview video set corresponding to the video application and cache the preview video set, when determining, by performing S403, that the first screen includes the identifier of the video application. This is not specifically limited in this embodiment of this application.

Figure 16:
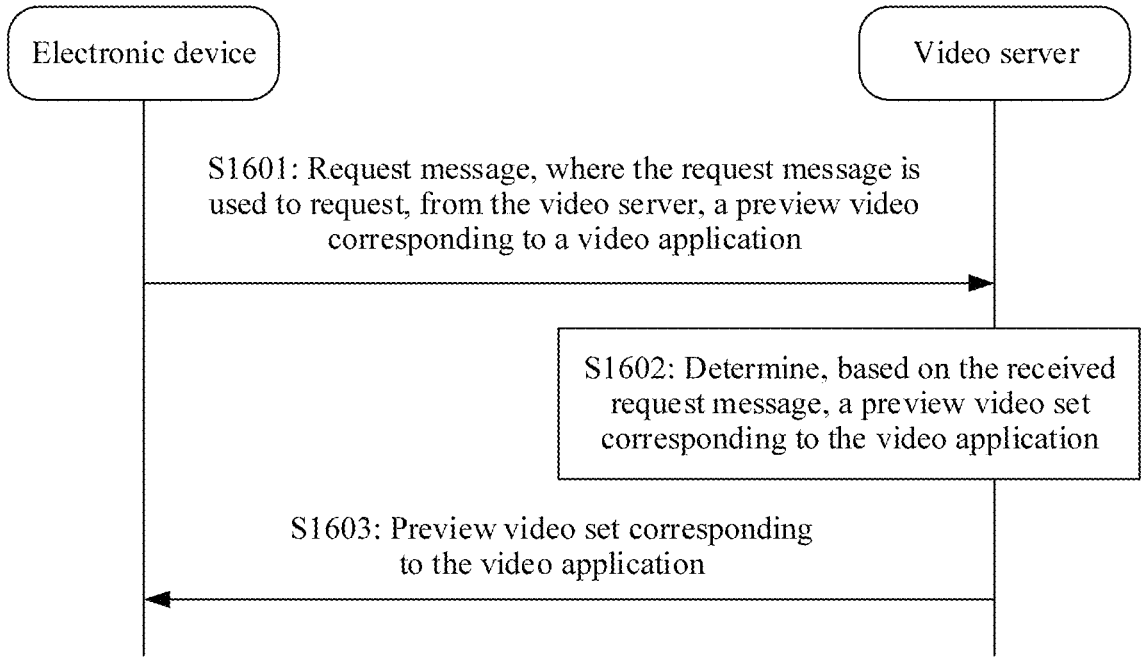
FIG. 16 is a schematic flowchart of a video preview method according to another embodiment of this application.

As shown in FIG. 16, a specific process in which the electronic device obtains, from the video server, the preview video set corresponding to the video application may include S1601 to S1603.

S1601. An electronic device sends a request message to the video server, where the request message is used to request, from the video server, the preview video corresponding to the video application.

In some embodiments, a network protocol used by the electronic device to send the request message may be various network protocols, such as a hypertext transfer protocol (Hyper Text Transfer Protocol, HTTP), a hypertext transfer protocol secure (Hypertext Transfer Protocol Secure, HTTPS), a file transfer protocol (File Transfer Protocol, FTP), and a secure file transfer protocol (Secure File Transfer Protocol, SFTP). This is not limited in this embodiment of this application.

The request message may be expressed in a Jason format. In an example, the request message may include field information shown in Table 2.

TABLE 2

| Field | Type | Whether optional | Field description |
|---|---|---|---|
| width | Integer | O | width indicates a width of a display position, for example, width = 200. A value of the width of the display position may be different from the width of a screen of the electronic device, and may usually be equal to the width of the screen of the electronic device. |
| height | Integer | O | height indicates a height of the |

TABLE 2-continued

| Field | Type | Whether optional | Field description |
|---|---|---|---|
| | | | display position, for example, height = 200. A value of the height of the display position may be different from the height of the screen of the electronic device, and may usually be less than the height of the screen of the electronic device. |
| type | Integer | M | type indicates a type of a requested preview video. For example, if a value of type is 0, it indicates that a preview of a recommended video is requested; or if a value of type is 1, it indicates that a preview of a video subscribed by the user is requested. |
| pkgname | String | M | pkgname indicates a package name of a video application. For example, pkgname is com.****.music. |
| devicetype | Integer | O | devicetype indicates a type of an electronic device sending a request message. For example, if a value of devicetype is 4, it indicates that the type of the electronic device sending the request message is a mobile phone; if a value of devicetype is 5, it indicates that the type of the electronic device sending the request message is a tablet; or if a value of devicetype is 7, it indicates that the type of the electronic device sending the request message is a smartwatch. |
| version | String | O | version indicates a version number of an operating system of the electronic device, for example, Android 4.4.2 |
| maker | String | O | maker indicates a manufacturer of the electronic device, for example, a manufacturer A |
| model | String | O | model indicates a model of the electronic device, for example, *** MT2-C00 |
| language | String | O | language indicates a language of the operating system of the electronic device, for example, zh, using an alpha-2/ISO 639-1 language table |
| imei | String | O | imei indicates one of an international mobile equipment identity (International Mobile Equipment Identity), a mobile equipment identifier (Mobile Equipment Identifier, MEID), or an electronic serial number (Electronic Serial Number, ESN) of the electronic device. One of imei and androidid needs to exist. |
| androidid | String | O | androidid indicates an Android ID of the electronic device. One of androidid and imei needs to exist. |
| mac | String | O | mac indicates a media access control (Media Access Control, MAC) address of the electronic device. |

In Table 2, Integer indicates an integer, and String indicates a character string. O indicates optional (Optional), and M indicates mandatory (Mandatory). As shown in Table 2, the request message includes one of the type (type), the package name (pkgname), imei, and the Android identifier (androidid). The request message may further include at least one of the following: the width (width), the height (height), the device type (devicetype), the version (version), the maker (maker), the model (model), the language (language), and mac.

S1602. The video server determines, based on the received request message, the preview video set corresponding to the video application.

After receiving the request message, the video server may perform matching on the request message and a to-be-delivered preview video based on the request message, to determine the preview video set corresponding to the video application. The to-be-delivered preview video may be a preview of the video subscribed by the user and/or a preview of the recommended video. For example, if the request message carries a video application A, for example, pkgname of Netflix, the video server may determine a preview video set corresponding to Netflix. For example, with reference to Table 1, the obtained preview video set corresponding to Netflix includes the trailer of the first episode of the fourth season of Peppa Pig, the trailer of the eleventh episode of A Christmas Carol, the trailer of A Better Tomorrow, and the trailer of Rise of the Planet of Apes.

A specific determining process of previewing the video subscribed by the user may be: The video server may parse out information carried in the request message, for example, information such as type, pkgname, model, and androidid included in the request message; and may obtain subscription behavior of the user on the electronic device based on androidid. The electronic device sifts out, based on the subscription behavior of the user and a parameter included in the parsed request message, the preview of the video subscribed by the user, for example, a trailer of a subsequent episode of a TV series recently watched by the user or a latest preview of a video added to favorites by the user.

A specific determining process of previewing the recommended video may be: The video server randomly selects a preview of a video that is most likely to be displayed, that is, a preview of the recommended video, or the video server may obtain the preview of the recommended video from a prediction system. The prediction system may or may not be integrated into the video server. In an example, a process in which the prediction system obtains the preview of the recommended video is: A prediction model is established based on related data of a video server in an earlier stage and a big data mining tool, and a prediction computing server is established on a big data computing platform by using the established prediction model. After receiving the request message, the video server may forward the request message to the prediction computing server. The prediction computing server parses the information carried in the request message, for example, type, pkgname, model, and androidid, and then predicts, from the preview video by using the established prediction model, a preview video that is most likely to be displayed in the future, to obtain a prediction result, and returns the prediction result to the video server.

S1603. The video application server sends the preview video set corresponding to the video application, to the electronic device.

For example, after obtaining the preview video set corresponding to the video application, the video server may send the preview video set corresponding to the video application, to the electronic device. The electronic device may locally store the received preview video set and the video application in an associated manner (as shown in Table 1), to facilitate subsequent obtaining of a preview video corresponding to the video application and displaying of the preview video to the user.

According to the video preview method provided in this embodiment of this application, when the user opens the home screen or the leftmost screen that includes an identifier of a video application, the electronic device may play, in the home screen or the leftmost screen, a preview video corresponding to the video application, and the user does not need to open the video application. In this way, complexity of a user operation is reduced, using efficiency of the electronic device is improved, and efficient interaction between the electronic device and the user is implemented.

It may be understood that, to implement the foregoing functions, the electronic device includes corresponding hardware structures and/or software modules for performing the functions. A person skilled in the art should easily be aware that, in combination with the examples described in the embodiments disclosed in this specification, units and algorithm steps in the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

An embodiment of this application further provides an electronic device for implementing the foregoing method embodiments. Specifically, the electronic device may be divided into functional modules. For example, the functional modules may be obtained through division based on corresponding functions, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 17:
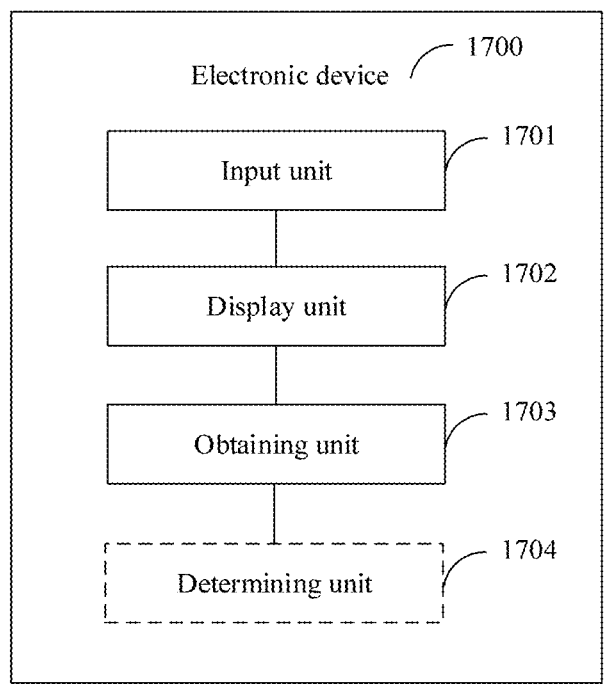
FIG. 17 is a schematic structural diagram of an electronic device according to another embodiment of this application.

When the functional modules are obtained through division based on the corresponding functions, FIG. 17 is a possible schematic structural diagram of an electronic device 1700 according to the foregoing embodiments. The electronic device 1700 may include an input unit 1701, a display unit 1702, and an obtaining unit 1703.

The input unit 1701 is configured to receive input of a user on a display interface of an electronic device, for example, touch input, voice input, gesture input, or a floating operation. The input unit 1701 is configured to support the electronic device in performing S401, S405, S407, and S409 in the foregoing method embodiments, and/or is configured to perform another process of the technology described in this specification. The input unit may be a touchscreen, another hardware, or a combination of hardware and software.

The display unit 1702 is configured to support the electronic device in performing S402, S404, S406, and S410 in the foregoing method embodiments, and/or another process of the technology described in this specification. The input unit may be a touchscreen, another hardware, or a combination of hardware and software.

The obtaining unit 1703 is configured to support the electronic device in performing S403 in the foregoing method embodiments, and/or another process of the technology described in this specification.

In this embodiment of this application, further, as shown in FIG. 17, the electronic device 1700 may further include a determining unit 1704.

The determining unit 1704 is configured to support the electronic device in performing the determining operation in the foregoing method embodiments, and/or another process of the technology described in this specification.

All related content of the steps in the foregoing method embodiments may be quoted to function descriptions of the corresponding functional modules. Details are not described herein again.

Certainly, the electronic device 1700 includes but is not limited to the unit and modules listed above. For example, the electronic device 1700 may further include a sending unit configured to send data or a signal to another device, a receiving unit configured to receive data or a signal sent by another device, or the like. In addition, specific functions that can be implemented by the foregoing functional units also include but are not limited to the functions corresponding to the method steps described in the foregoing examples. For detailed descriptions of another unit of the electronic device 1700, refer to detailed descriptions of method steps corresponding to the units, and details are not described again in this embodiment of this application.

Figure 18:
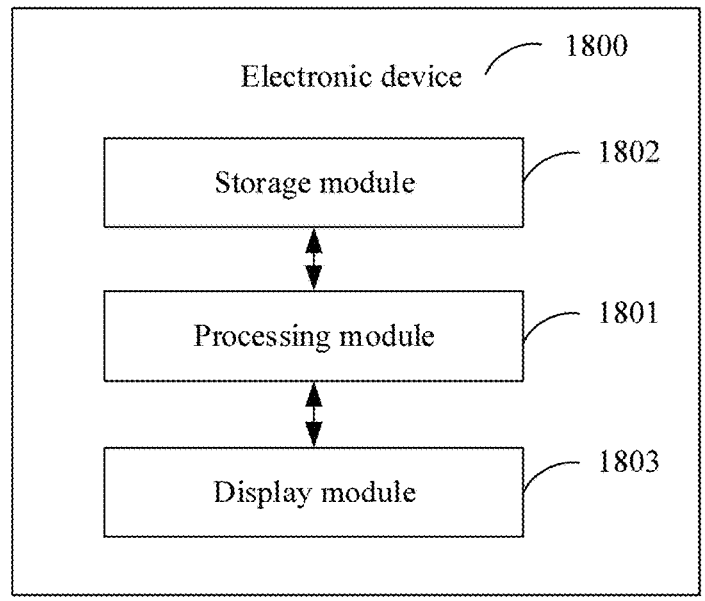
FIG. 18 is a schematic structural diagram of an electronic device according to still another embodiment of this application.

When an integrated unit is used, FIG. 18 is a possible schematic structural diagram of an electronic device 1800 according to the foregoing embodiments. The electronic device 1800 includes a processing module 1801, a storage module 1802, and a display module 1803. The processing module 1801 is configured to control and manage an action of the electronic device 1800. The display module 1803 is configured to display content according to an instruction of the processing module 1801. The storage module 1802 is configured to store program code and data of the electronic device 1800. Further, the electronic device 1800 may further include an input module and a communications module. The communications module is configured to support the electronic device 1800 in communicating with another network entity, to implement functions such as communication, data exchange, and internet access of the electronic device.

The processing module 1801 may be a processor or a controller. The communications module may be a transceiver, an RF circuit, a communications interface, or the like. The storage module 1802 may be a memory. The display module may be a screen or a display. The input module may be a touchscreen, a voice input apparatus, a fingerprint sensor, or the like.

When the processing module 1801 is the processor, the communications module is the RF circuit, the storage module 1802 is the memory, and the display module 1803 is the touchscreen, the electronic device 1800 provided in this embodiment of this application may be the mobile phone shown in FIG. 3. The communications module may include the RF circuit, and may further include a Wi-Fi module, an NFC module, and a Bluetooth module. The communications modules such as the RF circuit, the NFC module, the Wi-Fi module, and the Bluetooth module may be collectively referred to as the communications interface. The processor, the RF circuit, the touchscreen, and the memory may be coupled together by using a bus.

Figure 19:
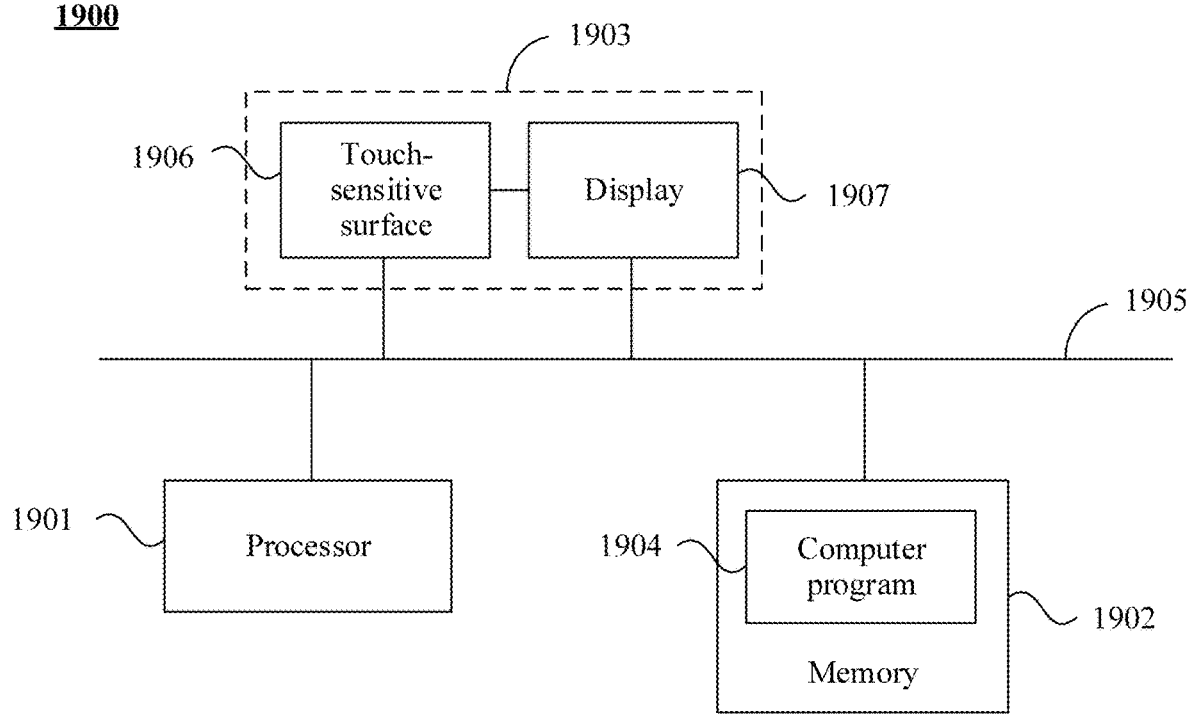
FIG. 19 is a schematic structural diagram of an electronic device according to further another embodiment of this application.

As shown in FIG. 19, some other embodiments of this application further provide an electronic device 1900. The electronic device 1900 may include one or more processors 1901, a memory 1902, a touchscreen 1903, and one or more computer programs 1904. The foregoing components may be connected by using one or more communications buses 1905. The touchscreen 1903 may include a touch-sensitive surface 1906 and a display 1907. The one or more computer programs 1904 are stored in the memory 1902, and are configured to be executed by the one or more processors 1901. The one or more computer programs 1904 may include an instruction, and the instruction may be used to perform the steps in FIG. 4 and the corresponding embodiments. In some other embodiments of this application, the instruction may further be used to perform the steps in FIG. 10 and the corresponding embodiments. In some other embodiments of this application, the instruction may further be used to perform the steps in FIG. 12 and the corresponding embodiments. In some other embodiments of this application, the instruction may further be used to perform the steps in FIG. 14 and the corresponding embodiments. In some other embodiments of this application, the instruction may further be used to perform the steps in FIG. 16 and the corresponding embodiments. Certainly, the electronic device 1900 includes but is not limited to the components listed above. For example, the electronic device 1900 may further include a radio frequency circuit, a positioning apparatus, a sensor, and the like. When the electronic device 1900 includes another component, the electronic device 1900 may be the mobile phone shown in FIG. 3.

Some other embodiments of this application further provides a computer storage medium. The computer storage medium stores computer program code. When the processor executes the computer program code, the electronic device performs related method steps in any one of FIG. 4, FIG. 10, FIG. 12, FIG. 14, and FIG. 16, to implement the video preview method in the foregoing embodiments.

Some other embodiments of this application further provide a computer program product. When the computer program product is run on a computer, the computer is enabled to perform related method steps in any one of FIG. 4, FIG. 10, FIG. 12, FIG. 14, and FIG. 16, to implement the video preview method in the foregoing embodiments.

Some other embodiments of this application further provides a control device. The control device includes a processor and a memory. The memory is configured to store computer program code. The computer program code includes a computer instruction. When the processor executes the computer instruction, the control device performs related method steps in any one of FIG. 4, FIG. 10, FIG. 12, FIG. 14, and FIG. 16, to implement the video preview method in the foregoing embodiments. The control device may be an integrated circuit IC or a system on chip SOC. The integrated circuit may be a universal integrated circuit, may be a field programmable gate array FPGA, or may be an application-specific integrated circuit ASIC.

Some other embodiments of this application further provide a video preview apparatus. The apparatus has functions of implementing behavior of the electronic device in the implementations of the foregoing method. The functions may be implemented by hardware, or may be implemented by hardware executing corresponding software. The hardware or the software includes one or more modules corresponding to the foregoing functions.

The electronic device, the computer storage medium, the computer program product, or the control device that is provided in this embodiment of this application is configured to perform the corresponding method provided above. Therefore, for beneficial effects that can be achieved by the electronic device, the computer storage medium, the computer program product, or the control device, refer to beneficial effects in the corresponding method provided above. Details are not described herein again.

The foregoing descriptions about implementations allow a person skilled in the art to clearly understand that, for the purpose of convenient and brief description, division of the foregoing functional modules is taken as an example for description. In actual application, the foregoing functions may be allocated to different modules and implemented based on a requirement, that is, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in the embodiments of this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) to perform all or some of the steps of the method described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A video preview method implemented by an electronic device, wherein the video preview method comprises:
    receiving a first operation;
    displaying a leftmost screen on a touchscreen of the electronic device in response to the first operation;

detecting that a first video application has a target permission when an application suggestion window displayed in the leftmost screen comprises a first icon of the first video application,
wherein the target permission is for playing a video preview corresponding to a video application when the video application is not displayed in a foreground;
obtaining a first preview video corresponding to the first video application;
adding a first video preview window to the leftmost screen;
playing the first preview video in the first video preview window;
receiving a second operation;
terminating, in response to the second operation, the first video preview window in the leftmost screen;
displaying, in response to the second operation, a page of a home screen on the touchscreen in place of the leftmost screen;
redisplaying the first video preview window in a blank area of the page when the page comprises the first icon and a second icon of a second video application,
wherein the blank area is located in an area of the page in which the page does not display a control; and
continuing playing the first preview video in the first video preview window after redisplaying the first video preview window in the blank area.

2. The video preview method of claim 1, further comprising detecting that the second video application does not have the target permission.

3. The video preview method of claim 1, further comprising:
detecting that the second video application has the target permission; and
determining that a use frequency of the first video application is greater than a use frequency of the second video application, a priority of the first video application is higher than a priority of the second video application, or a last use time of the first video application is later than a last use time of the second video application;
in response to determining the use frequency, the priority, or the last use time, continuing playing the first preview video.

4. The video preview method of claim 1, further comprising:
obtaining a second preview video corresponding to the second video application, and playing the second preview video in the first video preview window; or
displaying a second video preview window in the blank area, and playing the second preview video in the second video preview window.

5. The video preview method of claim 1, wherein the first video preview window added to the leftmost screen is adjacent to the application suggestion window.

6. A video preview method implemented by an electronic device, wherein the video preview method comprises:
receiving a first operation;
displaying a first screen on a touchscreen of the electronic device in response to the first operation, wherein the first screen is a page of a leftmost screen;
detecting that a first video application has a target permission when an application suggestion window displayed in the leftmost screen comprises an identifier of the first video application, wherein the target permission is for playing a video preview corresponding to a video application when the video application is not displayed in a foreground;
obtaining a first preview video corresponding to the first video application when the first screen comprises the identifier of the first video application;
displaying a first video preview window in the leftmost screen; and
playing the first preview video in the first video preview window.

7. The video preview method of claim 6, further comprising:
obtaining a user profile comprising at least one of a time or a place at which a user uses a video application;
determining that the user profile indicates that the user opens the first screen to use the video application; and
obtaining the first preview video when the first screen comprises the identifier of the first video application.

8. The video preview method of claim 6, wherein the first screen further comprises an identifier of a second video application,
wherein before obtaining the first preview video,
the video preview method further comprises detecting that the second video application does not have the target permission.

9. The video preview method of claim 6, wherein the first screen further comprises an identifier of a second video application, and
wherein before obtaining the first preview video,
the video preview method further comprises:
detecting that the second video application also has the target permission; and
determining that a use frequency of the first video application is greater than a use frequency of the second video application, a priority of the first video application is higher than a priority of the second video application, or a last use time of the first video application is later than a last use time of the second video application,
in response to determining the use frequency, the priority, or the last use time, continuing playing the first preview video.

10. The video preview method of claim 6, further comprising:
obtaining a second preview video corresponding to a second video application when the first screen further comprises an identifier of the second video application, and playing the second preview video in the first video preview window; or
displaying a second video preview window in the first screen, and playing the second preview video in the second video preview window.

11. The video preview method of claim 6, further comprising:
obtaining a second preview video corresponding to a second video application and a third preview video corresponding to a third video application when the application suggestion window further comprises an identifier of the second video application and an identifier of the third video application;
adding a second video preview window to the leftmost screen;
playing the second preview video in the second video preview window;
receiving a sliding operation;
adding, in response to the sliding operation, a third video preview window to the leftmost screen; and playing, in response to the sliding operation, the third preview video in the third video preview window.

12. The video preview method of claim 6, wherein the identifier is an icon of an application or a widget of an application, wherein the first video preview window comprises one or more of a pause/play button, a previous button, a next button, a close button, or a maximize button, or wherein the first video preview window is displayed in a blank area of the first screen in which the first screen does not display a control.

13. An electronic device comprising: a touchscreen;
a memory configured to s tore instructions; and
a processor coupled to the touchscreen and the memory wherein the instructions cause processor is configured to:
receive a first operation;
display, in response to the first operation, a first screen in the touchscreen, wherein the first screen is a leftmost screen;
detecting that a first video application has a target permission when an application suggestion window displayed in the leftmost screen comprises an identifier of the first video application, wherein the target permission is for playing a video preview corresponding to a video application when the video application is not displayed in a foreground;
obtain a first preview video corresponding to the first video application when the first screen comprises the identifier of the first video application;
display a first video preview window in the first screen; and
play, in the first video preview window, the first preview video.

14. The electronic device of claim 13, wherein the instructions further cause the processor is configured to:
obtain a user profile comprising at least one of a time or a place at which a user uses a video application;
determine that the user profile indicates that the user opens the first screen to use the video application; and
obtain the first preview video when the first screen comprises the identifier of the first video application.

15. The electronic device of claim 13, wherein the first screen further comprises an identifier of a second video application,
wherein the instructions further cause the processor is configured to detect that the second video application does not have the target permission.

16. The electronic device of claim 13, wherein the first screen further comprises an identifier of a second video application, and wherein the instructions further cause the processor is configured to: detect that the second video application also has the target permission; and determine that a use frequency of the first video application is greater than a use frequency of the second video application, a priority of the first video application is higher than a priority of the second video application, or a last use time of the first video application is later than a last use time of the second video application,
in response to determining the use frequency, the priority, or the last use time, continuing playing the first preview video.

17. The electronic device of claim 13, wherein the instructions further cause the processor is configured to: obtain a second preview video corresponding to a second video application when the first screen further comprises an identifier of the second video application, and play, in the first video preview window, the second preview video; or display a second video preview window in the first screen, and play, in the second video preview window, the second preview video.

18. The electronic device of claim 13, wherein the instructions further cause the processor is configured to obtain a second preview video corresponding to a second video application and a third preview video corresponding to a third video application when an application suggestion window of the leftmost screen further comprises an identifier of the second video application and an identifier of the third video application; add a second video preview window to the leftmost screen;
play the second preview video in the second video preview window;
receive a sliding operation;
add, in response to the sliding operation, a third video preview window to the leftmost screen; and
play, in response to the sliding operation, the third preview video in the third video preview window.

19. The electronic device of claim 13, wherein the identifier is an icon of an application or a widget of an application, wherein the first video preview window comprises one or more of a pause/play button, a previous button, a next button, a close button, or a maximize button, or wherein the first video preview window is displayed in a blank area of the first screen in which the first screen does not display a control.

* * * * *

UNITED STATES PATENT AND TRADEMARK OFFICE
CERTIFICATE OF CORRECTION

PATENT NO. : 11,785,304 B2
APPLICATION NO. : 17/041898
DATED : October 10, 2023
INVENTOR(S) : Xinyu Weng Page 1 of 1

It is certified that error appears in the above-identified patent and that said Letters Patent is hereby corrected as shown below:

On the Title Page

References Cited, U.S. Patent Documents: "3,732,579 A 5/1973 Allander et al." should read "8,732,579 B2 5/2014 Rossmann"

In the Claims

Claim 3, Column 39, Line 43: "application;" should read "application,"

Claim 6, Column 39, Line 63: "first screen is a page of a leftmost screen" should read "first screen is a leftmost screen"

Claim 13, Column 41, Line 13: "configured to s tore instructions" should read "configured to store instructions"

Signed and Sealed this
Fifth Day of December, 2023

Katherine Kelly Vidal
*Director of the United States Patent and Trademark Office*